United States Patent [19]
Ozawa

[11] Patent Number: 5,890,468
[45] Date of Patent: Apr. 6, 1999

[54] DIFFERENTIAL DRIVING SUPERCHARGER AND METHOD FOR CONTROLLING THE SAME

[75] Inventor: Godo Ozawa, Utsunomiya, Japan

[73] Assignee: Komatsu Ltd., Tokyo, Japan

[21] Appl. No.: 682,544

[22] PCT Filed: Jan. 20, 1995

[86] PCT No.: PCT/JP95/00063
§ 371 Date: Jul. 25, 1996
§ 102(e) Date: Jul. 25, 1996

[87] PCT Pub. No.: WO95/20100
PCT Pub. Date: Jul. 27, 1995

[30] Foreign Application Priority Data

Jan. 25, 1994 [JP] Japan ................................ 6-023694
Nov. 9, 1994 [JP] Japan ................................ 6-301496

[51] Int. Cl.$^6$ .................................................. F02B 39/06
[52] U.S. Cl. ........................................................ 123/561
[58] Field of Search ............................................ 123/561

[56] References Cited

U.S. PATENT DOCUMENTS

| 1,732,405 | 10/1929 | Invernizzi | 123/561 |
|---|---|---|---|
| 3,296,791 | 1/1967 | Richard et al. | 123/561 |
| 3,349,759 | 10/1967 | Castelet | 123/561 |
| 3,605,522 | 9/1971 | Grosseau . | |
| 3,665,787 | 5/1972 | Wilkinson | 123/561 |
| 3,673,797 | 7/1972 | Wilkinson . | |

FOREIGN PATENT DOCUMENTS

| 919512 | 11/1946 | France | 123/561 |
|---|---|---|---|
| 44-1099 | 1/1969 | Japan . | |
| 47-13567 | 4/1972 | Japan . | |
| 47-12352 | 6/1972 | Japan . | |
| 2-75726 | 3/1990 | Japan . | |
| 4-12133 | 1/1992 | Japan . | |
| 5-180282 | 7/1993 | Japan . | |
| 479803 | 11/1969 | Switzerland | 123/561 |
| 563722 | 8/1944 | United Kingdom | 123/561 |

Primary Examiner—Michael Koczo
Attorney, Agent, or Firm—Sidley & Austin

[57] ABSTRACT

The present invention provides a differential driving supercharger and a method for controlling the same, wherein supply air to an engine for a vehicle, such as a construction machine, is supercharged, the acceleration properties of the engine are improved, and the size can be made smaller while attaining a higher output, a greater torque at lower engine speeds, and a better fuel economy. To this end, a planetary carrier (13) of a differential driving device is connected to an output shaft (1A) of an engine (1), a mechanical supercharger (10) to a sun gear (11), and a rotary variable load body (30) to a ring gear (14), respectively. In addition, the rotary variable load body (30), connected to the ring gear (14), is rotated from the outside to increase or reduce the speed of the mechanical supercharger (10), to thereby increase the output of the engine (1).

64 Claims, 39 Drawing Sheets

EMBODIMENT: S₁ GEAR TRAIN

EMBODIMENT: S₂ PULLEY

EMBODIMENT: S₄ CVT (BELT TYPE CONTINUOUSLY VARIABLE TRANSMISSION)

EMBODIMENT: S₄ TOROIDAL TYPE CVT

EMBODIMENT: S5 SELECTOR VALVE/FIXED CAPACITY PUMP & MOTOR

EMBODIMENT: S6 VARIABLE CAPACITY PUMP & FIXED CAPACITY MOTER

EMBODIMENT: S7 VARIABLE CAPACITY PUMP & MOTOR

EMBODIMENT: S9 VARIABLE CAPACITY FLUID COUPLER

EMBODIMENT: S8 GENERATOR AND ELECTRIC MOTOR

EMBODIMENT

EMBODIMENT

EMBODIMENT : U₁ TOROIDAL TYPE CVT

EMBODIMENT : U₂ BELT TYPE CVT

FREQUENCY APPLIED TO HIGH-SPEED SOLENOID VALVE

DIFFERENTIAL DRIVING SUPERCHARGER AND METHOD FOR CONTROLLING THE SAME

TECHNICAL FIELD

The present invention relates to a differential driving supercharger and a method for controlling the same, and more particularly to a differential driving supercharger for an engine for a vehicle, such as a construction machine, wherein the supply air to the engine is supercharged to increase an engine output, and a method for controlling the supercharger.

BACKGROUND ART

Heretofore, in engines mainly for vehicles capable of running with road wheels, such as automobiles, trucks, wheel loaders, and cranes, superchargers have been employed to reduce the size of the engine and to attain a higher output while ensuring satisfactory acceleration properties. Such superchargers include the mechanical type, which utilizes part of an engine output or power from any other means, and the turbo type, which utilizes a turbocharger which uses exhaust gas. The mechanical supercharger is arranged, as shown in FIG. 72, such that a supercharger 210 is mechanically connected to an engine 211 through gears 212, 213, a belt, or the like, for directly driving the engine 211. This direct driving type supercharger 210 produces air supply states as shown in FIG. 73. Specifically, the supply of air to the engine 211 is in a deficient state in a low-speed, high-load region (HA) of the engine rotational speed, and in an excessive state in a high-speed, low-load region (LB). This increases the loss in the driving of the supercharger 210.

To overcome the above drawback, there is proposed a method of driving the supercharger 210 with a differential driving mechanism as shown in FIG. 74 (see Japanese Patent Publication No. 44-1099).

In this proposed differential driving mechanism S1, a planetary carrier 202 is fixedly coupled to an output shaft 211a of an engine 211, and the planetary gears 214, usually three in number, are rotatably mounted on the planetary carrier 202 with equal angular spacings therebetween. The three planetary gears 214 are each held in mesh with a sun gear 215 on the inner side and with a ring gear 216 on the outer side. The output shaft 211a of the engine 211 is disposed to rotatably penetrate the sun gear 215. Further, a gear 217 is provided at one end of the sun gear 215, and a drive gear 218 for the mechanical supercharger 210 is meshed with the gear 217. A shaft, of a power transmission system 220 for a vehicle, is coupled to the ring gear 216, so that the mechanical supercharger 210 is rotated variably responsive to the load of the power transmission system 220.

In the above prior art differential driving mechanism 200, however, because the vehicle load is large during start-up acceleration from zero speed (i.e., acceleration of the vehicle from a stopped state), the vehicle can start moving merely after the rotational speed of the mechanical supercharger 210 has increased to such an extent that a sufficient amount of air is admitted to enter the engine 211. Therefore, the operator has a slow start-up feeling in the initial stage of depressing an accelerator pedal downwardly, and hence is dissatisfied with a poor response.

Also, another differential driving mechanism 201, having a similar arrangement to the above differential driving mechanism 201, is known as shown in FIG. 75 (see, e.g., Japanese Patent Laid-Open No. 5-180282). In the mechanism 201, the ring gear 216 is provided with a brake 216a, which is actuated in an electric, dry air, hydraulic, or other like manner. The force of rotating the mechanical supercharger 210 is controlled responsive to the magnitude of the dragging resistance produced by the brake 216a.

However, the differential driving mechanism 201 has a problem in that part of the driving force of the engine 211 is uselessly consumed as a heat loss through the dragging resistance produced by the brake 216a, etc., resulting in poor fuel economy.

Construction, conveyance, and other machines have different desired output performance of engines, depending on the type to be applied. Some machines are desired to have a higher output at low and medium rotational speeds, and some other machines are desired to have a higher output at high rotational speeds. For example, it is desired for engines of power shovels, etc., to have a higher output at high rotational speeds, i.e., to be operated in a useful region Qa, as shown in FIG. 76. On the contrary, it is desired for engines of bulldozers, dump trucks, wheel loaders, motor graders, on-road trucks, etc., to have a higher output at medium and low rotational speeds, as shown in FIG. 77.

However, there is a problem in that the presently used engines have a characteristic curve indicated by a dashed line EL-1 in FIG. 77, and cannot quickly produce a higher output at medium and low rotational speeds.

This is because of the following problems encountered in the presently used engines:

(1) The amount of intake air is limited in the range of medium and low rotational speeds.

(2) The maximum combustion pressure in a cylinder has a limit at Pmax.

(3) If the compression ratio is reduced at low temperature, start-up properties are deteriorated and hence have a limit. (In view of start-up properties, the compression ratio is approximately 15 to 19 for the case of direct injection.)

FIG. 78 is a graph for explaining the two problems (1) and (2) above. In FIG. 78, the horizontal axis represents an engine rotational speed, the vertical axis represents a net mean effective pressure Pme, and the hyperbolic curves (Ar1, Ar2, Ar3) represent equi-amount lines of air demanded by the engines. Also, a one-dot-chain line (Ara) indicates a limit of the intake amount of air in the engines presently used, and a two-dot-chain line (Pml) indicates a limit of the maximum combustion pressure (Pmax) imposed on the engines presently used from the structural balance in design. From these limits, engines are designed at the present so as to produce an output torque indicated by a dashed line (Tca). While turbosuperchargers are employed to produce a higher output, a prior art turbosupercharger is not operated at a low speed (Na) when the engine has a torque curve (Tca) as shown in FIG. 79. This increases the difference in the demanded air amount to be supplied to the engine between a rated point (Ra) and a maximum torque point (Tmax), and hence requires a compressor map covering a wide range. Therefore, a vaneless type compressor must be used to cover the wide range, resulting in poor compressor efficiency. Further, because of the great difference in the demanded air amount, a maximum efficiency area (Laa), as shown in FIG. 80, cannot be utilized. If the rated point (Ra) is set in the maximum efficiency area (Laa), the maximum torque point (Tmax) would come into an unusable surging region (beyond a surge line Saa) where the air flow rate is too small. On the other hand, if the maximum torque point (Tmax) is set in the maximum efficiency area (Laa), the rated point (Ra) would come into a choke region (beyond a choke line Caa), resulting in the problem of an abnormal reduction in compressor efficiency.

Moreover, if a high-torque engine, capable of producing a high torque at low speeds, is manufactured to include a mechanical supercharger, the pressure in the cylinders would be increased to such an extent as to exceed an allowable limit in design and, accordingly, reliability and durability could not be ensured. If the compression ratio is reduced to overcome the above drawback, the start-up properties at low temperature would be deteriorated. Thus, there arise contradictory problems.

In addition, if the net mean effective pressure is increased in a low-speed range, problems would occur in that a torque at low speeds is remarkably increased to cause a lubrication failure in the main moving portions, or an increased output in the low-speed range causes deficient cooling in the respective portions, whereby durability and reliability are lowered.

SUMMARY OF THE INVENTION

In view of the above-stated problems in the prior art, the present invention is concerned with a differential driving supercharger and a method for controlling the same, and its object is to provide a differential driving supercharger and a method for controlling the same which are particularly adapted for engines of vehicles, such as automobiles, trucks, wheel loaders, cranes, and other construction machines, with the resultant advantages that the acceleration properties are improved and the size can be made smaller while attaining a higher output, a greater torque at lower engine speeds, and better fuel economy.

According to a first aspect of the present invention, in a differential driving supercharger including a mechanical supercharger, driven by an engine output through a differential driving device, a power shaft for the engine output is coupled to a planetary carrier of the differential driving device, the mechanical supercharger is coupled to a sun gear thereof, a rotary variable load body is coupled to a ring gear thereof, and the mechanical supercharger is held at a substantially constant rotational speed by speeding up and slowing down the rotary variable load body connected to the ring gear responsive to change in an engine rotational speed output through the planetary carrier. The first aspect of the present invention is also featured in that, when the rotation of the mechanical supercharger is stopped, in such a three-connection arrangement, a load of the rotary variable load body is reduced to make the rotary variable load body rotate idly, or the energy of the rotary variable load body is accumulated for reducing an energy loss of the rotary variable load body. Preferably, the means for reducing an energy loss of the rotary variable load body is any one of a fixed or variable capacity pump, a fixed or variable capacity motor, a fixed or variable capacity pump/motor serving as a pump and a motor, and an accumulating device.

Preferably, the ring gear and the rotary variable load body are coupled to each other through a clutch for reducing an energy loss of the rotary variable load body, when the rotation of the mechanical supercharger is stopped.

The differential driving supercharger can comprise on/off valves, disposed in respective intake lines between the mechanical supercharger and the engine and between the atmosphere and the engine to cut off or introduce air to the engine; an engine rotational speed sensor, for detecting an engine rotational speed; and a controller for outputting signals to open and close the on/off valves upon receiving a prescribed rotational speed signal from the engine rotational speed sensor. Preferably, the controller outputs signals to the on/off valves so that the on/off valve between the mechanical supercharger and the engine is closed and the on/off valve between the atmosphere and the engine is opened to supply air to the engine through natural suction when the rotation of the mechanical supercharger is stopped.

Also, the differential driving supercharger can comprise an accelerator pedal, for controlling an engine rotational speed; an accelerator pedal depression sensor, for detecting the amount of depression of the accelerator pedal, a solenoid of an injection pump, for controlling an amount of fuel injected into the engine; a rack position sensor, for detecting an amount of fuel ejected from the injection pump; on/off valves, disposed in respective intake lines between the mechanical supercharger and the engine and between the atmosphere and the engine to cut off or introduce air to the engine; an engine rotational speed sensor, for detecting the engine rotational speed; a servo member, for increasing and reducing a capacity of the rotary variable load body; a selector valve, for selectively introducing power to the rotary variable load body therethrough; and a controller for, upon receiving prescribed signals from the accelerator pedal depression sensor, the rack position sensor, and the engine rotational speed sensor, outputting signals to the solenoid of the injection pump, the selector valve, and the servo member for the rotary variable load body, to thereby control the rotational speeds of the engine and the mechanical supercharger. Preferably, when the mechanical supercharger is sped up or slowed down, the controller outputs signals to the on/off valves, so that the on/off valve between the mechanical supercharger and the engine is opened and the on/off valve between the atmosphere and the engine is closed to supercharge air to the engine; a signal to the selector valve, to shift its position; and a signal to the servo member for the rotary variable load body, to increase its capacity. Furthermore, preferably, when the mechanical supercharger is held substantially at a constant rotational speed, the controller outputs signals to the on/off valves, so that the on/off valve between the mechanical supercharger and the engine is opened and the on/off valve between the atmosphere and the engine is closed to supercharge air to the engine; a signal to the solenoid of the injection pump, to increase or reduce the engine rotational speed; a signal to the selector valve, to shift its position; and a signal to the servo member for the rotary variable load body, to increase or reduce its rotational speed.

With the above first aspect of the invention, since the rotating force and the speed of the mechanical supercharger are controlled externally to thereby control the amount of air supplied to the engine, satisfactory vehicle motion performance with a good response, including acceleration from zero speed, can be achieved. Also, since the mechanical supercharger is controlled externally by varying the delivery capacity of a pump or motor (e.g., varying the delivery rate under control of a swash plate), varying the delivery pressure of a hydraulic pump, or the like, or varying the load of a generator, no appreciable energy loss is caused, and energy is conserved without producing any dragging resistance.

According to a second aspect of the present invention, a differential driving supercharger is featured in that a power shaft for the engine output is coupled to a planetary carrier of a differential driving device, the mechanical supercharger is coupled to a sun gear thereof, a rotary variable load body is coupled to a ring gear thereof, and a power source for driving the rotary variable load body is coupled to an engine output shaft. The power source for driving the rotary variable load body can be any one of a fixed or variable capacity pump, a generator, and an air compressor; and/or an accumulating device can be provided between the rotary variable load body and the power source for driving the rotary variable load body. Other preferable arrangements can be added as with the first aspect of the invention. Thus, though not detailed here, the ring gear and the rotary variable load body can be coupled to each other in such a manner as to reduce an energy loss of the rotary variable load body, or the aforesaid various sensors, etc., can be provided to perform control by the aforesaid controller.

With the above arrangements, for example, when the mechanical supercharger is desired to be rapidly accelerated at the quick start-up of a vehicle, the acceleration of the mechanical supercharger can be assisted by releasing the energy stored in an accumulator or the like, resulting in effective utilization of energy.

According to a third aspect of the present invention, a differential driving supercharger is featured in that a power shaft for the engine output is coupled to a planetary carrier of a differential driving device, the mechanical supercharger is coupled to a sun gear thereof, a rotary variable load body is coupled to a ring gear thereof, and an accumulating device such as an accumulator or a battery is coupled to a power source for driving the rotary variable load body. Other preferable arrangements can be added as with the first aspect of the invention. Thus, though not detailed here, the ring gear and the rotary variable load body can be coupled to each other in such a manner as to reduce an energy loss of the rotary variable load body, or the aforesaid various sensors, etc., can be provided to perform control by the aforesaid controller.

With the above arrangements, energy can be easily conserved in the accumulator or the battery, and acceleration of the mechanical supercharger can be assisted by rapidly releasing the conserved energy at the quick start-up of a vehicle, resulting in effective utilization of energy.

According to a fourth aspect of the present invention, a differential driving supercharger is featured in that a power shaft for the engine output is coupled to a planetary carrier of a differential driving device, the mechanical supercharger is coupled to a sun gear thereof, a rotary variable load body is coupled to a ring gear thereof, and a driving device for receiving power generated by the rotary variable load body is coupled to an output shaft of a driving force transmission system for a vehicle. Preferably, the rotary variable load body is any one of a fixed or variable capacity pump, a generator, and an air compressor; and the driving device is any one of a fixed or variable capacity motor, and an electric motor. Other preferable arrangements can be added as with the first aspect of the invention. Thus, though not detailed here, the aforesaid various sensors, etc., can be provided to perform control by the aforesaid controller.

With the above arrangements, since the rotary variable load body can be employed as a source for the driving force of the vehicle at the prescribed rotational speed, it is possible to effectively utilize energy.

According to a fifth aspect of the present invention, a differential driving supercharger is featured in comprising an accelerator pedal, for controlling a rotational speed of an engine; an accelerator pedal depression sensor, for detecting a tread amount of the accelerator pedal; a rack position sensor, for detecting an amount of fuel ejected from the injection pump; an engine rotational speed sensor, for detecting the engine rotational speed; on/off valves, disposed in respective intake lines between the mechanical supercharger and the engine and between the atmosphere and the engine to cut off or introduce air to the engine; a clutch, for connecting and disconnecting between the ring gear and the rotary variable load body or a power source for driving the rotary variable load body; and a controller, the controller being adapted for, upon receiving prescribed signals from the accelerator pedal depression sensor, the rack position sensor, and the engine rotational speed sensor, outputting a signal to the on/off valve between the atmosphere and the engine to open itself and a signal to the clutch to disconnect, so that air is supplied to the engine through natural suction, and an energy loss of the rotary variable load body is reduced.

With the above arrangements, an energy loss in driving of the rotary variable load body can be substantially eliminated when the engine is rotated at low speeds, including the state where the vehicle is stopped, or when the vehicle is running at a constant speed.

According to a sixth aspect of the present invention, there is provided a differential driving supercharger comprising an accelerator pedal, for controlling a rotational speed of an engine; an accelerator pedal depression sensor, for detecting an amount of depression of the accelerator pedal; a rack position sensor, for detecting an amount of fuel ejected from the injection pump; an engine rotational speed sensor, for detecting the engine rotational speed; a servo member, for increasing and reducing a capacity of the rotary variable load body; a servo member for a driving device coupled to an output shaft of a driving force transmission system for a vehicle, for receiving power generated by the rotary variable load body; a selector valve, for selectively connecting between the rotary variable load body and the driving device; a clutch, for connecting and disconnecting power between an output shaft of the engine and the output shaft of the driving force transmission system; and a controller, the controller being adapted for, upon receiving prescribed signals from the accelerator tread sensor, the rack position sensor, and the engine rotational speed sensor, outputting a signal to the clutch to disconnect, a signal to the selector valve to connect between the rotary variable load body and the driving device, a signal to the rotary variable load body to increase or reduce its capacity, and a signal to the driving device to increase or reduce its capacity, thereby transmitting an engine output from the rotary variable load body to the output shaft of the driving force transmission system for a vehicle through the driving device.

With the above arrangements, similarly to the third aspect of the present invention, since the rotary variable load body can be employed as a source for the driving force of the vehicle at the prescribed rotational speed, it is possible to effectively utilize energy.

According to a seventh aspect of the present invention, a differential driving supercharger is featured in that a power shaft for the engine output is coupled to a planetary carrier of a differential driving device, the mechanical supercharger is coupled to a sun gear thereof, and a flywheel is coupled to a ring gear thereof through a brake and a clutch. A reverse gear for switching between forward and backward rotation can be disposed between the clutch and the flywheel.

With the above arrangements, since an inertial body such as a flywheel is associated with the ring gear, the mechanical supercharger can be quickly accelerated by using the inertial body at low speeds of the vehicle, thereby increasing the engine output at low speeds. Also, at high speeds, the clutch is disconnected to stop the mechanical supercharger, thereby reducing the engine output at high speeds to improve fuel economy. Further, since energy can be accumulated in the inertial body by connecting the clutch when the vehicle is slowed down, the mechanical supercharger can be more quickly accelerated at the restarting of the vehicle by utilizing the accumulated energy, thereby further increasing the engine output at low speeds. In addition, by actuating the above brake during long-time running or when climbing a slope, the mechanical supercharger can be rotated so as to increase the engine output during the acceleration.

According to an eighth aspect of the present invention, a differential driving supercharger is featured in that a power shaft for the engine output is coupled to a planetary carrier of a differential driving device, the mechanical supercharger is coupled to a sun gear thereof, and a transmission of a driving force transmission system for a vehicle or a driving shaft, branched from an output shaft downstream of the transmission, is coupled to a ring gear thereof. A supercharger transmission can be disposed between the ring gear and the transmission or the output shaft downstream of the transmission. Also, a one-way clutch can be disposed between the sun gear and the mechanical supercharger. Preferably, the supercharger transmission is any one of a gear train; a pulley train; a belt type continuously variable transmission; a toroidal type continuously variable transmission; a combination of a hydraulic pump and a hydraulic motor; a combination of a hydraulic pump, a hydraulic motor, and a selector valve; a combination of an electric generator and a motor; and a variable capacity fluid coupler. A clutch can be disposed between the transmission, or the output shaft downstream of the transmission, and the mechanical supercharger.

With the above arrangements, the ring gear can receive the driving force from the output shaft downstream of the transmission. By utilizing that driving force, the mechanical supercharger can be quickly accelerated at low speeds, and the rotation of the mechanical supercharger can be kept constant at high speeds. Also, the provision of the one-way clutch enables the mechanical supercharger to smoothly vary its rotational speed in spite of stepwise gear changes of the transmission. In addition, since the ring gear receives the driving force from the output shaft downstream of the transmission and is driven through the supercharger transmission, the rotational speed of the mechanical supercharger can be selected depending on applications, e.g., the type of work, and hence the optimum engine output at low speeds can be attained.

According to a ninth aspect of the present invention, a differential driving supercharger is featured in that a power shaft for the engine output is coupled to a planetary carrier of the differential driving device. the mechanical supercharger is coupled to a sun gear thereof, and a continuously variable transmission for a ring gear is disposed between the power shaft for the engine output and the ring gear.

With the above arrangements, since a speed-up ratio of the differential driving device can be made variable with the provision of the continuously variable transmission for the ring gear, the speed-up ratio can be set to a larger value to increase the acceleration force in the initial stage of the acceleration. In the late stage of the acceleration, the speed-up ratio can be set to a smaller value so that the mechanical supercharger is slowly rotated for smooth transition to steady running.

According to a tenth aspect of the present invention, a differential driving supercharger is featured in that a power shaft for the engine output is coupled to a planetary carrier of the differential driving device, the mechanical supercharger is coupled to a sun gear thereof, and a brake is associated with a ring gear thereof, the brake being operated through a high-speed solenoid valve for selectively engaging, repeatedly engaging and disengaging at a high speed, or disengaging the brake.

With the above arrangements, since a higher torque can be produced at low engine speeds with the provision of the brake operated through the high-speed solenoid valve to selectively engage and disengage, it is possible to attain a power line which has a small size, is inexpensive, and has a good response. Also, vehicle motion performance with a good response, including acceleration from zero speed, is achieved. Furthermore, the high-speed engagement or disengagement of the brake causes no brake dragging, which has been problematic in the prior art, resulting in improved durability and reliability.

According to an eleventh aspect of the present invention, a differential driving supercharger is featured in that a mechanical supercharger, provided with a differential driving device receiving power from the outside, and a turbo-supercharger are disposed in series in an exhaust circuit of an engine, and the mechanical supercharger, provided with the differential driving device, causes the engine to output substantially equi-horsepower, so that substantially constant exhaust energy is supplied to the turbosupercharger over the range from low rotational speeds to high rotational speeds of the engine.

With the above arrangements, the engine can produce an equi-output and hence constant exhaust energy by combining the mechanical supercharger and the turbosupercharger with each other, and by driving the mechanical supercharger through the differential driving device. In other words, even if the engine rotational speed is varied from a low-speed range to a high-speed range, the turbosupercharger can receive equal exhaust energy and, therefore, can be rotated at a constant speed. This makes it possible to employ a compressor with a diffuser having a narrow range map and to operate the compressor with its efficiency set in a maximum efficiency range.

According to a twelfth aspect of the present invention, a differential driving supercharger is associated with an engine having a compression ratio in the range of 10 to 15 for the direct injection type so that, at the start-up of an engine, a rotational speed of a mechanical supercharger is increased and air, compressed and heated by the mechanical supercharger, is supplied to the engine.

With the above arrangements, since air is quickly supercharged to the engine by the mechanical supercharger at low engine speeds, and the temperature of the intake air is raised due to near-adiabatic compression, satisfactory start-up properties at low temperature can be ensured even with a lower compression ratio. Also, a reduction in the compression ratio makes it possible to set the net mean effective pressure to a higher value and provide an engine which can output a higher torque at low speeds.

According to a thirteenth aspect of the present invention, in a method for controlling a differential driving supercharger with which a rotational speed of an engine is increased by a differential driving device to drive a supercharger for supercharging air to the engine, a ring gear is rotated from the outside to control an increase and decrease in a rotational speed of a mechanical supercharger coupled to a sun gear; and/or the ring gear is caused to rotate idly to stop the rotation of the mechanical supercharger coupled to the sun gear, and energy accumulated during a period of the mechanical supercharger being increased in its rotational speed is utilized. Also, the control method is featured in that the step of "utilizing energy accumulated during a period of the mechanical supercharger being increased in its rotational speed" is a step of "accumulating power of the engine during a period of the ring gear being rotated idly.

With the above control method, similarly to the first aspect of the invention, since the rotating force and speed of the mechanical supercharger are controlled externally to thereby control the amount of air supplied to the engine, satisfactory vehicle motion performance with a good response, including acceleration from zero speed, can be achieved. Also, the accumulated energy can be effectively utilized as the driving force for the vehicle, and the vehicle can be quickly accelerated at the start-up. In addition, energy can be conserved when not needed.

According to a fourteenth aspect of the present invention, a method for controlling a differential driving supercharger is featured in that a rotational speed and a load of an engine are detected, a ring gear is caused to rotate idly to stop the rotation of a mechanical supercharger coupled to a sun gear when the detected rotational speed and load have prescribed values, and/or the ring gear is disconnected from an external rotary variable load body so that the ring gear is rotated idly to stop the rotation of the mechanical supercharger coupled to the sun gear, when the detected rotational speed and load have prescribed values.

With the above control method, similarly to the first aspect of the invention, since the mechanical supercharger is controlled externally by varying the delivery capacity of a pump or the like, varying the delivery pressure of a hydraulic pump or the like, or varying the load of a generator, no appreciable energy loss is caused and energy is conserved without producing any dragging resistance.

According to a fifteenth aspect of the present invention, a method for controlling a differential driving supercharger is featured in that a mechanical supercharger is controlled to a substantially constant rotational speed by applying variable rotation to a ring gear from the outside responsive to change in the engine rotational speed output through a planetary carrier.

With the above control method, the mechanical supercharger can be driven by the differential driving device so as to always supercharge the same amount of air to the engine. It is therefore possible to eliminate a turbo lag, which has been a problem in conventional engines with turbochargers in a low-speed range, i.e., a slow start-up feeling due to a delay in the initial stage of supercharge at low engine speeds. In medium-speed and high-speed ranges, the higher engine output can be realized through mechanical supercharge in place of turbocharge.

According to a sixteenth aspect of the present invention, a method for controlling a differential driving supercharger is featured in that a ring gear is rotated from the outside by a power source created with power from an engine, thereby controlling an increase and decrease in a rotational speed of a mechanical supercharger coupled to a sun gear.

With the above control method, the rotational speed of the mechanical supercharger can be desirably controlled by the differential driving device independently of the engine rotational speed. It is therefore possible to ensure a higher supercharge pressure when necessary and to reduce a driving loss under a light load simultaneously by speeding up and slowing down the mechanical supercharger as needed. Accordingly, an increase in output and torque of the engine and a reduction in total fuel consumption rate can be realized at the same time.

According to a seventeenth aspect of the present invention, a method for controlling a differential driving supercharger is featured in that an engine rotational speed and an amount of fuel ejected from an injection pump are detected, and on/off valves, disposed in respective lines between a mechanical supercharger and the engine and between the atmosphere and the engine, are opened and closed responsive to the detected engine rotational speed and amount of fuel ejected from the injection pump, so that air supply to the engine is controlled through natural suction or supercharge suction.

With the above control method, similarly to the first aspect of the invention, since the rotating force and speed of the mechanical supercharger are controlled externally to thereby control the amount of air supplied to the engine, satisfactory vehicle motion performance with a good response, including acceleration from zero speed, can be achieved.

According to an eighteenth aspect of the present invention, a method for controlling a differential driving supercharger is featured in that an engine rotational speed and an amount of fuel ejected from an injection pump are detected, and when the detected engine rotational speed and amount of fuel ejected from the injection pump have values within respective prescribed ranges, power between an output shaft of the engine and an output shaft of a driving force transmission system is cut off, so that engine power is converted into pressure or electric power by a rotary variable load body through the differential driving device, and a driving device converts the pressure or electric power back into power for transmission to the driving force transmission system for a vehicle.

With the above control method, the accumulated energy can be effectively utilized as the driving force for the vehicle and the vehicle can be quickly accelerated at the start-up. In addition, energy can be conserved when not needed.

According to a nineteenth aspect of the present invention, a method for controlling a differential driving supercharger is featured in that when a ring gear is rotated from the outside to control an increase and decrease in a rotational speed of a mechanical supercharger coupled to a sun gear, an engine rotational speed and an amount of depression of an accelerator pedal are detected, and any one of applying a maximum load to a rotary variable load body associated with a ring gear, applying a brake upon a flywheel associated with the ring gear, engaging a clutch connected to the ring gear, and maximizing a speed reduction ratio of a continuously variable transmission connected to the ring gear, is carried out responsive to the detected engine rotational speed and amount of depression of the accelerator pedal.

With the above control method, similarly to the first aspect of the invention, since the rotating force and speed of the mechanical supercharger are controlled externally to thereby control the amount of air supplied to the engine, satisfactory vehicle motion performance with a good response, including acceleration from zero speed, can be achieved.

According to a twentieth aspect of the present invention, a method for controlling a differential driving supercharger is featured in that an engine rotational speed and the location of an amount of depression of an accelerator pedal, in regions defined by dividing a full stroke of the accelerator pedal beforehand, are detected, and a speed-up ratio of a mechanical supercharger is changed to vary an engine output depending on the detected rotational speed and region.

With the above control method, similarly to the first aspect of the invention, since the rotating force and speed of the mechanical supercharger are controlled externally to thereby control the amount of air supplied to the engine, satisfactory vehicle motion performance with a good response, including acceleration from zero speed, can be achieved.

According to a twenty-first aspect of the present invention, a method for controlling a differential driving supercharger is featured in that a ratio of a rotational speed of each of the accessories driven by an engine, such as an engine injection pump and engine lubricating and cooling pumps, to an engine rotational speed is made variable responsive to a rotational speed or/and work load of a mechanical supercharger.

With the above control method, since the accessories are rotated at high speeds when the engine rotational speed is low, lubrication, cooling, or fuel injection can be performed satisfactorily.

BEST MODE FOR CARRYING OUT THE INVENTION

Hereinafter, preferred embodiments of a differential and driving supercharger according to the present invention a method of controlling the same will be described in detail with reference to the accompanying drawings.

Figure 1:
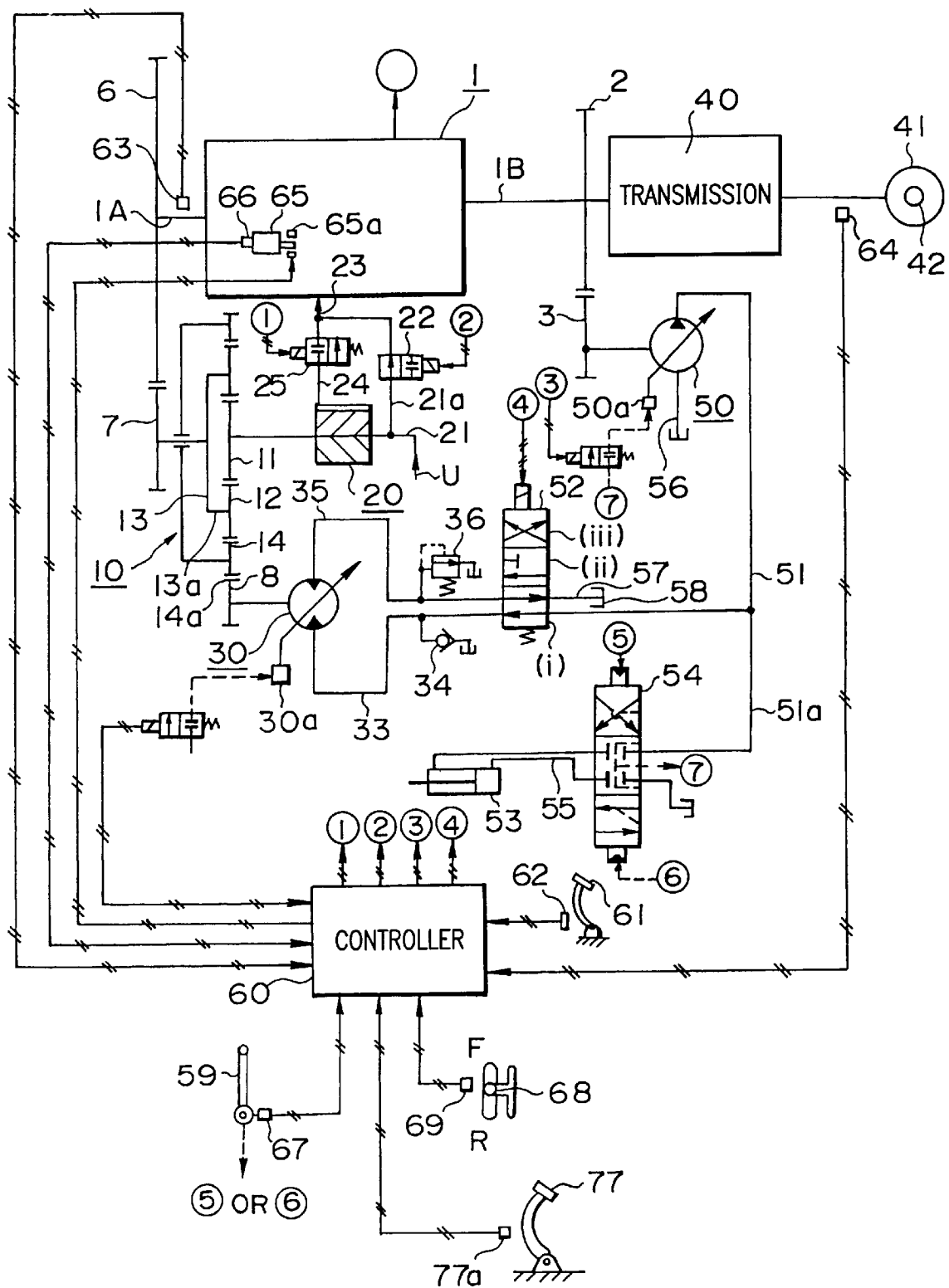
FIG. 1 is a conceptual diagram of a differential driving supercharger, the view showing a first embodiment of the present invention.

FIG. 1 is a conceptual diagram of a differential driving supercharger, the view showing a first embodiment of the present invention. A differential planetary gearing 10 is associated with an output shaft 1A of an engine 1, and a mechanical supercharger 20 and a variable capacity hydraulic motor 30 (hereinafter referred to as a variable hydraulic motor 30) are associated with the differential planetary gearing 10. A driving force transmission system 40 of the vehicle is connected to an output shaft 1B of the engine 1, and a variable capacity hydraulic pump 50 (hereinafter referred to as a variable hydraulic pump 50) is connected to the output shaft 1B through gears 2 and 3. A solenoid selector valve 52, for supplying and cutting off oil under pressure to and from the variable hydraulic motor 30, is connected to a hydraulic line 51 which extends from the variable hydraulic pump 50, and a selector valve 54, associated with a cylinder 53 for working equipment adapted to carry out excavation, loading or other work, is connected to a hydraulic line 51a which is branched from the line 51.

The variable hydraulic motor 30 and the solenoid selector valve 52 are connected to each other by lines 33 and 35, and the cylinder 53 and the selector valve 54 are connected to each other by lines 55. A suction line 56 extends from the variable hydraulic pump 50, and a return line 57, which extends from the variable hydraulic motor 30, are connected to a hydraulic tank 58 through the solenoid selector valve 52. A suction valve 34 and a safety valve 36 are connected to the lines 33 and 35, respectively, between the variable hydraulic motor 30 and the solenoid selector valve 52.

The variable hydraulic pump 50 and the variable hydraulic motor 30 are provided with servo valves 50a and 30a, respectively, for varying the delivery capacities of the hydraulic pump 50 and the hydraulic motor 30. The servo valves 50a and 30a are operated in accordance with commands from a control device or controller 60 to vary the delivery capacities of the hydraulic pump 50 and the hydraulic motor 30. The selector valve 54 (comprising a center-closed, load-sensing valve) is connected to a control lever 59 and is shifted upon manual operation by an operator. The control lever 59 is shown as being of hydraulic pilot type, but it can be a direct-acting lever, an electric lever, or the like.

The suction side of the mechanical supercharger 20 is connected to the atmosphere U through a filter (not shown), and an on/off valve 22 is disposed in a line 21a which is branched from a line 21 which extends between the mechanical supercharger 20 and the filter (not shown), the line 21a being connected to an intake pipe 23 of the engine 1. An on/off valve 25 is disposed in a line 24, which extends from the delivery side of the mechanical supercharger 20 to the intake pipe 23 of the engine 1. The on/off valve 22 and the on/off valve 25 are connected to the controller 60 to open and close in accordance with commands from the controller 60, to make a switching so that air is directly supplied to the engine from the atmosphere through the filter (not shown), the line 21a, the on/off valve 22, and the intake pipe 23, or air is supplied to the engine 1 through the mechanical supercharger 20, the line 24, the on/off valve 25, and the intake pipe 23.

The controller 60 receives input signals from an accelerator pedal depression sensor 62, for detecting the the amount of the depression of an accelerator pedal 61; an engine revolution number sensor 63, for detecting the number of revolutions of the engine 1; a vehicle speed sensor 64, for detecting a tire rotational speed from the driving force transmission system 40 of the vehicle to thereby detect a vehicle speed; a rack position sensor 66, for detecting the rack position of an injection pump 65 which controls the amount of fuel injected to the engine; a control lever position sensor 67, for detecting the position of the control lever 59; and a shift position sensor 69, associated with the shift lever 68.

Also, connected to the controller 60 are a solenoid 65a of the fuel injection pump 65, for controlling the amount of fuel injected to the engine 1; the aforesaid servo valves 50a and 30a, associated with the variable hydraulic pump 50 and the variable hydraulic motor 30; and the aforesaid on/off valves 22 and 25, associated with the mechanical supercharger 20; these components being operated in accordance with respective commands from the controller 60.

The differential planetary gearing 10 comprises a sun gear 11, planetary gears 12, a planetary carrier 13, and a ring gear 14. Power of the engine 1 is inputted to the differential planetary gearing 10 through both a gear 6, fixedly attached to the engine output shaft 1A, and a gear 7, which is held in mesh with the gear 6 and fixedly attached to the planetary carrier 13. The planetary gears 12, usually three in number, are rotatably mounted on the planetary carrier 13 with equal angular spacings therebetween. The three planetary gears 12 are each held in mesh with the sun gear 11 on the inner side and with the ring gear 14 on the outer side. The sun gear 11 is connected to the mechanical supercharger 20. A shaft 13a of the planetary carrier 13 is disposed to rotatably penetrate the ring gear 14. Outer teeth 14a of the ring gear 14 are meshed with a gear 8, which is connected to the variable hydraulic motor 30.

The driving force transmission system 40 can be any one of various transmissions, such as one comprising a planetary gearing and a hydraulic clutch, or another comprising a planetary gearing and a solenoid clutch. The driving force transmission system 40 is finally connected to a tire 41 which is provided with a brake 42.

The operation of this embodiment thus constructed will be described below.

Figure 2:
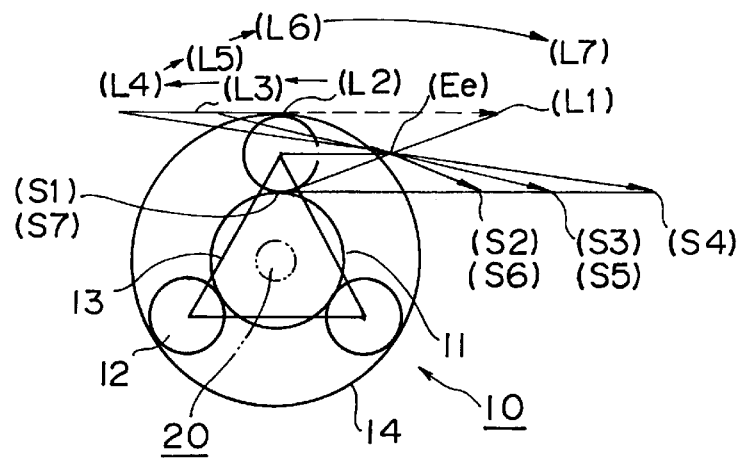
FIG. 2 is side view of a meshed state of a differential planetary gearing according to the first embodiment, the view showing rotational speeds of an engine, a mechanical supercharger, and a variable hydraulic motor.
Figure 3:
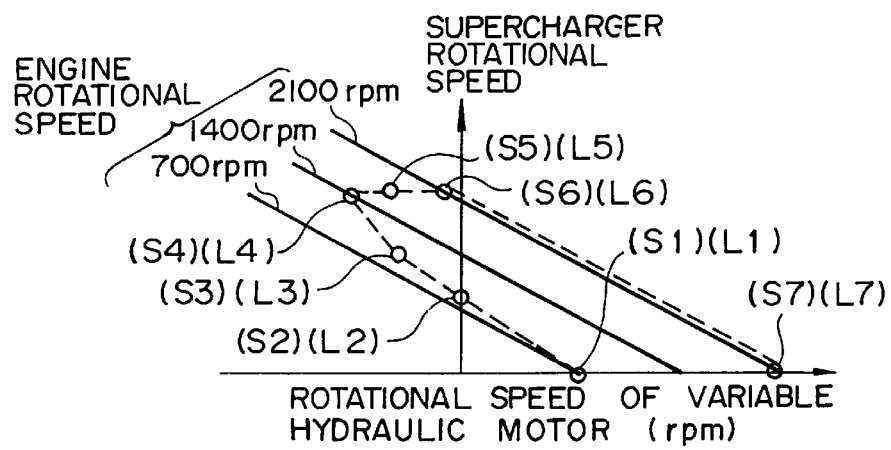
FIG. 3 is a graph for explaining the relationship between the rotational speeds of the engine, the mechanical supercharger, and the variable hydraulic motor according to the first embodiment.

First, the relationship between the rotational speeds of the engine 1, the differential planetary gearing 10, the mechanical supercharger 20, and the variable hydraulic motor 30 will be described with reference to FIGS. 2 and 3. FIG. 2 is a side view of a meshed state of the differential planetary gearing 10. The mechanical supercharger 20 is connected to the sun gear 11 at the center, the engine 1 is coupled to the three planetary gears 12 on the outer side of the sun gear 11 through the planetary carrier 13 (and through the gears 6 and 7 as shown in FIG. 1), and the variable hydraulic motor 30 is coupled to the ring gear 14 on the outer side (i.e., to the gear 8 through the outer teeth 14a and the gear 8 as shown in FIG. 1). FIG. 3 is a graph showing the relationship between the respective rotational speeds, in which the horizontal axis represents the rotational speed of the variable hydraulic motor 30, the vertical axis represents the rotational speed of the mechanical supercharger 20, and the solid oblique lines represent some rotational speeds of the engine 1.

In FIG. 3, the position (S1) indicates a state that the engine 1 is rotating at a rotational speed of 700 rpm, the rotational speed of the mechanical supercharger 20 is zero (stopped), and the variable hydraulic motor 30 is idling at a predetermined rotational speed while being supplied with oil from the variable hydraulic pump 50 through a neutral position (I) of the solenoid selector valve 52. At this time, an energy loss is reduced by setting a swash plate of the variable hydraulic motor 30 to an upright position so that the displacement volume (delivery capacity) is zero. Also, at this time, air is supplied to the engine 1 through natural suction (without being supercharged) with the on/off valve 22 being open. In this condition, referring to FIG. 2, the rotational speed 700 rpm of the engine 1 becomes the rotational speed of the planetary gears 12 and is represented by (Ee) in FIG. 2. The rotational speed of the variable hydraulic motor 30 becomes the rotational speed of the ring gear 14 and is represented by the position (L1) in FIG. 2. The rotational speed of the mechanical supercharger 20 becomes the rotational speed of the sun gear 11 and is represented by the position (S1) in FIG. 2.

In the following, the symbols (S1), (S2) . . . indicate successive positions from the start position of a construction machine, such as a wheel loader shown in FIG. 4, and correspond respectively to the position symbols (S1), (S2) . . . in FIGS. 2 and 3. In this respect, the position symbols (S1), (S2) . . . in FIGS. 2 and 3 indicate respective rotational speeds of the mechanical supercharger 20. Similarly, the symbols (L1), (L2) . . . in FIGS. 2 and 3 correspond to each other. The symbols (L1), (L2) . . . indicate respective rotational speeds of the variable hydraulic motor 30.

Next, when the accelerator pedal depression sensor 62 detects that the accelerator pedal 61 is operated to raise the rotational speed of the engine 1, the controller 60 sends a command to the servo valve 30a for the hydraulic motor 30, and also outputs a command to the solenoid selector valve 52. In response to the commands, the servo valve 30a inclines the swash plate of the variable hydraulic motor 30 to such an extent that the motor 30 provides a predetermined displacement volume, and the solenoid selector valve 52 is shifted to a position (ii). The return line 35 extended from the variable hydraulic motor 30 is thereby cut off by the solenoid selector valve 52, causing a pressure to be exerted on the variable hydraulic motor 30 to stop the motor 30. Upon the stopping of the motor 30, the mechanical supercharger 20 starts rotating at a predetermined rotational speed.

At this time, the on/off valve 25 on the delivery side of the mechanical supercharger 20 is opened in accordance with a command from the controller 60. In this condition, the rotational speed of the variable hydraulic motor 30 is in the position (L2) in FIG. 2, and the rotational speed of the mechanical supercharger 20 is in the position (S2) in FIGS. 2 and 3.

When the mechanical supercharger 20 is rotated to supply air to the engine 1. The engine 1 quickly increases its rotational speed responsive to the amount of the depression of the accelerator pedal 61. The engine revolution number sensor 63 detects that the engine rotational speed has increased to a predetermined speed, whereupon the controller 60 sends a command to the servo valve 50a for the variable capacity hydraulic pump 50, causing the hydraulic pump 50 to deliver pressurized oil, and also sends a command to the servo valve 30a to incline the swash plate of the variable hydraulic motor 30 to such an extent that the motor 30 provides a predetermined displacement volume. Simultaneously, the controller 60 outputs a command to the solenoid selector valve 52 to shift it to its position (iii). The pressurized oil is supplied from the variable capacity hydraulic pump 50 to the variable hydraulic motor 30 through the solenoid selector valve 52 for rotating the motor 30 at a predetermined rotational speed. In this condition, the rotational speed of the variable hydraulic motor 30 is in the position (L3) in FIG. 2, and the rotational speed of the mechanical supercharger 20 is in the position (S3) in FIGS. 2 and 3.

When the rotational speed of the engine 1 is further increased to 1400 rpm, for example, this is detected by the engine revolution number sensor 63 as with the above case, whereupon the controller 60 sends a command to the servo valve 50a for the variable hydraulic pump 50, causing the hydraulic pump 50 to increase the delivery rate of the pressurized oil so that the variable hydraulic motor 30 rotates at a higher predetermined rotational speed. As a result, the rotational speed of the mechanical supercharger 20 is quickly increased not only with an increase in the rotational speed of the engine 1, but also with the driving of the motor 30. The resulting position is indicated by (L4) in FIG. 2 and (S4) in FIGS. 2 and 3.

When the rotational speed of the engine 1 is further increased over 1400 rpm, for example, this is detected by the engine revolution number sensor 63 as with the above case, whereupon the controller 60 sends a command to the servo valve 50a for the variable hydraulic pump 50, causing the hydraulic pump 50 to decrease a delivery rate of the pressurized oil so that the rotational speed of the variable hydraulic motor 30 is reduced to a predetermined speed. This reduces the rotational speed of the mechanical supercharger 20 to the extent it is driven responsive to the rotational speed of the variable hydraulic motor 30. But, on the other hand, since the rotational speed of the mechanical supercharger 20 is increased with an increase in the rotational speed of the engine 1, the rotational speed of the mechanical supercharger 20 is maintained at a substantially constant speed, and the amount of air supplied to the engine 1 is also maintained substantially constant. Therefore, the supply of excessive air is prevented, and an energy loss can be reduced. The resulting position is indicated by (L5) in FIG. 2 and (S5) in FIGS. 2 and 3.

When the rotational speed of the engine 1 reaches 2100 rpm, for example, the delivery rate of the pressurized oil from the variable hydraulic pump 50 is further decreased as with the above case, whereby the rotational speed of the variable hydraulic motor 30 is slowed down to a lower predetermined speed. This further reduces the rotational speed of the mechanical supercharger 20; therefore, the amount of air supplied to the engine 1 is reduced. The resulting position is indicated by (L6) in FIG. 2 and (S6) in FIGS. 2 and 3.

When the rotational speed of the engine 1 is stabilized at 2100 rpm, for example, the rotational speed of the mechanical supercharger 20 is made to be zero (stopped) for the purposes of avoiding the supply of excessive air and also preventing a loss of mechanical energy of the mechanical supercharger 20. As with the case of 700 rpm, the variable hydraulic motor 30 is idling at a predetermined rotational speed while being supplied with the oil from the variable hydraulic pump 50 through the neutral position (I) of the solenoid selector valve 52. At this time, the energy loss is reduced by setting the swash plate of the variable hydraulic motor 30 to its upright position so that the displacement volume is zero, as stated above. Also, at this time, the on/off valve 25 on the delivery side of the mechanical supercharger 20 is closed in accordance with a command from the controller 60, while the on/off valve 22 is opened to perform the natural air suction. It is therefore possible to eliminate the supply of excessive air and to reduce the energy loss. The resulting position is indicated by (L7) in FIG. 2 and (S7) in FIGS. 2 and 3.

Thus, by utilizing a hydraulic source, which is for use in work carried out by industrial vehicles, construction machines, etc., a differential driving system for the mechanical supercharger can be achieved which is simple in structure, inexpensive, and highly efficient.

Next, a description will be made of the case where this embodiment is applied to a vehicle, e.g., a construction vehicle such as a wheel loader.

Figure 4:
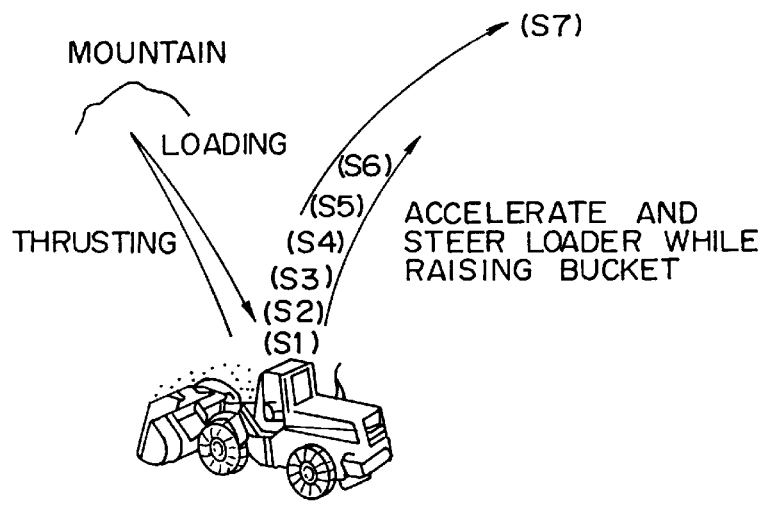
FIG. 4 is an illustration showing a work condition of a wheel loader.
Figure 5:
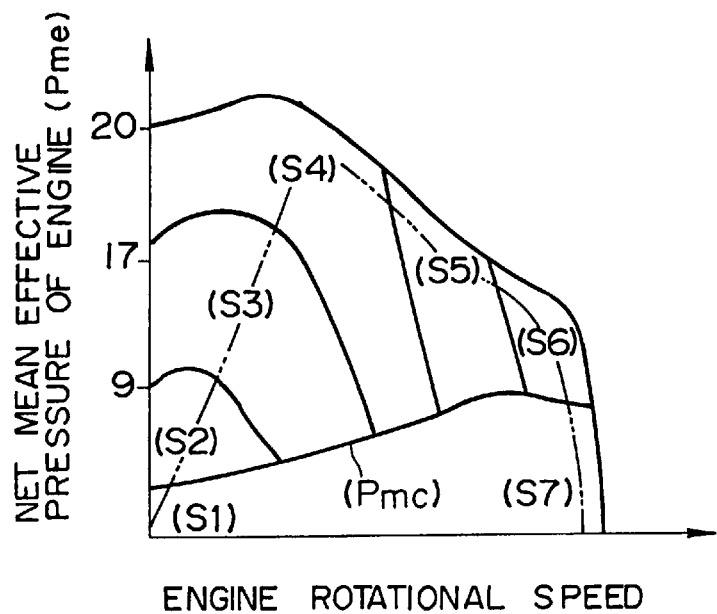
FIG. 5 is a graph showing conditions of the engine and the air supply during the work of a vehicle according to the first embodiment of the present invention, in which the horizontal axis represents an engine rotational speed, the vertical axis represents a net mean effective pressure Pme per cycle of the engine, and the solid lines demarcate different zones depending on the amount of air supplied by the mechanical supercharger and natural suction.

FIG. 4 is an illustration showing a work condition of a wheel loader. Specifically, FIG. 4 shows successive work steps of thrusting into a sand mountain or the like from a stopped state, loading sand, moving backwardly and stopping (S1), then coming closer to a dump truck or the like while moving forwardly under acceleration [(S2) to (S6)], and then unloading the sand after stopping (S7). FIG. 5 is a graph showing conditions of the engine and the air supply during the work of the wheel loader, in which the horizontal axis represents an engine rotational speed, the vertical axis-represents a net mean effective pressure Pme per cycle of the engine, and the solid lines demarcate different zones, depending on the amount of air supplied by the mechanical supercharger 20 and the natural suction. Note that since the symbol positions (S1), (S2) . . . used in FIGS. 2 to 5 correspond to each other between the figures, the relationship between the rotational speeds of the engine, the supercharger, and the hydraulic motor will not be described, and the rotational speed of the mechanical supercharger and the net mean effective pressure Pme will be described below.

In FIG. 4, the position (S1) represents a state where the wheel loader is stopped after moving backwardly, and hence where the rotational speed of the mechanical supercharger 20 is zero (stopped) and the net mean effective pressure Pme is not beyond a line (Pmc) with the engine 1 operating under the natural air suction.

Then, when the accelerator pedal 1 is depressed for raising the rotational speed of the engine 1 from (S2) to (S3) in FIG. 4, thereby accelerating the vehicle, while the control lever 59 is operated to shift the selector valve 54 for raising a bucket, the engine 1 is now supplied with air from the mechanical supercharger 20 along a two-dot-chain line from the position (S1) in the region of natural air suction shown in FIG. 5. Correspondingly, the net mean effective pressure Pme increases from the region of (S2) to the region of (S3), and the rotational speed and the output of the engine quickly increase, thereby speeding up the vehicle.

Then, until the vehicle speed is further increased to reach a certain running speed, the amount of air supplied from the mechanical supercharger 20 is increased so that the net mean effective pressure Pme increases to enter the region of (S4) and the rotational speed and the output of the engine increase, thereby continually speeding up the vehicle.

As the vehicle speed increases and so does the engine rotational speed, the amount of air supplied from the mechanical supercharger 20 is kept almost constant to avoid the supply of excessive air. Also, at this time, based on the relationship between the engine rotational speed and the vehicle speed, the controller 60 sends a command to the solenoid 65a of the fuel injection pump 65 to control the amount of fuel injected to the engine 1, so that the net mean effective pressure Pme lowers and moves into the region of (S5).

After the vehicle speed has increased to a certain running speed, based on the relationship between the engine rotational speed and the vehicle speed, the controller 60 gradually reduces the rotational speed of the mechanical supercharger 20 to reduce the amount of air supplied from the mechanical supercharger 20 and, correspondingly, the net mean effective pressure Pme moves into the region of (S5). Then, when the rotational speed of the engine 1 reaches a higher predetermined speed, the mechanical supercharger 20 is stopped so that only the natural air suction is performed, and the net mean effective pressure Pme moves into the region of (S5) below the line (Pmc) where the engine rotational speed is high.

Figure 6:
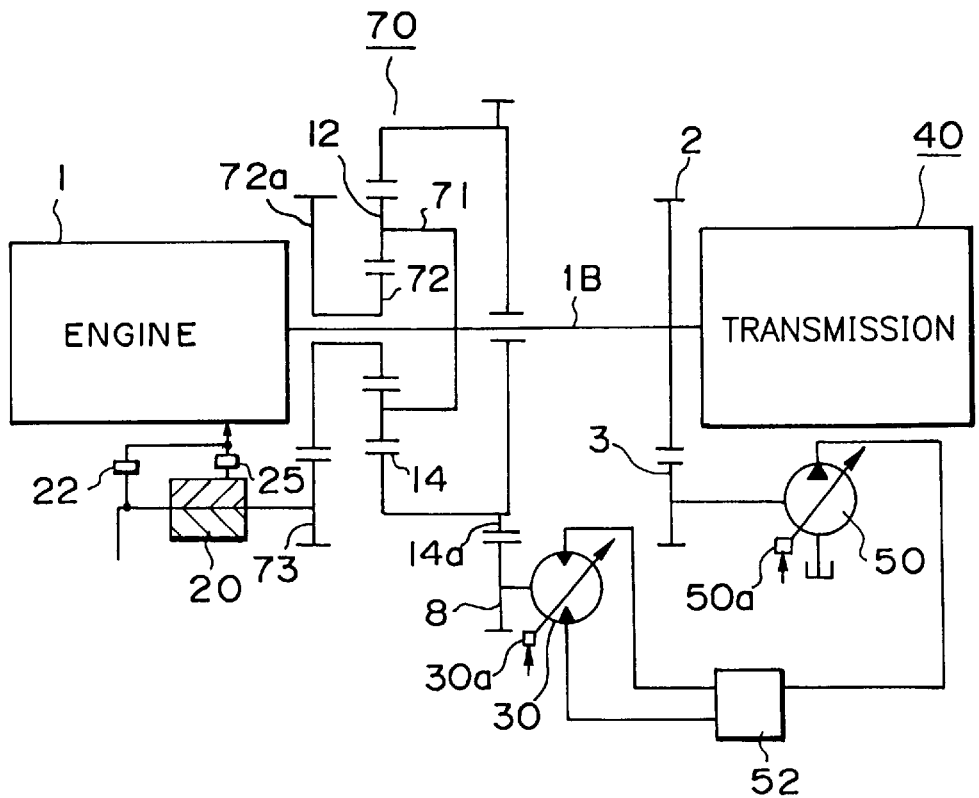
FIG. 6 is a conceptual diagram of a differential driving supercharger, the view showing a second embodiment of the present invention.

FIG. 6 is a conceptual diagram of a differential driving supercharger, the view showing a second embodiment of the present invention. The second embodiment is different from the first embodiment in the arrangement of a differential planetary gearing 70 and gears for driving a mechanical supercharger 20. While the second embodiment will be described hereinafter, the same parts as those in the first or other embodiments are denoted by the same reference numerals and will not be described below. Also, the following description will be made of only the construction of the differential planetary gearing 70 and the arrangement of a variable hydraulic pump 50 and a variable hydraulic motor 30 with omission of the description of the other components.

The differential planetary gearing 70 is disposed on an output shaft 1B of an engine 1 for driving a driving force transmission system 40 of a vehicle. Power of the engine 1 is inputted to the differential planetary gearing 70 through a planetary carrier 71, which is fixedly mounted on the engine output shaft 1B. Planetary gears 12, usually three in number, are rotatably mounted on the planetary carrier 71 with equal angular spacings therebetween. The three planetary gears 12 are each held in mesh with a sun gear 72 on the inner side and with a ring gear 14 on the outer side. A gear 73 is meshed with a gear 72a, which is branched from the sun gear 72, and the mechanical supercharger 20 is connected to the gear 73.

The second embodiment thus constructed operates in the same manner as in the first embodiment and, hence, the operation will not be described below.

Figure 7:
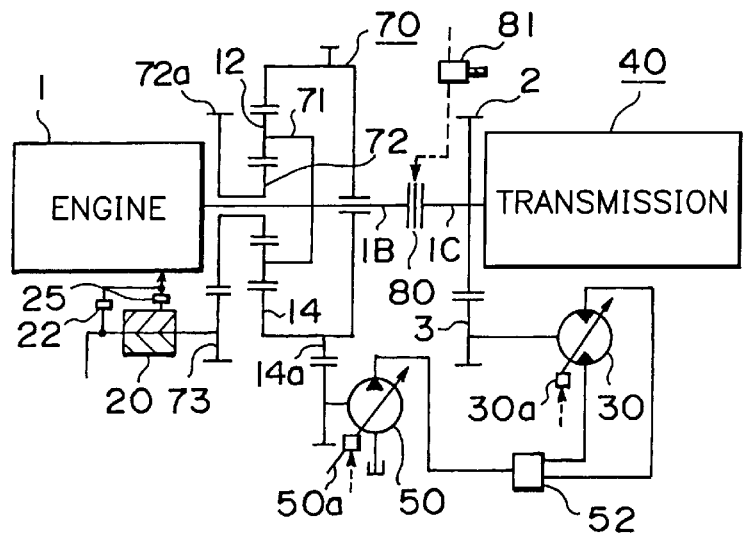
FIG. 7 is a conceptual diagram of a differential driving supercharger, the view showing a third embodiment of the present invention.

FIG. 7 is a conceptual diagram of a differential driving supercharger, the view showing a third embodiment of the present invention. The third embodiment is different from the second embodiment in that a clutch 80 is disposed between the differential planetary gearing 70 and the driving force transmission system 40, and that the variable hydraulic pump 50 is coupled to the differential planetary gearing 70 and the variable hydraulic motor 30 is coupled to the gear 3, on the side of the driving force transmission system 40 downstream of the clutch 80, in reversed relation to the second embodiment. The clutch 80 is engaged and disengaged with a hydraulic pressure supplied from a solenoid valve 81 in response to a command sent from the controller 60. The driving force transmission system 40 for a vehicle is connected to an output shaft 1C, which in turn is connected to the clutch 80.

The operation of this embodiment thus constructed will be described below.

Figure 8:
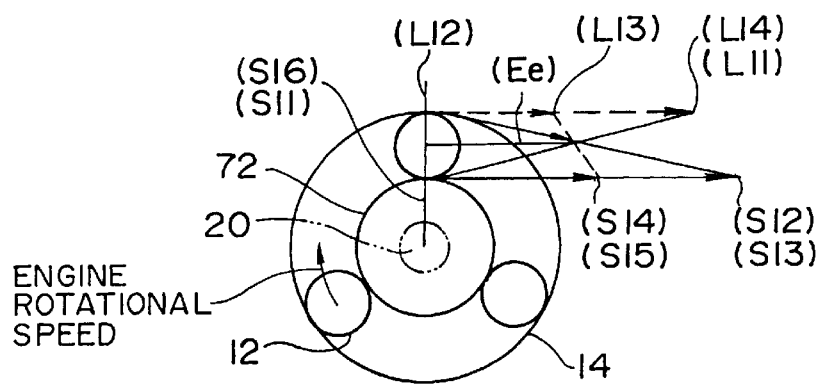
FIG. 8 is side view of a meshed state of a differential planetary gearing according to the third embodiment, the view showing rotational speeds of an engine, a mechanical supercharger, and a variable hydraulic motor.
Figure 9:
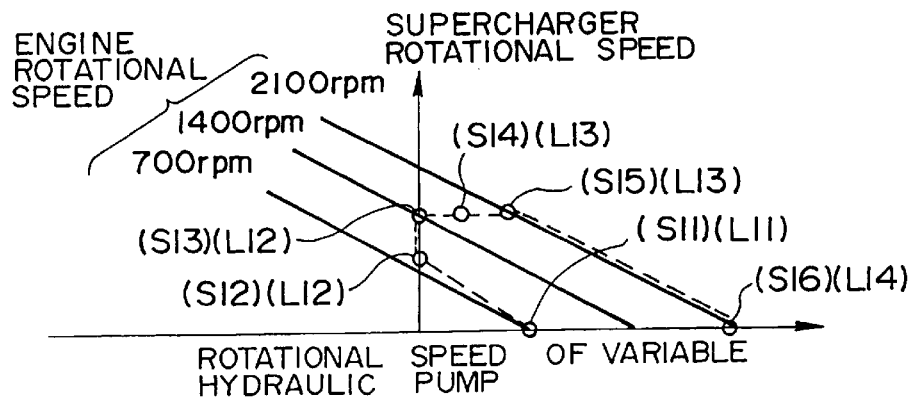
FIG. 9 is a graph for explaining the relationship between the rotational speeds of the engine, the mechanical supercharger, and the variable hydraulic motor according to the third embodiment.

First, the relationship between rotational speeds of the engine 1, the differential planetary gearing 70, the mechanical supercharger 20, and the variable hydraulic motor 30 will be described with reference to FIGS. 8 and 9. FIG. 8 is a side view of a meshed state of the differential planetary gearing 70. While the gear 73 is meshed with the gear 72a, which is branched from the sun gear 72, and the mechanical supercharger 20 is connected to the gear 73 in this embodiment, the mechanical supercharger 20 is shown as being connected to the sun gear 72 at the center in FIG. 8. The engine 1 is coupled to the three planetary gears 12 on the outer side of the sun gear 72 through the planetary carrier 71, and the variable hydraulic pump 50 is coupled to (meshed with) the outer teeth of the ring gear 14. FIG. 9 is a graph showing the relationship between the respective rotational speeds, in which the horizontal axis represents the rotational speed of the variable hydraulic pump 50, the vertical axis represents the rotational speed of the mechanical supercharger 20, and the solid oblique lines represent some rotational speeds of the engine 1.

In FIG. 9, the position (S11) indicates a state in which the engine 1 is rotating at a rotational speed of 700 rpm, the rotational speed of the mechanical supercharger 20 is zero (stopped), and the variable hydraulic pump 50 is idling at a predetermined rotational speed. At this time, an energy loss is reduced by setting a swash plate of the variable hydraulic pump 50 to its upright position so that the displacement volume is zero. Also, the solenoid valve 81 is in its neutral position in accordance with a command from the controller 60, and the clutch 80 is disengaged. Further, at this time, air is supplied to the engine 1 through natural suction (without supercharge) with the on/off valve 22 being open. In this condition, the rotational speed of the variable capacity hydraulic pump 50 is indicated by the position (L11) and the rotational speed of the mechanical supercharger 20 is indicated by the position (S11) in FIG. 8.

In the following, the respective rotational speeds of the mechanical supercharger 20 are indicated by (S11), (S12) . . . in FIG. 8, and the respective rotational speeds of the variable hydraulic pump 50 are indicated by (L11), (L12) . . . in FIG. 8.

Next, when the accelerator pedal depression sensor 62 detects that the accelerator pedal 61 is operated to raise the rotational speed of the engine 1, the controller 60 sends a command to the servo valve 50a for the hydraulic pump 50. In response to the command, the servo valve 50a inclines the swash plate of the variable hydraulic pump 50 to such an extent that the pump 50 provides a predetermined displacement volume. This exerts a pressure on the variable hydraulic pump 50 to stop its rotation. Upon the stopping of the variable hydraulic pump 50, the mechanical supercharger 20 starts rotating at a predetermined rotational speed. At this time, the on/off valve 25 on the delivery side of the mechanical supercharger 20 is opened in accordance with a command from the controller 60. The solenoid valve 81 is still in its neutral position in accordance with a command from the controller 60, and the clutch 80 is kept disengaged. Thus, the output torque of the engine 1 is not transmitted to the driving force transmission system 40. In this condition, the rotational speed of the variable hydraulic pump 50 is in the position (L12) in FIG. 8 and the rotational speed of the mechanical supercharger 20 is in the position (S12) in FIGS. 8 and 9.

When the mechanical supercharger 20 is rotated to supply air to the engine 1, the engine 1 quickly increases its rotational speed responsive to the amount of the depression of the accelerator pedal 61. While the engine revolution number sensor 63 is detecting an increase in the engine rotational speed, the controller 60 sends a command to the servo valve 50a, causing the variable hydraulic pump 50 to deliver pressurized oil to exert a load on itself so that the pump 50 stops rotation. At this time, the rotational speed of the mechanical supercharger 20 is increased with an increase in the rotational speed of the engine 1. Such a process is continued until reaching 1400 rpm, for example. In this condition, the rotational speed of the variable hydraulic pump 50 is in the position (L12) in FIG. 8 and the rotational speed of the mechanical supercharger 20 is in the position (S13) in FIGS. 8 and 9.

When the rotational speed of the engine 1 is further increased over 1400 rpm, for example, this is detected by the engine revolution number sensor 63 as with the above case, whereupon the controller 60 sends commands to the servo valve 50a, a selector valve 52 and the servo valve 30a for the variable hydraulic motor 30. In response to the command, the selector valve 52 is operated to shift its position, whereupon the variable hydraulic pump 50 starts rotation to send the pressurized oil to the variable hydraulic motor 30. Upon receiving the command, the servo valve 30a inclines the swash plate of the variable hydraulic motor 30 so that the motor 30 provides a predetermined displacement volume. This enables the variable hydraulic motor 30 to start rotation, whereupon its output torque is transmitted to the driving force transmission system 40 for the vehicle from the output shaft 1C through the gears 2 and 3. As a result, a torque supply to the vehicle is abruptly commenced, allowing the vehicle to start running with good acceleration properties. Further, at this time, with an increase in the rotational speed of the engine 1 and the commencement of rotation of the variable hydraulic pump 50, the rotational speed of the mechanical supercharger 20 is maintained at a substantially constant speed, and the amount of air supplied to the engine 1 is also maintained substantially constant. Therefore, a supply of excessive air is prevented, and an energy loss can be reduced. The resulting position is indicated by (S14) in FIGS. 8 and 9 and (L13) in FIG. 8.

When the rotational speed of the engine 1 reaches 2100 rpm, for example, this is detected by the engine revolution number sensor 63 as with the above case, whereupon the solenoid valve 81 is shifted to its operable position in accordance with a command from the controller 60, thereby engaging the clutch 80. As a result, the output of the engine 1 is transmitted to the driving force transmission system 40 for the vehicle through the clutch 80 upon switching to direct driving. This results in higher efficiency than with hydraulic driving. On this occasion, while the vehicle driving load is still high, the rotational speed of the mechanical supercharger 20 is stabilized at a corresponding high speed so that the amount of air supplied to the engine 1 is continually ensured.

The resulting position is indicated by (S15), (L13) in FIGS. 8 and 9. In this condition, an energy loss is made zero by setting the swash plate of the variable hydraulic pump 50 to its upright position so that the displacement volume is zero for idling of the pump 50.

Next, when the vehicle comes into constant running and is stabilized under operation with a short load and at a high speed of not less than 2100 rpm, for example, the load resistance of the mechanical supercharger 20 is relatively increased and the rotational speed of the mechanical supercharger 20 becomes almost zero (stopped) for the balance. Also, at this time, the on/off valve 25 on the delivery side of the mechanical supercharger 20 is closed in accordance with a command from the controller 60, whereas the on/off valve 22 is opened to perform the natural air suction. It is therefore possible to eliminate the supply of excessive air and to reduce an energy loss. The resulting position is indicated by (S16), (L14) in FIGS. 8 and 9.

Next, a description will be made of the case where this embodiment is applied to a vehicle as with the above case.

Figure 10:
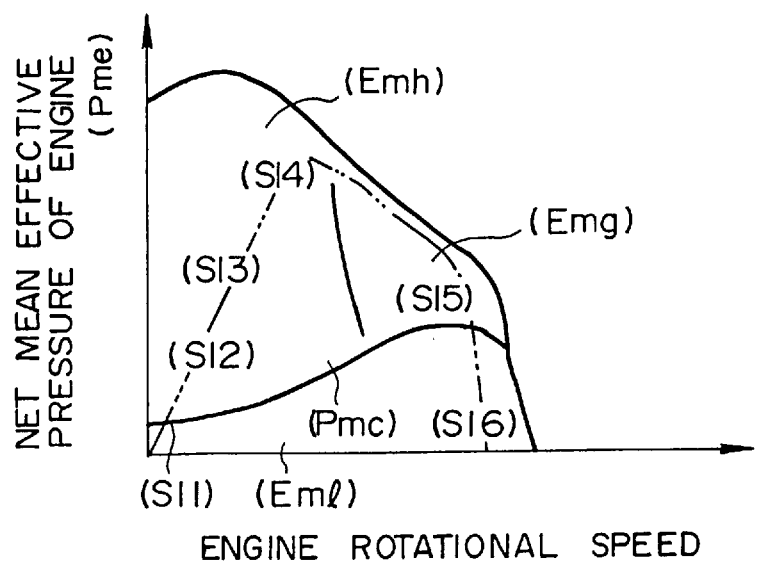
FIG. 10 is a graph showing conditions of the engine and the air supply during the work of a vehicle according to the third embodiment of the present invention.

In FIG. 10, similarly to FIG. 5, the horizontal axis represents an engine rotational speed, the vertical axis represents a net mean effective pressure Pme per cycle of the engine, and the solid lines demarcate different zones depending on the amount of air supplied by the mechanical supercharger 20 and the natural suction. The following description proceeds in conformity with an increase in the rotational speed of the engine 1 along the two-dot-chain line. Note that since the symbol positions (S11), (S12) . . . used in FIG. 9 correspond to the respective symbols in FIG. 10, the relationship between the rotational speeds of the engine, the supercharger, and the hydraulic motor will not be described, and the rotational speed of the mechanical supercharger 20 and the net mean effective pressure Pme will be described below.

In the region (Eml) where the rotational speed of the engine 1 is low, the wheel loader is stopped, the rotational speed of the mechanical supercharger 20 is zero (stopped), and the net mean effective pressure Pme is not beyond a line (Pmc) with the engine 1 operating under the natural air suction.

In the region (Emh), the mechanical supercharger 20 starts the supply of air therefrom. Correspondingly, the net mean effective pressure Pme increases and the rotational speed and the output of the engine quickly increase, thereby speeding up the vehicle.

In the region (Emg), until the vehicle speed is further increased to reach a certain running speed, the amount of air supplied from the mechanical supercharger 20 is increased so that the rotational speed and the output of the engine increase, thereby continually speeding up the vehicle. After reaching the certain running speed, based on the relationship between the engine rotational speed and the vehicle speed, the controller 60 gradually reduces the rotational speed of the mechanical supercharger 20 to thereby reduce the amount of air supplied from the mechanical supercharger 20. Then, when the rotational speed of the engine 1 reaches a higher predetermined speed, the mechanical supercharger 20 is stopped and only the natural air suction is performed, and the net mean effective pressure Pme moves into the region (Emc) below the line (Pmc) where the engine 1 rotates at a high speed.

Figure 11:
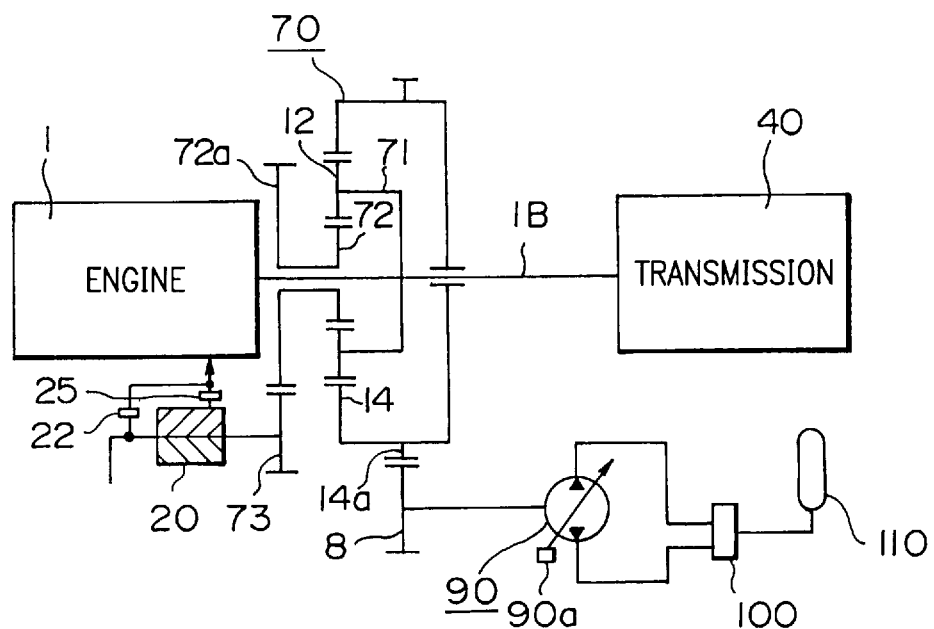
FIG. 11 is a conceptual diagram of a differential driving supercharger, the view showing a fourth embodiment of the present invention.

FIG. 11 is a conceptual diagram of a differential driving supercharger, the view showing a fourth embodiment of the present invention. The third embodiment includes the gear 8 held in mesh with the outer teeth 14a of the ring gear 14, the gear 8 being connected to the variable hydraulic motor 30, whereas the fourth embodiment includes a variable capacity hydraulic pump/motor 90 (hereinafter referred to as a hydraulic pump/motor 90) in place of the variable hydraulic motor 30, the hydraulic pump/motor 90 being connected to an accumulator 110 through a solenoid control valve 100.

Figure 12:
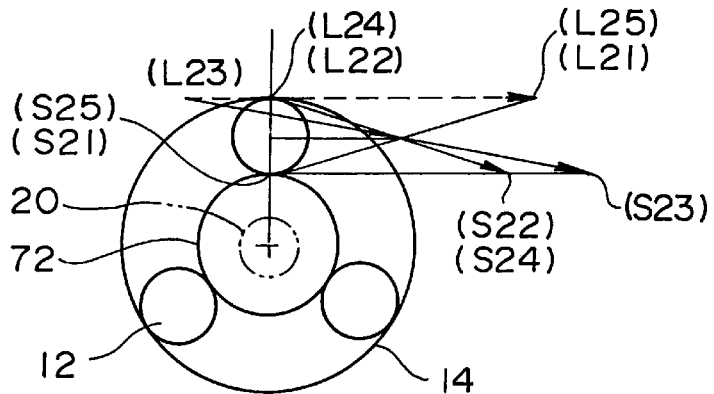
FIG. 12 is side view of a meshed state of a differential planetary gearing according to the fourth embodiment, the view showing rotational speeds of an engine, a mechanical supercharger, and a variable hydraulic motor.

The operation of this embodiment thus constructed will be described below. FIG. 12 shows the relationship between the rotational speeds of the engine 1, the differential planetary gearing 70, the mechanical supercharger 20, and the hydraulic pump/motor 90. FIG. 11 is a side view of a meshed state of the differential planetary gearing 70.

Figure 13:
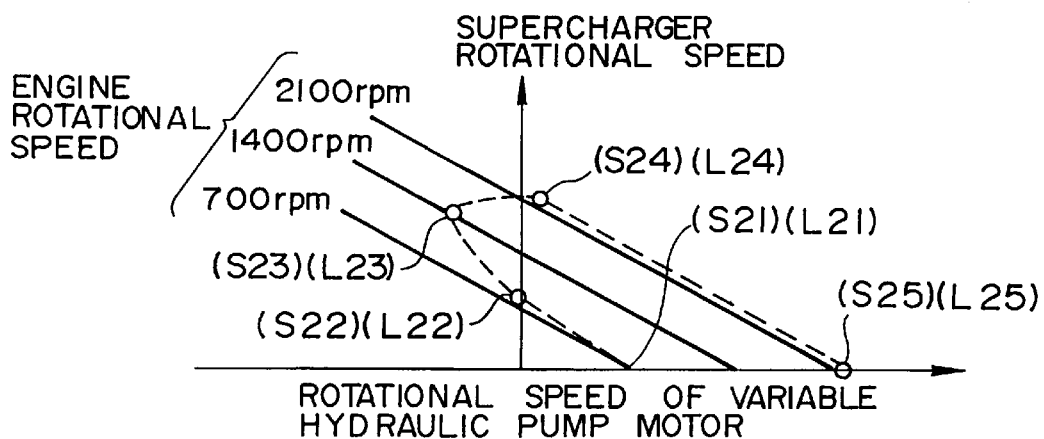
FIG. 13 is a graph for explaining the relationship between the rotational speeds of the engine, the mechanical supercharger, and the variable hydraulic motor according to the fourth embodiment.

In FIG. 13, the position (S21) indicates a state where the engine 1 is rotating at a rotational speed of 700 rpm, the rotational speed of the mechanical supercharger 20 is zero (stopped), and the hydraulic pump/motor 90 is rotating as a hydraulic pump at a predetermined rotational speed while building up a pressure in the accumulator 110. In this condition, the rotational speed of the hydraulic pump/motor 90 is represented by the position (L21) and the rotational speed of the mechanical supercharger 20 is represented by the position (S21).

Next, when the accelerator pedal depression sensor 62 detects that the accelerator pedal or the like is operated to raise the rotational speed of the engine 1 in the position (S21), the controller 60 sends a command to a servo valve 90a for the hydraulic pump/motor 90. In response to the command, the servo valve 90a inclines a swash plate of the hydraulic pump/motor 90 to such an extent that the hydraulic pump/motor 90 provides a predetermined displacement volume as a variable hydraulic pump. This exerts a pressure on the hydraulic pump/motor 90, acting as a hydraulic pump, to stop its rotation. Upon the stopping of the pump 90, the mechanical supercharger 20 starts rotating at a predetermined rotational speed. At this time, the on/off valve 25 on the delivery side of the mechanical supercharger 20 is opened in accordance with a command from the controller 60.

In this condition, the rotational speed of the hydraulic pump/motor 90 is indicated by the position (L22) and the rotational speed of the mechanical supercharger 20 is indicated by the position (S22).

When the mechanical supercharger 20 is rotated to supply air to the engine 1, the engine 1 quickly increases its rotational speed responsive to the amount of the depression of the accelerator pedal or the like. While the engine revolution number sensor 63 is detecting an increase in the engine rotational speed, the controller 60 outputs a command to the solenoid control valve 100 to establish communication from the accumulator 110 to the hydraulic pump/motor 90. At the same time, the controller 60 sends a command to a servo valve 90a, for the hydraulic pump/motor 90 and, upon receiving the command, the servo valve 90a inclines the swash plate of the hydraulic pump/motor 90 to such an extent that the hydraulic pump/motor 90 provides a predetermined displacement volume as a variable hydraulic motor. Accordingly, the hydraulic pump/motor 90 receives pressurized oil from the accumulator 110 and starts rotating as a hydraulic motor, thereby quickly increasing the rotational speed of the mechanical supercharger 20 from (S22) to (S23).

In this condition, the rotational speed of the hydraulic pump/motor 90 is indicated by the position (L23) and the rotational speed of the mechanical supercharger 20 is indicated by the position (S23).

When the rotational speed of the engine 1 is further increased until reaching 2100 rpm, for example, such a speed increase is detected by the engine revolution number sensor 63 as with the above case, whereupon the controller 60 sends a command to the servo valve 90*a* for the hydraulic pump/motor 90 and, in response to the command, the servo valve 90*a* increases a tilting of the swash plate to enlarge the displacement volume so that the rotational speed of the hydraulic pump/motor 90 serving as a hydraulic motor is reduced to thereby adjust the amount of air supplied to the engine 1.

In this condition, the rotational speed of the hydraulic pump/motor 90 is indicated by the position (L24) and the rotational speed of the mechanical supercharger 20 is indicated by the position (S24).

When the rotational speed of the engine 1 is stabilized at a speed not less than 2100 rpm, for example, the hydraulic pump/motor 90 rotates as a variable hydraulic pump at a predetermined rotational speed while building up a pressure in the accumulator 110. Then, upon the pressure in the accumulator 110 reaching a predetermined value, the hydraulic pump/motor 90 starts idling.

In this condition, the rotational speed of the hydraulic pump/motor 90 is indicated by the position (L25) and the rotational speed of the mechanical supercharger 20 is indicated by the position (S25).

At this time, for preventing a mechanical energy loss of the mechanical supercharger 20, the rotational speed of the mechanical supercharger 20 is made almost zero (stopped). Also, at this time, the on/off valve 24 on the delivery side of the mechanical supercharger 20 is closed in accordance with a command from the controller 60, whereas the on/off valve 22 is opened to perform the natural air suction. It is therefore possible to eliminate the supply of excessive air and to reduce an energy loss. As an alternative, the supercharge pressure from the mechanical supercharger 20 is reduced by a solenoid relief valve for unloading.

Figure 14:
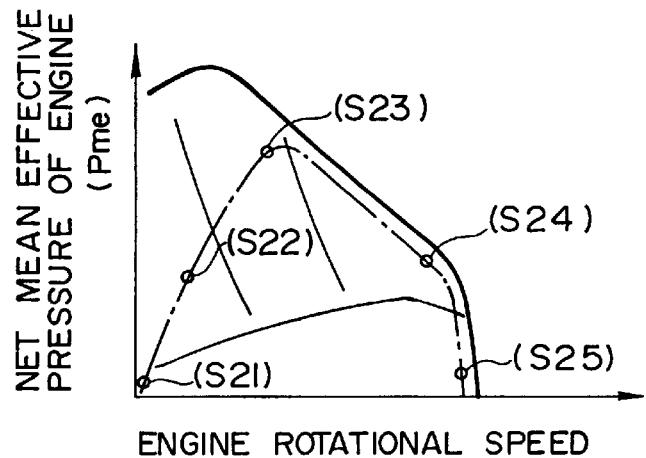
FIG. 14 is a graph showing conditions of the engine and the air supply during the work of a vehicle according to the fourth embodiment of the present invention.

FIG. 14 shows the rotational speed of the mechanical supercharger 20 versus a net mean effective pressure Pme. But a description will not be made because this fourth embodiment is different from the third embodiment just in the number of zones divided according to the amount of air supplied by the mechanical supercharger 20, and the natural suction is increased when applied to the vehicle shown in FIG. 4 as with the above case.

Figure 15:
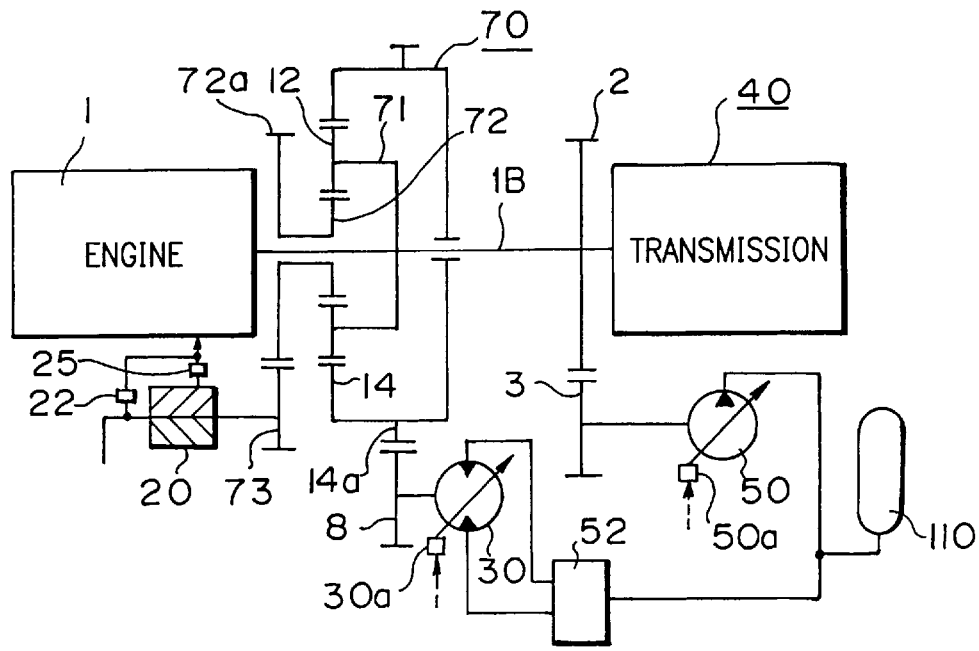
FIG. 15 is a conceptual diagram of a differential driving supercharger, the view showing a fifth embodiment of the present invention.

FIG. 15 is a conceptual diagram of a differential driving supercharger, the view showing a fifth embodiment of the present invention. This fifth embodiment is constituted by modifying the second embodiment so as to include the accumulator 110 used in the fourth embodiment. In the fifth embodiment, the accumulator 110 is disposed between the variable hydraulic pump 50 and the selector valve 53.

When the rotational speed of the mechanical supercharger 20 is quickly increased, the controller 60 outputs a command to a solenoid proportional valve (not shown), which in turn operates the solenoid valve 53, to connect the variable hydraulic pump 50 and the accumulator 110 with the variable hydraulic motor 30, whereupon the pressurized oil is supplied not only from the variable hydraulic pump 50 but also from the accumulator 110 to rotate the variable hydraulic motor 30, thereby rotating the mechanical supercharger 20 through the ring gear 14.

When the rotational speed of the mechanical supercharger 20 is zero, the pressurized oil from the variable hydraulic pump 50 is stored in the accumulator 110. Then, upon the pressure built up in the accumulator 110 reaching a predetermined value, the variable hydraulic pump 50 starts idling.

The relationship between the respective rotational speeds or the behavior when applied to the vehicle is substantially the same as in the fourth embodiment and, hence, will not be described here.

Figure 16:
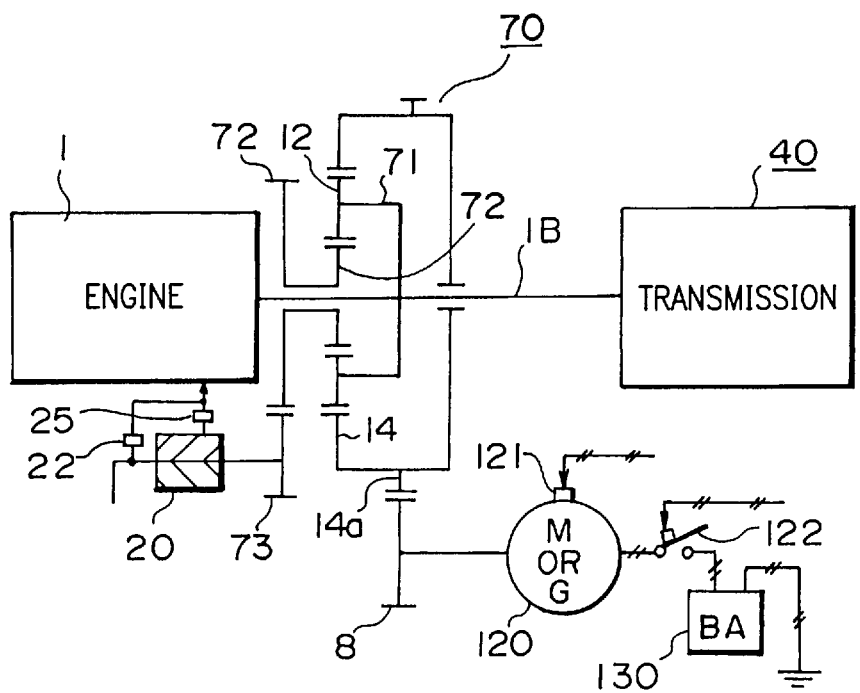
FIG. 16 is a conceptual diagram of a differential driving supercharger, the view showing a sixth embodiment of the present invention.

FIG. 16 is a conceptual diagram of a differential driving supercharger, the view showing a sixth embodiment of the present invention. This sixth embodiment includes an electric generator/motor 120 in place of the hydraulic pump/motor 90 in the fourth embodiment and a battery 130 in place of the accumulator 110. A control unit 121, for the electric generator/motor 120, and a change-over switch 122 are connected to the controller 60 and operated to effect switching between the electric generator status and the motor status.

The electric generator and motor is switched from one to the other in a like manner to the fourth embodiment. Specifically, when the rotational speed of the mechanical supercharger 20 is quickly increased, the electric generator and motor 120 operates as a motor. When the rotational speed of the mechanical supercharger 20 is made zero, the electric generator and motor 120 operates as a generator for applying a load to the planetary gearing 70. The relationship between the respective rotational speeds or the behavior when applied to the vehicle is substantially the same as in the fourth embodiment and, hence, will not be described here.

Figure 17:
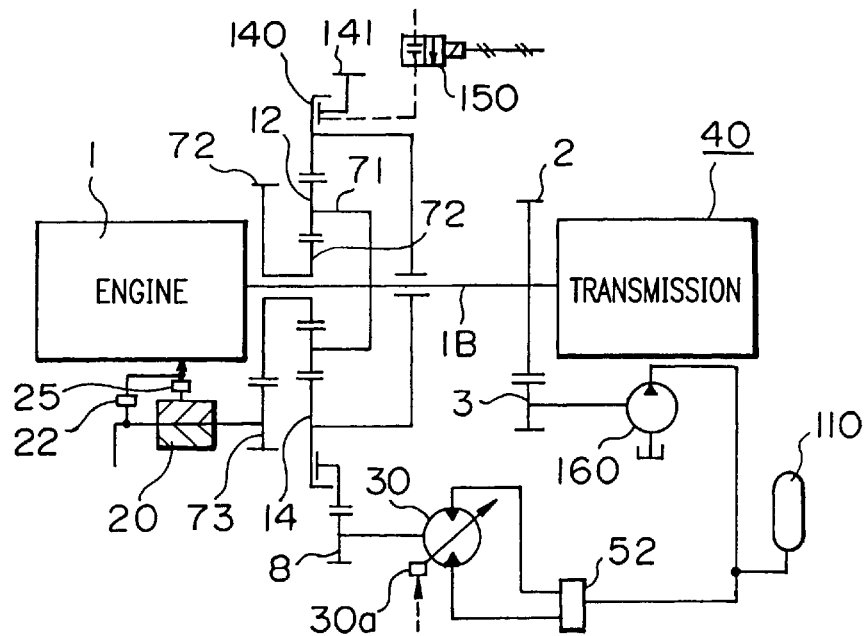
FIG. 17 is a conceptual diagram of a differential driving supercharger, the view showing a seventh embodiment of the present invention.

FIG. 17 is a conceptual diagram of a differential driving supercharger, the view showing a seventh embodiment of the present invention. In the first embodiment, for example, the variable capacity hydraulic motor 30 is connected to the gear 8, held in mesh with the outer teeth 14*a* of the ring gear 14, whereas this seventh embodiment includes a clutch 140 and a gear 141 coupled to the clutch 140 between the ring gear 14 and the gear 8, so that the variable hydraulic motor 30 is rotated when the clutch 140 is engaged. The clutch 140 is operated to engage and disengage under a hydraulic pressure supplied through a solenoid valve 150 in accordance with a command from the controller 60. Further, the hydraulic pump 160 is a fixed capacity hydraulic pump.

When the clutch 140 is engaged, the variable hydraulic motor 30 starts rotating through the ring gear 14 to quickly increase the rotational speed of the mechanical supercharger 20. In this process, the rotational speed of the variable hydraulic motor 30 is controlled by the servo valve 30*a* for the variable hydraulic motor 30, while receiving a fixed delivery rate from the fixed capacity hydraulic pump 160.

When the coupling between the ring gear 14 and the gear 8 is to be disconnected at the clutch 140 corresponding to the case in the foregoing embodiment where the variable hydraulic motor 30 is caused to idle at a predetermined rotational speed, the clutch 140 is disengaged in the seventh embodiment to reduce an energy loss without rotating the variable hydraulic motor 30. This represents a state where the rotational speed of the engine 1 is low or high and air is supplied to the engine 1 through the natural suction (without supercharge) with the on/off valve 22 being open.

Figure 18:
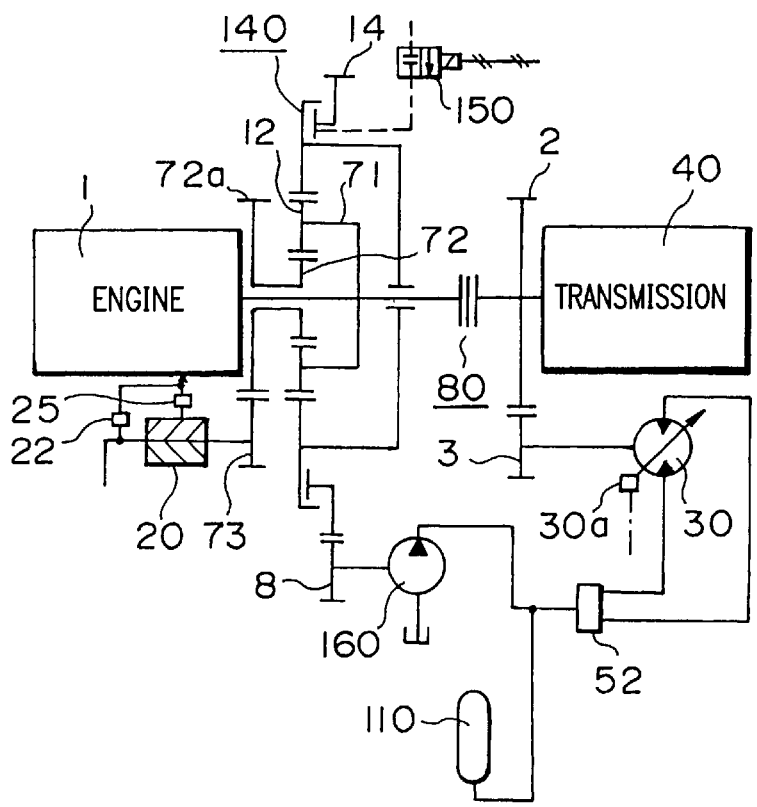
FIG. 18 is a conceptual diagram of a differential driving supercharger, the view showing an eighth embodiment of the present invention.

FIG. 18 is a conceptual diagram of a differential driving supercharger, the view showing an eighth embodiment of the present invention. As compared with the seventh embodiment, for example, which includes the variable hydraulic motor 30, this eighth embodiment includes a fixed capacity hydraulic pump 160 in place of the variable hydraulic motor 30, the pump 160 being rotated when the clutch 140 is engaged. The clutch 140 is operated to engage and disengage under a hydraulic pressure supplied through the solenoid valve 150 in accordance with a command from the controller 60.

When the clutch 140 is engaged, the fixed capacity hydraulic pump 160 is set to provide a predetermined displacement volume so that a pressure exerts on the variable hydraulic pump 160 to stop its rotation. Upon the stopping of the pump 160, the mechanical supercharger 20 starts rotating at a predetermined rotational speed. In the case of using a hydraulic pump/motor, the variable hydraulic pump is rotated as a hydraulic motor to quickly increase the rotational speed of the mechanical supercharger 20. Further, when the rotational speed of the engine 1 is low or high, a pressure is built up in the accumulator 110. Then, upon the pressure built up in the accumulator 110 reaching a predetermined value, the clutch 140 is disengaged.

When the coupling between the ring gear 14 and the gear 8 is to be disconnected at the clutch 140 corresponding to the case in the foregoing embodiment where the variable hydraulic pump 50 is caused to idle at a predetermined rotational speed, the clutch 140 is disengaged in the eighth embodiment to reduce an energy loss without rotating the fixed capacity hydraulic pump 160. This represents a state where the rotational speed of the engine 1 is low or high and air is supplied to the engine 1 through the natural suction (without supercharge) with the on/off valve 22 being open.

While the above seventh and eighth embodiments are shown as using a fixed capacity hydraulic pump as a rotary variable load body, the rotary variable load body can be any of a fixed or variable capacity pump, a fixed or variable capacity motor, a pump/motor serving as a fixed or variable capacity pump and motor, a generator, a motor, a generator/motor serving as a generator and motor, and an air compressor. Also, the variable capacity type described above can be of the fixed capacity type. Furthermore, it is needless to say that the above embodiments are described as being constructed in a hydraulic manner, but can be constructed in a pneumatic manner. Some of the above embodiments can be combined with each other.

While most of the above-described embodiments employ hydraulic arrangements, the same operation can also be achieved by separately using an electric generator and a motor such that the variable hydraulic pump and the variable hydraulic motor in the first embodiment are replaced, respectively, by the electric generator and the motor.

The above embodiments employ one stage of differential planetary gearing, but can comprise two or more stages of differential planetary gearings.

Figure 19:
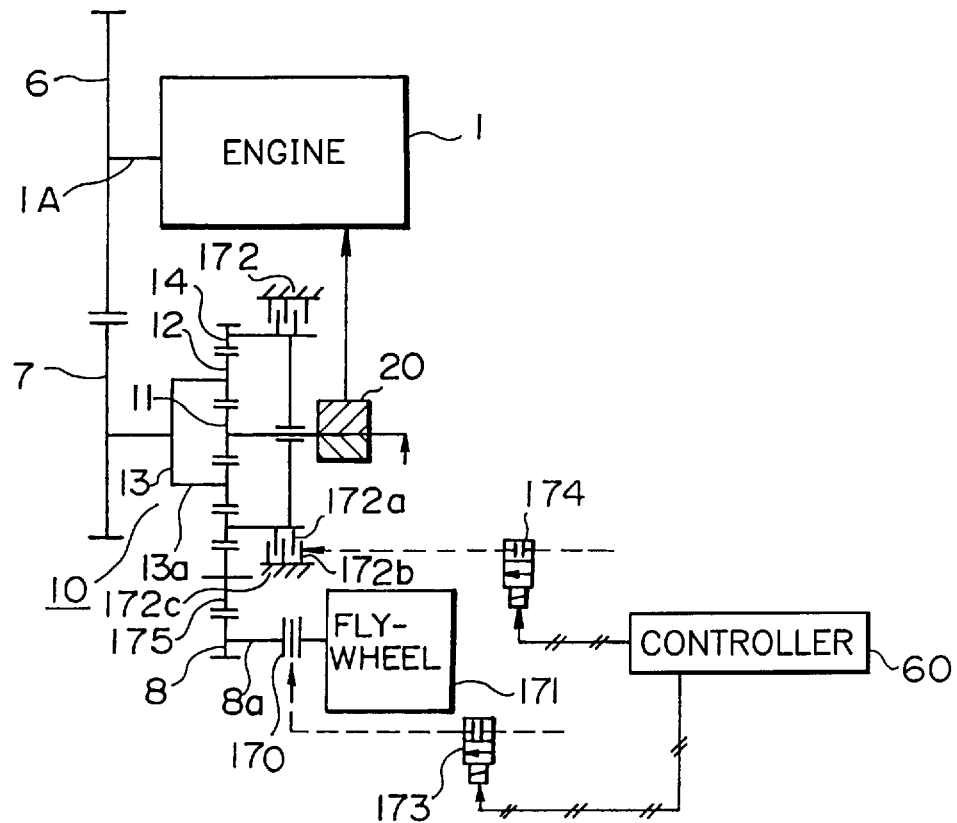
FIG. 19 is a conceptual diagram of a differential driving supercharger, the view showing a ninth embodiment of the present invention.

FIG. 19 is a conceptual diagram of a differential driving supercharger, the view showing a ninth embodiment of the present invention. The first embodiment includes the mechanical supercharger 20 and the variable hydraulic motor 30, whereas the ninth embodiment includes the mechanical supercharger 20, a brake unit 172, a clutch unit 170, and a flywheel 171 connected to the clutch unit 170 in association with the differential planetary gearing 10.

The ninth embodiment will be described hereinafter, but the same parts as those in the first or other embodiments are denoted by the same reference numerals and will not be described below. Also, the sensors and other parts associated with the controller 60 are omitted from the figure for the sake of simplicity.

Further, the following description will be made of only the construction of the differential planetary gearing 10 and the arrangement of a variable hydraulic pump and a variable hydraulic motor with omission of other components. In the differential planetary gearing 10, the gear 8 is held in mesh with the outer teeth 14a of the ring gear 14 through a gear 175, the clutch unit 170 is connected to a shaft 8a of the gear 8, and the flywheel 171 is connected to the clutch unit 170. On the outer side of the ring gear 14, the brake plates 172a of the brake unit 172 are attached to the ring gear 14, and the fixed-side brake plates 172b are attached to a fixed case 172c, such that both of the brake plates 172a and 172b are relatively slidable in the axial direction and are in interdigitated relation. In accordance with respective commands from the controller 60, the clutch unit 170 is operated to engage and disengage a clutch in the clutch unit 170 under a hydraulic pressure supplied through a clutch solenoid valve 173, and the brake unit 172 is operated to engage and disengage the brake plates 172a and the fixed-side brake plates 172b under a hydraulic pressure supplied through a brake solenoid valve 174.

The operation of this embodiment thus constructed will be described below.

Figure 20:
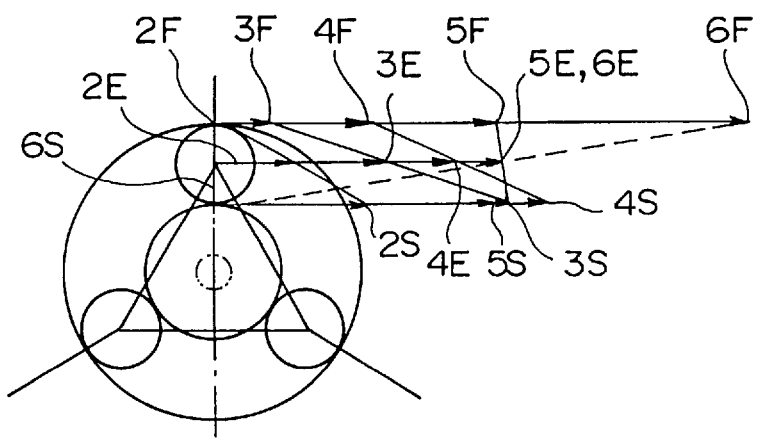
FIG. 20 is side view of a meshed state of a differential planetary gearing according to the ninth embodiment, the view showing rotational speeds of an engine, a mechanical supercharger, and a flywheel (ring gear).
Figure 21:
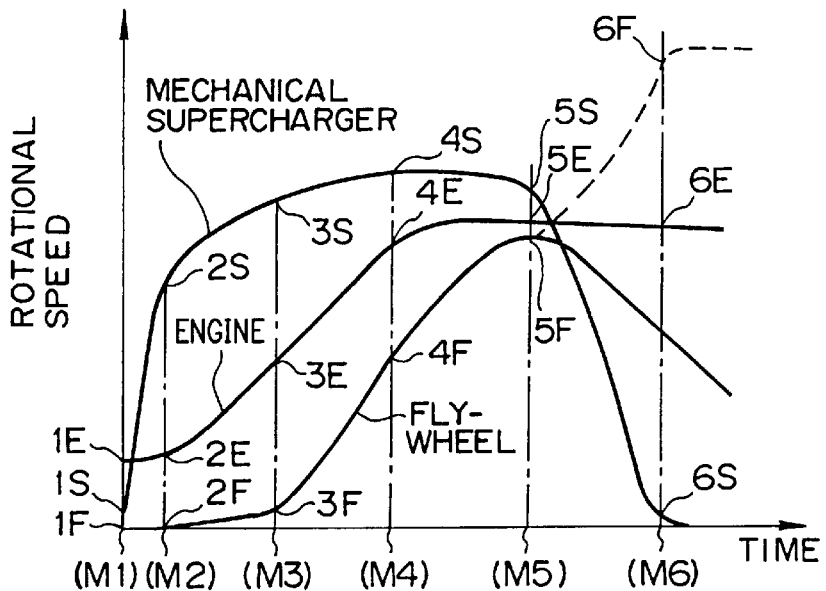
FIG. 21 is a graph for explaining the relationship between the rotational speeds of the engine, the mechanical supercharger, and the flywheel according to the ninth embodiment.

First, a description will be made with reference to FIGS. 20 and 21. FIG. 20 illustrates the relationship between the rotational speeds of the engine 1, the differential planetary gearing 10, the mechanical supercharger 20, the clutch unit 170, the flywheel 171, and the brake unit 172. FIG. 21 is a graph showing the relationship between the respective rotational speeds, in which the horizontal axis represents time and the vertical axis represents the rotational speeds of the engine 1, the mechanical supercharger 20, and the flywheel 171.

(A-1) VEHICLE STOPPED STATE

In FIG. 21, at the time (M1), the vehicle is stopped and the engine 1 is idling at a low rotational speed of 700 rpm, for example, and the rotational speeds of the mechanical supercharger 20 and the flywheel 171 are zero (stopped). At this time, based on signals from the accelerator pedal depression sensor 62, the vehicle speed sensor 64, and the control lever position sensor 67, the controller 60 outputs a command to the clutch solenoid valve 173 to disengage the clutch of the clutch unit 170, allowing the flywheel 171 to freely rotate. For the brake unit 172, the controller 60 also outputs a command to the brake solenoid valve 174, allowing the brake unit 172 to freely rotate. Therefore, the planetary gears 12, the planetary carrier 13, and the ring gear 14 of the differential planetary gearing 10 are idly rotating at a variable speed, depending on both of the rotational speed of the engine 1 and the gear ratio between the gear 8 and the ring gear 14.

(B-1) VEHICLE START-UP STATE FROM STOPPED STATE

A description will now be made of a state of starting the vehicle from the stopped state. When starting the vehicle from the stopped state at the time (M1), the operator operates the control lever 59 and is about to depress the accelerator pedal 61 downwardly. At this time, based on the signals from the accelerator pedal depression sensor 62, the vehicle speed sensor 64, and the control lever position sensor 67, the controller 60 outputs a command to the clutch solenoid valve 173 to engage the clutch 8 the clutch of unit 170. The flywheel 171 is going to start rotation upon the engagement of the clutch 170a, but it cannot be easily accelerated because of its large inertial moment and is still stopped in the position 1F. Therefore, in the position 1E, where the engine 1 is at the rotational speed of 700 rpm, the mechanical supercharger 20 starts rotating through the planetary carrier 13, the planetary gears 12, and the sun gear 11 in the position 1S shown in FIGS. 20 and 21.

(C-1) VEHICLE ACCELERATED STATE FROM START-UP STATE

At the time (M2), the operator depresses the accelerator pedal 61 downwardly in a larger amount. This time (M2) represents a state where the vehicle is going to be accelerated from the low idling rotational speed of 700 rpm. At this time, the clutch is engaged and the flywheel 171 is about to rotate. For the brake unit 172, as with the above state, the controller 60 continually outputs a command to the brake solenoid valve 174, allowing the brake unit 172 to freely rotate.

The flywheel 171 is going to start rotation upon the engagement of the clutch of the clutch unit 170, but it cannot be easily accelerated because of its large inertial moment and is still stopped even in the position 2F. Therefore, in the position 2E where the engine 1 is at the rotational speed of 700 rpm, the mechanical supercharger 20 is quickly rotated through the planetary carrier 13, the planetary gears 12, and the sun gear 11 in the position 2S shown in FIGS. 20 and 21.

(D-1) VEHICLE FURTHER ACCELERATED STATE WITH ADDITIONAL DEPRESSION OF ACCELERATOR PEDAL

When the accelerator pedal 61 is additionally depressed to further accelerate the vehicle, the operation enters into a state of the time (M3) in FIG. 21. At this time (M3), the rotational speed of the engine 1 is raised to the position 3E, and the flywheel 171 starts rotating in the position 3F. Simultaneously, corresponding to an increase in the rotational speed of the engine 1 to the position 3E, the rotational speed of the mechanical supercharger 20 is further quickly increased to the position 3S.

(E-1) VEHICLE ACCELERATION END STATE WITH FURTHER DEPRESSION OF ACCELERATOR PEDAL

When the accelerator pedal 61 is even further depressed to still further accelerate the vehicle, the operation enters into a state of the time (M4) in FIG. 21. At this time, the rotational speed of the engine 1 is raised to the position 4E and the flywheel 171 is rotating in the position 4F. Correspondingly, the ring gear 14, having rotated in the position 3F at the time (M3), is now rotated in the sped-up position 4F in FIG. 20. Therefore, the mechanical supercharger 20 is rotated in the position 4S at a rotational speed substantially equal to that in the position 3S at the time (M3) in FIG. 21.

(F-1) STATE WHERE ENGINE ROTATIONAL SPEED OR VEHICLE SPEED IS ALMOST CONSTANT AT PREDETERMINED VALUE

When the rotational speed of the engine 1 or the vehicle speed is still further increased to the position 5E, where it is almost constant at a predetermined value, the controller 60 outputs, based on the signals from the accelerator pedal depression sensor 62, the vehicle speed sensor 64, and the control lever position sensor 67, a command to the clutch solenoid valve 173 to engage the clutch 8 the clutch unit 170, thereby cutting off transmission of the torque to the flywheel 171.

At the time (M6) in FIG. 21, therefore, the flywheel 171 continues rotation due to its inertial moment while gradually reducing its rotational speed. With the absence of driving torque necessary to rotate the flywheel 171, the ring gear 14 is rotated at the further sped-up position 6F. Accordingly, the speed of the mechanical supercharger 20 is quickly reduced so that it rotates in the nearly zero position 6S as shown in FIGS. 20 and 21.

As described above, the speed-up ratio of the differential planetary gearing 10 is made variable by controlling the rotational speed of the ring gear 14 with the aid of the flywheel 171. As a result, the mechanical supercharger 20 is quickly rotated during the period from stop to acceleration in which the low-speed torque of the engine 1 is required, and is stopped in the high-speed range where the torque of the engine 1 is not so required.

(G-1) WHEN FURTHER ACCELERATING VEHICLE JUST AFTER ENTERING STEADY RUNNING, OR CLIMBING LONG SLOPE, OR THE LIKE

A description will now be made of the case of desiring to operate the mechanical supercharger 20 for a long time as needed, for example, when the vehicle is further accelerated just after entering steady running or it climbs a long slope. In the state between the time (M5) and (M6) in FIG. 21, because the flywheel 171 continues rotation due to the inertial moment (and so does the ring gear 14), the mechanical supercharger 20 cannot be quickly sped up. Therefore, based on the signals from the accelerator pedal depression sensor 62 and the engine revolution number sensor 63, the controller 60 calculates the necessity of quick acceleration from change rates, etc., of those signals from time to time, and then outputs a command to the clutch solenoid valve 173 to engage the clutch 170a. Simultaneously, the controller 60 outputs a command to the brake solenoid valve 174 to establish the engagement between the brake plates 172a and the fixed-side brake plates 172b under a hydraulic pressure supplied through the brake solenoid valve 174. The ring gear 14 is thereby stopped, whereupon the mechanical supercharger 20 is quickly sped up with the rotational speed of the engine 1 through the planetary gears 12, the planetary carrier 13, and the sun gear 11, and can also continue rotation for a long time. If the above process is carried out by using the brake 172 alone, friction heat would be excessively generated due to a brake load, particularly, in a transient slipping state, resulting in the problem of causing a creep condition or deteriorating durability. By contrast, with the above arrangement, the brake load can be relieved by utilizing the inertial force of the flywheel 171.

In addition, the mechanical supercharger 20 can be quickly rotated during acceleration of the vehicle.

Figure 22:
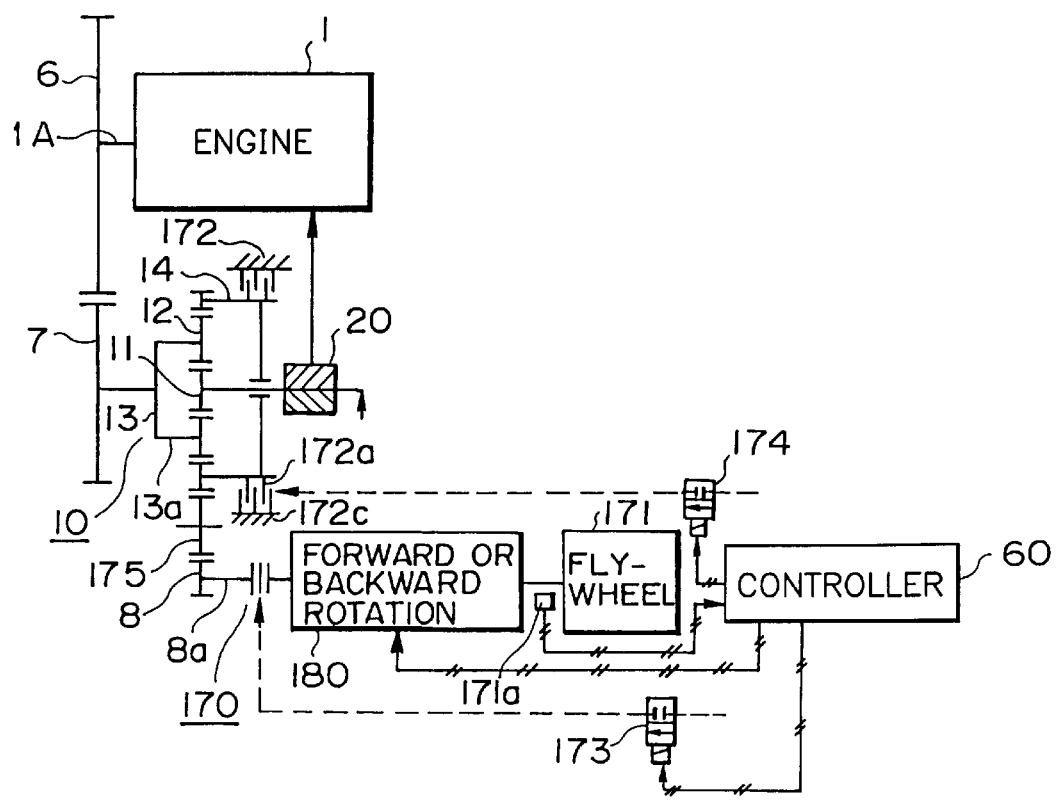
FIG. 22 is a conceptual diagram of a differential driving supercharger, the view showing a tenth embodiment of the present invention.

FIG. 22 is a conceptual diagram of a differential driving supercharger, the view showing a tenth embodiment of the present invention. The brake unit 172, the clutch unit 170, and the flywheel 171, connected to the clutch unit 170, are associated with the differential planetary gearing 10 in the ninth embodiment; whereas a reverse gear 180 for switching between forward and backward rotation is disposed between the clutch unit 170 and the flywheel 171 in the tenth embodiment.

Note that the same parts as those in the first or other embodiments are denoted by the same reference numerals and will not be described below. This is equally applied to the following description unless otherwise specified.

The operation of this embodiment thus constructed will be described below, but the successive states which occur when the vehicle is started up and accelerated from the stopped state for a long time, i.e.:

(A-2) VEHICLE STOPPED STATE,
(B-2) VEHICLE START-UP STATE FROM STOPPED STATE,
(C-2) VEHICLE ACCELERATED STATE FROM START-UP STATE,
(D-2) VEHICLE FURTHER ACCELERATED STATE WITH ADDITIONAL DEPRESSION OF ACCELERATOR PEDAL
(E-2) VEHICLE ACCELERATION END STATE WITH FURTHER DEPRESSION OF ACCELERATOR PEDAL, and
(F-2) STATE WHERE ENGINE ROTATIONAL SPEED OR VEHICLE SPEED IS ALMOST CONSTANT AT PREDETERMINED VALUE, are respectively the same as the corresponding states (A-1), (B-1), (C-1), (D-1), (E-1), and (F-1) in the ninth embodiment and, hence, will not be described here.

(H-2) STATE FROM DECELERATION TO VEHICLE STOPPED

Figure 23:
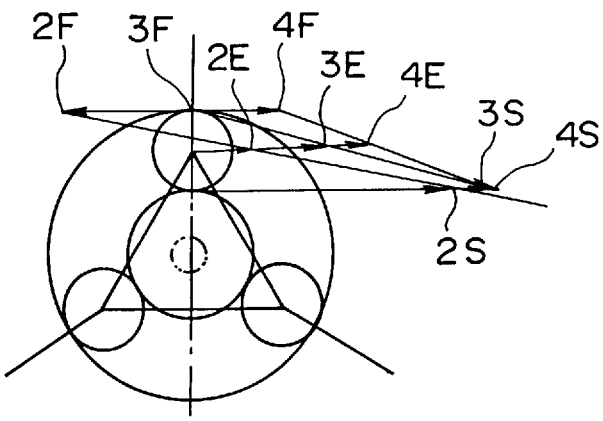
FIG. 23 is side view of a meshed state of a differential planetary gearing according to the tenth embodiment, the view showing rotational speeds of an engine, a mechanical supercharger, and a flywheel (ring gear).
Figure 24:
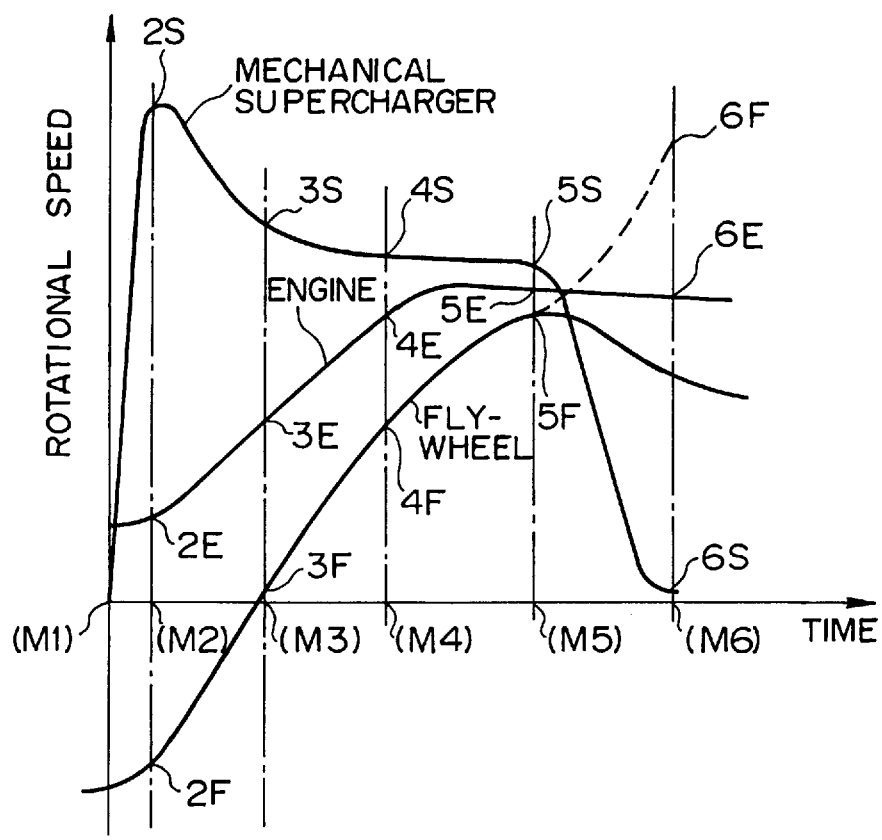
FIG. 24 is a graph for explaining the relationship between the rotational speeds of the engine, the mechanical supercharger, and the flywheel according to the tenth embodiment.

A description will be first made with reference to FIGS. 23 and 24. Since FIGS. 23 and 24 correspond to FIGS. 21 and 22, respectively, the description on the meaning of the vertical axis and the horizontal axis in the plotted graph will not be repeated here. This is also equally applied to the following description unless otherwise specified. Incidentally, in FIG. 24, a curve representing the rotational speed of the flywheel 171 extended under the horizontal axis means that the flywheel rotates backwardly.

When the vehicle is decelerated continually for a predetermined time, the controller 60 outputs, based on the signals from the accelerator pedal depression sensor 62, the vehicle speed sensor 64, and a brake depression sensor 77a disposed near the brake pedal 77, a command to the clutch solenoid valve 173 to engage the clutch 170a. This enables the rotational speed of the engine 1 to be first stored in the flywheel 171 in the forward direction. Then, the vehicle speed sensor 64 detects that the vehicle is decelerated to a predetermined speed before stopping, whereupon the controller 60 outputs a command to the clutch solenoid valve 173 to disengage the clutch 170a, and the vehicle is stopped with the inertial moment kept stored in the flywheel 171. This condition is represented by the time (M1), i.e., as a vehicle stopped state. Even when the vehicle is decelerated continually for a predetermined time, if it is judged, based on the signal from the vehicle speed sensor 64, that the deceleration is not being further continued, for example, the controller 60 also outputs a command to the clutch solenoid valve 173 to disengage the clutch 170a.

(J-2) RESTARTING STATE AFTER DECELERATING AND STOPPING VEHICLE

When restarting the vehicle from the time (M1), the operator depresses the accelerator pedal 61 downwardly. Based on the signals from the accelerator pedal depression sensor 62, the vehicle speed sensor 64, and a flywheel rotation sensor 171a, the controller 60 shifts the reverse gear 180 to a backward position.

Upon the shift of the reverse gear 180, the output of the flywheel 171, i.e., the ring gear 14, is now rotated in the backward direction. In this condition represented by the time (M1) in FIG. 24, the diesel engine 1 is idling at a low rotational speed of 700 rpm, the flywheel 171 is rotating backwardly at a certain rotational speed due to the inertial moment during the deceleration, and the mechanical supercharger 20 is still stopped.

(K-2) VEHICLE ACCELERATED STATE FROM RESTARTING STATE

At the time (M2), the operator depresses the accelerator pedal 61 downwardly by a larger amount. This time (M2) represents a state where the vehicle is going to be accelerated from the low idling rotational speed of 700 rpm. At this time, the clutch is engaged and the flywheel 171 is about to rotate backwardly. For the brake unit 172, as with the above case, the controller 60 outputs a command to the brake solenoid valve 174, allowing the brake unit 172 to freely rotate. With the backward rotation of the flywheel 171, the mechanical supercharger 20 is sped up to the position 2S shown in FIG. 24 at a steeper gradient than in the ninth embodiment shown in FIG. 21.

(L-2) VEHICLE FURTHER ACCELERATED STATE WITH ADDITIONAL DEPRESSION OF ACCELERATOR PEDAL AFTER RESTARTING

When the accelerator pedal 61 is additionally depressed to further accelerate the vehicle, the operation enters into a state of the time (M3) in FIG. 24. At this time (M3), the rotational speed of the engine 1 is raised to the position 3E, and the flywheel 171 is almost stopped in the position 3F after being gradually slowed down from the time (M2). Also, at this time, even with the rotational speed of the engine 1 raised to the position 3E, the mechanical supercharger 20 is rotating at a speed which is reduced down to the position 3S because of the slowing down of the flywheel 171.

(M-2) VEHICLE ACCELERATION END STATE WITH FURTHER DEPRESSION OF ACCELERATOR PEDAL AFTER RESTARTING

When the accelerator pedal 61 is even further depressed to still further accelerate the vehicle, the operation enters into a state of the time (M4) in FIG. 24. At this time, the rotational speed of the engine 1 is raised to the position 4E, and the flywheel 171 is rotating in the position 4F. Correspondingly, the ring gear 14 is sped up from the almost zero position 3F at the time (M3) to rotate in the position 4F in FIG. 24. Therefore, the mechanical supercharger 20 is rotated in the position 4S at a rotational speed substantially equal to that in the position 3S at the time (M3) in FIG. 24.

Other states, i.e., (N-2) STATE WHERE ENGINE ROTATIONAL SPEED OR VEHICLE SPEED IS ALMOST CONSTANT AT PREDETERMINED VALUE AFTER RESTARTING and (G-2) WHEN FURTHER ACCELERATING VEHICLE JUST AFTER ENTERING STEADY RUNNING, OR CLIMBING LONG SLOPE, OR THE LIKE AFTER RESTARTING, are respectively the same as the corresponding states (F-1) and (G-1) in the ninth embodiment and, hence, will not be described here.

Differential driving superchargers of eleventh and twelfth embodiments according to the present invention will be described below. The eleventh and twelfth embodiments utilize a driving system comprised of the engine 1, the driving force transmission system 40, and the tire 41. More specifically, the mechanical supercharger 20 is driven by the output shaft 1A of the engine 1 through the differential planetary gearing 10 as with the first embodiment, while the ring gear 14 of the differential planetary gearing 10 is rotated with the power supplied from a transmission 40c disposed in the driving force transmission system 40 or midway between the transmission 40c and the tire 41. In the following, the embodiments are illustrated as receiving the power from midway between the transmission 40*c* and the tire 41. Since the speed-up ratio of the mechanical supercharger 20 is made variable by utilizing the transmission inherently mounted in a vehicle, these embodiments are simple in structure and inexpensive.

In the eleventh embodiment, the driving force transmission system 40 comprises a torque converter 40*b* and an automatic transmission 40*c*. In the twelfth embodiment, the driving force transmission system 40 comprises a main clutch 40*d* and a manual transmission 40*e*.

Figure 25:
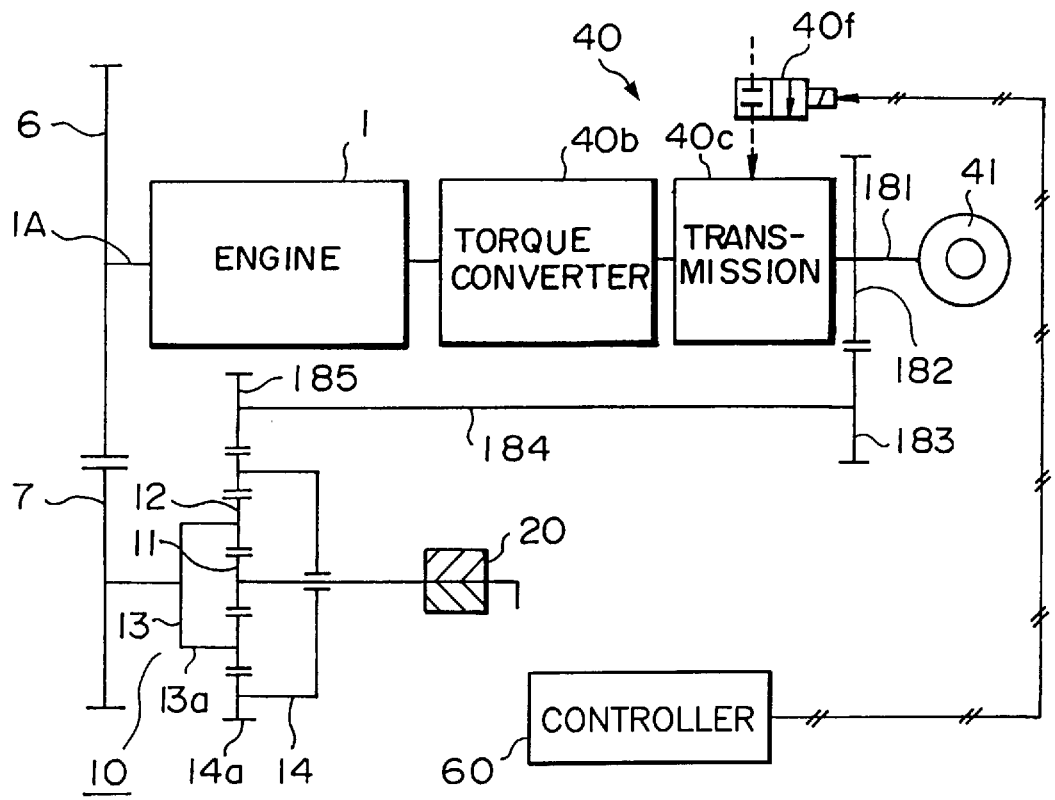
FIG. 25 is a conceptual diagram of a differential driving supercharger, the view showing an eleventh embodiment of the present invention (including an automatic transmission).

FIG. 25 is a conceptual diagram of a differential driving supercharger, the view showing an eleventh embodiment of the present invention. The driving force transmission system 40 includes the torque converter 40*b*, the automatic transmission 40*c*, and a gear 182 mounted on an output shaft 181, which is connected to the tire 41. The gear 182 is meshed with a gear 183 which is joined by a shaft 184 to a gear 185 for driving the ring gear 14. The gear 185 is meshed with the outer teeth 14*a* of the ring gear 14 of the differential planetary gearing 10. When changing the speed, the controller 60 outputs a command to a solenoid valve 40*f* for the automatic transmission, by way of example, to engage a desired one of the clutches (not shown) for various speed shifts. As an alternative, a desired clutch can be engaged by using a synchromesh gear.

The operation of this embodiment thus constructed will be described below.

Figure 26:
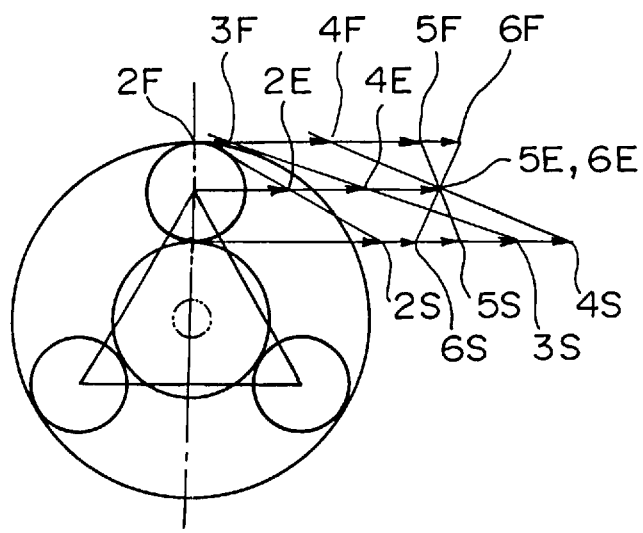
FIG. 26 is a side view of a meshed state of a differential planetary gearing according to the eleventh embodiment, the view showing rotational speeds of an engine, a mechanical supercharger, and a ring gear.
Figure 27:
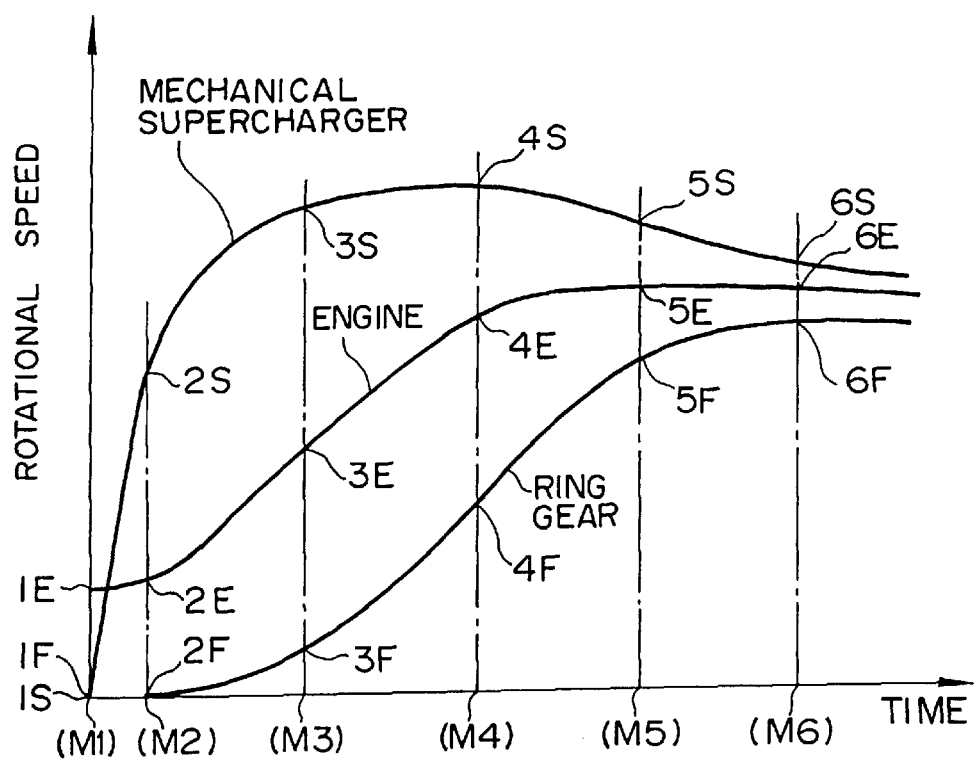
FIG. 27 is a graph for explaining the relationship between the rotational speeds of the engine, the mechanical supercharger, and the ring gear according to the eleventh embodiment.

First, a description will be made with reference to FIGS. 26 and 27. FIG. 26 illustrates the relationship between rotational speeds of the engine 1, the differential planetary gearing 10, and the mechanical supercharger 20. FIG. 27 is a graph showing the relationship between the respective rotational speeds, in which the horizontal axis represents time and the vertical axis represents the rotational speeds of the engine 1, the mechanical supercharger 20, and the ring gear 14.

(A-3) VEHICLE STOPPED STATE

In this state, the engine 1 is idling at a low rotational speed as with the above (A-1) VEHICLE STOPPED STATE in the ninth embodiment. Since the vehicle is stopped, the ring gear 14 is also stopped. Therefore, the mechanical supercharger 20 is rotating at a low speed. As a result, the rotation of the mechanical supercharger 20 is quickly accelerated to provide the vehicle with good acceleration properties at the start-up.

(B-3) VEHICLE START-UP STATE FROM STOPPED STATE

When starting the vehicle from the stopped state at the time (M1), the operator operates the control lever 59 (shown in FIG. 1) and is about to depress the accelerator pedal 61 downwardly. In this position, based on the signals from the accelerator pedal depression sensor 62, the vehicle speed sensor 64, and the control lever position sensor 67, the controller 60 outputs a command to the automatic transmission 40*c* to engage the clutch (not shown) for shifting to the first-gear position. In this first-gear position at a low speed, the torque converter 40*b* is subject to a slippage between a pump impeller on the engine side and a turbine liner on the output shaft side, both of these components being not shown. Such a slippage keeps the output shaft 181 of the automatic transmission 40*c* from rotating during an initial stage, whereas the engine 1 continues rotation. Therefore, the ring gear 14 is also kept from rotating and stopped in the position 1F. As a result, the rotation of the engine 1 at a speed of 700 rpm, for example, in the position 1E causes the mechanical supercharger 20 to quickly start rotating from the above state (A-3) through the planetary carrier 13, the planetary gears 12 and the sun gear 11 in the position 1S shown in FIGS. 26 and 27.

(C-3) VEHICLE ACCELERATED STATE FROM START-UP STATE

This state is the same as the above (C-1) VEHICLE ACCELERATED STATE FROM START-UP STATE in the ninth embodiment and, hence, will not be described here.

(D-3) VEHICLE FURTHER ACCELERATED STATE WITH ADDITIONAL DEPRESSION OF ACCELERATOR PEDAL

When the accelerator pedal 61 is additionally depressed to further accelerate the vehicle, the operation enters into a state of the time (M3) in FIG. 27. At this time (M3), the rotational speed of the engine 1 is raised to the position 3E. At this position 3E, based on the signals from the accelerator pedal depression sensor 62 and the vehicle speed sensor 64, the controller 60 outputs a command to the solenoid valve 40*f* for the automatic transmission 40*c* to engage the clutch (not shown) for shifting to the second-gear position. In this second-gear position, the torque converter 40*b* is subject to no slippage between the pump impeller on the engine side and the turbine liner on the output shaft side, allowing the output shaft 181 of the automatic transmission 40*c* to rotate at a predetermined speed. Therefore, the ring gear 14 starts rotating in the position 3F through the output shaft 181, the gear 182, the gear 183, and the shaft 184. As a result, corresponding to the rotational speed of the engine 1 in the position 3E, the mechanical supercharger 20 is rotated through the planetary carrier 13, the planetary gears 12, and the sun gear 11 in the position 3S shown in FIGS. 26 and 27, but an increase in its rotational speed is reduced.

(E-3) VEHICLE ACCELERATION END STATE WITH FURTHER DEPRESSION OF ACCELERATOR PEDAL

This state is the same as (E-1) in the ninth embodiment and, hence, will not be described here.

It is to be noted that, in this embodiment, since the rotational speed of the output shaft 181 of the automatic transmission 40*c* is automatically changed in accordance with a command from the controller 60, the rotational speed of the ring gear 14 is also automatically changed. Therefore, the rotational speed of the mechanical supercharger 20 is reduced from the position 3S and then has a certain value after the predetermined time.

(F-3) STATE WHERE ENGINE ROTATIONAL SPEED OR VEHICLE SPEED IS ALMOST CONSTANT AT PREDETERMINED VALUE

In this state, the mechanical supercharger 20 still continues rotation at a predetermined speed even after the position 65.

(G-3) WHEN FURTHER ACCELERATING VEHICLE JUST AFTER ENTERING STEADY RUNNING, OR CLIMBING LONG SLOPE, OR THE LIKE

When the accelerator pedal 61 is additionally depressed to accelerate the vehicle from a steady running state, the vehicle is accelerated through a shift-down of the automatic transmission 40c. On this occasion, a delay in the acceleration of the vehicle causes a delay in the speeding up of the rotation of the ring gear 14. Therefore, the mechanical supercharger 20 is sped up to supply a larger amount of air to the engine 1, thereby increasing the output of the engine 1. As a result, the acceleration of the vehicle is promoted. When climbing a long slope, the output of the engine 1 is increased through a shift-down of the automatic transmission 40c and the vehicle is thereby accelerated similarly to the above case.

Figure 28:
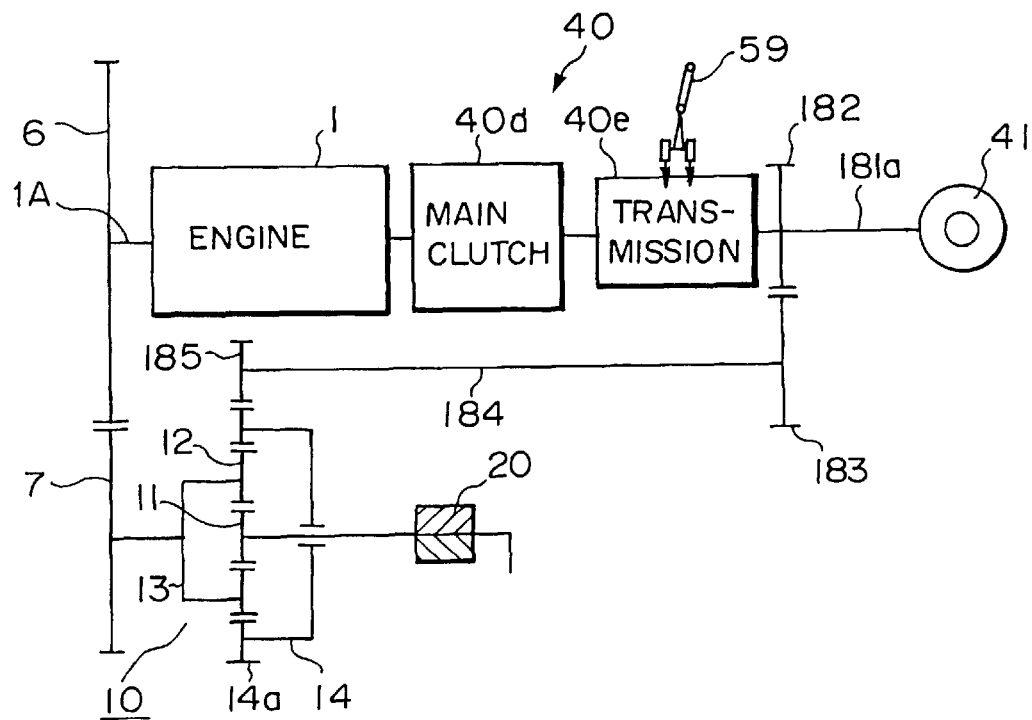
FIG. 28 is a conceptual diagram of a differential driving supercharger, the view showing a twelfth embodiment of the present invention (including an automatic transmission).

FIG. 28 is a conceptual diagram of a differential driving supercharger, the view showing a twelfth embodiment of the present invention. As with the eleventh embodiment, the driving force transmission system 40 includes the gear 182 mounted on an output shaft 181a between the manual transmission 40e and the tire 41. The other construction for driving the mechanical supercharger 20 is the same as in the eleventh embodiment and, hence, will not be described here.

The operation of this embodiment thus constructed will be described below.

Figure 29:
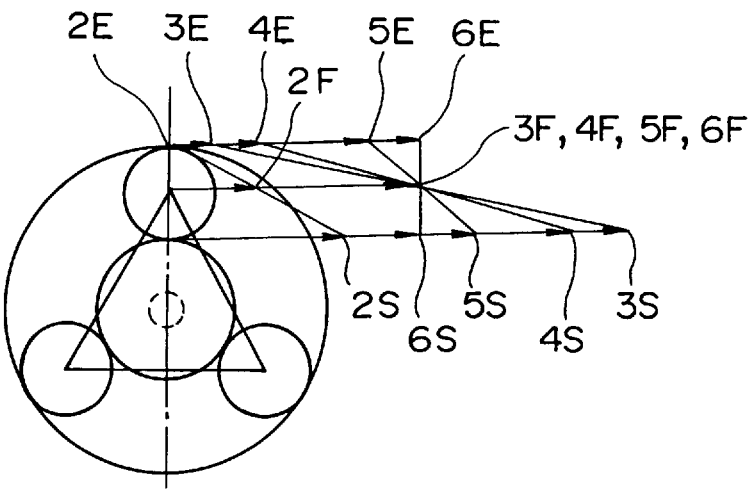
FIG. 29 is side view of a meshed state of a differential planetary gearing according to the twelfth embodiment, the view showing rotational speeds of an engine, a mechanical supercharger, and a ring gear.
Figure 30:
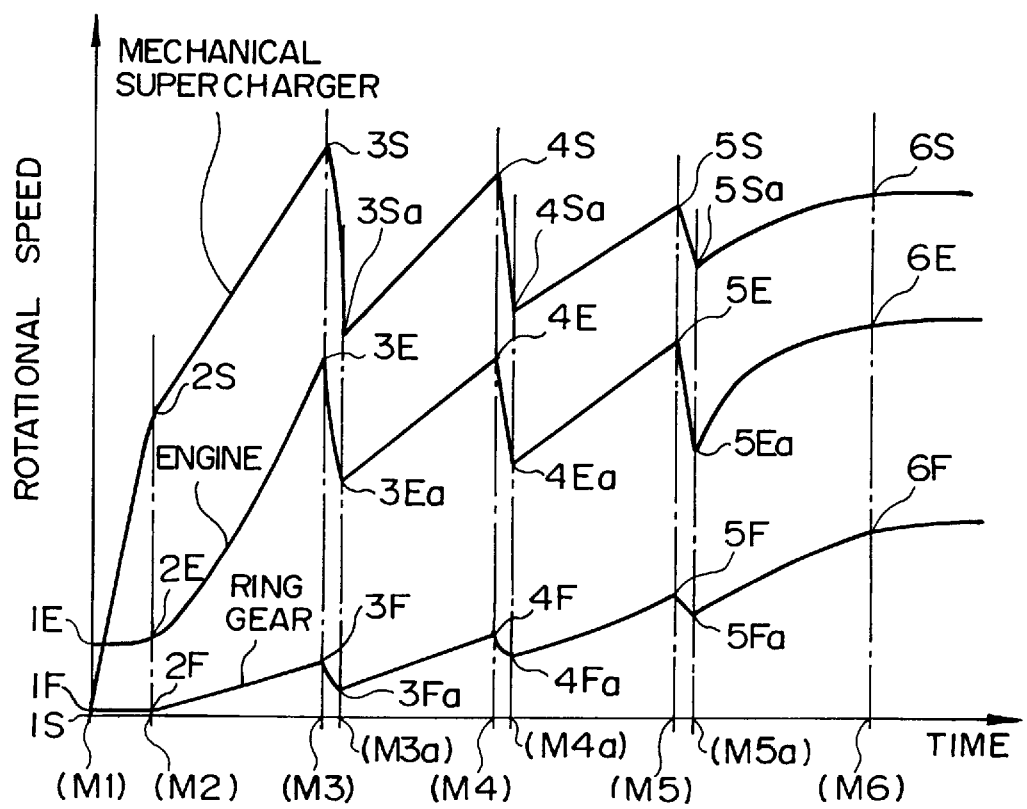
FIG. 30 is a graph for explaining the relationship between the rotational speeds of the engine, the mechanical supercharger, and the ring gear according to the twelfth embodiment.

First, a description will be made with reference to FIGS. 29 and 30. FIG. 29 illustrates the relationship between the rotational speeds of the engine 1, the differential planetary gearing 10, and the mechanical supercharger 20. FIG. 30 is a graph showing the relationship between the respective rotational speeds, in which the horizontal axis represents time and the vertical axis represents the rotational speeds of the engine 1, the mechanical supercharger 20, and the ring gear 14.

(A-4) VEHICLE STOPPED STATE

This state is the same as (A-3) in the eleventh embodiment and, hence, will not be described here.

(B-4) VEHICLE START-UP STATE FROM STOPPED STATE

When starting the vehicle from the stopped state at the time (M1), the operator operates the control lever 59 and is about to depress the accelerator pedal 61. Also, the operator withdraws his foot from a main clutch pedal (not shown) to engage the main clutch.

When the vehicle is started from the stopped state, the main clutch 40d is subject to a slippage at the beginning of the clutch engagement. Such a slippage keeps the output shaft 181a of the manual transmission 40e from rotating during an initial stage, whereas the engine 1 continues rotation. Therefore, the ring gear 14 is also kept from rotating and is stopped in the position 1F. As a result, the rotation of the engine 1 at a speed of 700 rpm in the position 1E causes the mechanical supercharger 20 to quickly start rotating through the planetary carrier 13, the planetary gears 12, and the sun gear 11 in the position 1S shown in FIGS. 29 and 30.

(C-4) VEHICLE ACCELERATED STATE FROM START-UP STATE

This state is the same as (C-3) in the eleventh embodiment and, hence, will not be described here.

(D-4) VEHICLE FURTHER ACCELERATED STATE WITH ADDITIONAL DEPRESSION OF ACCELERATOR PEDAL

When the accelerator pedal 61 is additionally depressed to further accelerate the vehicle, the operation enters into a state of the time (M3) in FIG. 30. At this time (M3), the rotational speed of the engine 1 is raised to the position 3E, and the main clutch 40c is not already subject to any slippage, allowing the output shaft 181a of the manual transmission 40e to rotate at a predetermined speed. Therefore, the ring gear 14 starts rotating in the position 3F through the output shaft 181a, the gear 182, the gear 183, and the shaft 184. As a result, corresponding to the rotational speed of the engine 1 in the position 3E, the mechanical supercharger 20 is rotated through the planetary carrier 13, the planetary gears 12, and the sun gear 11 in the position 3S shown in FIGS. 29 and 30. At this time, since the rotational speed of the engine 1 is rapidly raised to the position 3E, the rotation of the mechanical supercharger 20 is further sped up to the position 3E but with a gentler gradient than the speed increase from the position 1S to 2S in the preceding step.

Further, at this time (M3), the operator shifts the control lever from the first-gear to the second-gear position in correspondence with the vehicle speed. This shift to the second-gear position causes the manual transmission 40e to effect meshing of the second gear, while the engine 1 continues rotation. During the shift process of the manual transmission 40e to the second-gear position, there is a neutral state at the moment the operator releases the accelerator pedal 61 from the depressed state. For a moment from the time M3 to M3a, therefore, the rotational speed of the engine 1 is reduced from the position 3E down to the position 3Ea. Corresponding to such an instantaneous drop in the rotational speed of the engine 1, the speed of the mechanical supercharger 20, having rotated in the position 3S is also momentarily reduced to the position 3Sa as shown in FIG. 30.

(E-4) VEHICLE ACCELERATION END STATE WITH FURTHER DEPRESSION OF ACCELERATOR PEDAL

When the accelerator pedal 61 is depressed even further to still further accelerate the vehicle, the operation enters into a state of the time (M4) in FIG. 30. At this time, the rotational speed of the engine 1 is raised from the position 3Ea to the position 4E, which is comparable to the position 3E in the above first-gear state. Also, since the rotational speed of the output shaft 181a of the manual transmission 40e is changed in accordance with an increase in the rotational speed of the engine 1, the rotational speed of the ring gear 14 is also changed correspondingly. Thus, the ring gear 14 is rotated in the position 4F of FIG. 30 at a higher speed than the position 3F at the time (M3) and, therefore, the mechanical supercharger 20 is rotated in the position 4S at a lower speed than the position 3S at the time (M3) as shown in FIG. 30.

Further, at this time (M4), the operator shifts the control lever from the second-gear position to the third-gear position in correspondence with the vehicle speed. Upon this shift to the third gear position, the respective states of the engine 1, the manual transmission 40e, and the mechanical supercharger 20 are changed in a like manner to the above (D-4)VEHICLE FURTHER ACCELERATED STATE WITH ADDITIONAL DEPRESSION OF ACCELERATOR PEDAL, and hence these processes will not be described here.

(F-4) STATE WHERE ENGINE ROTATIONAL SPEED OR VEHICLE SPEED IS ALMOST CONSTANT AT PREDETERMINED VALUE

This state is the same as in the eleventh embodiment and, hence, will not be described here.

(G-4) WHEN FURTHER ACCELERATING VEHICLE JUST AFTER ENTERING STEADY RUNNING, OR CLIMBING LONG SLOPE, OR THE LIKE

While the vehicle is sped up with the gear change of the automatic transmission 40c in the eleventh embodiment, the vehicle is sped up with the gear change of the manual transmission 40e in the twelfth embodiment. Specifically, in the twelfth embodiment, the manual transmission 40e is shifted upwardly or downwardly manually by the operator to speed up or slow down the vehicle, and the rotational speed of the mechanical supercharger 20 is changed correspondingly to increase or reduce the output of the engine 1.

Figure 31:
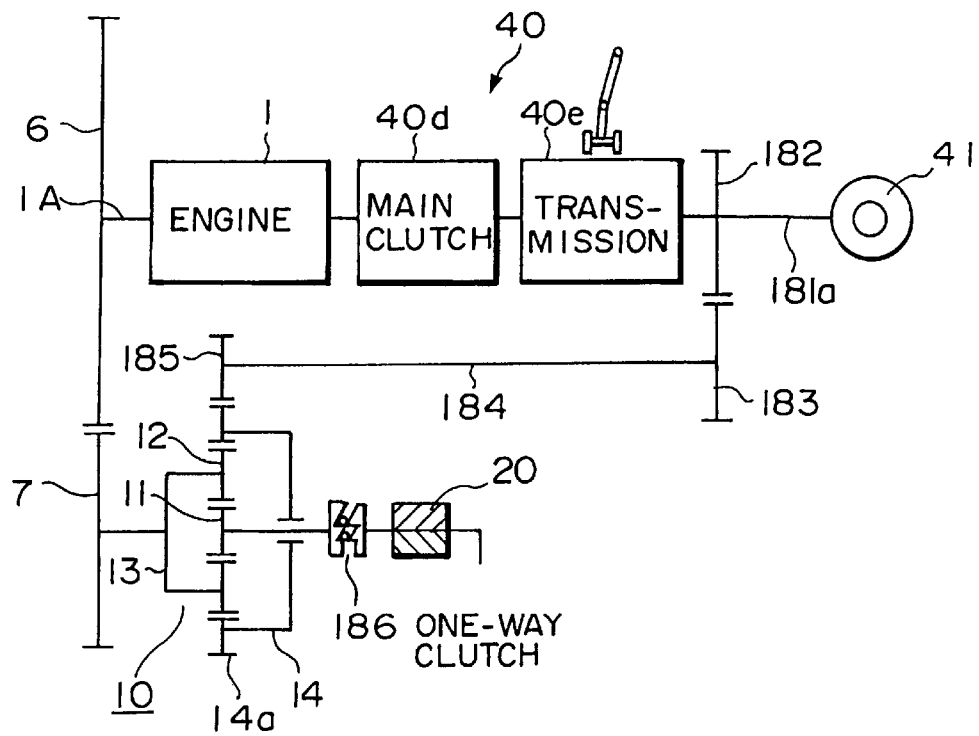
FIG. 31 is a conceptual diagram of a differential driving supercharger, the view showing a thirteenth embodiment of the present invention (including a one-way clutch).

FIG. 31 is a conceptual diagram of a differential driving supercharger, the view showing a thirteenth embodiment of the present invention. The present embodiment is different from the differential driving supercharger of the twelfth embodiment in that a one-way clutch 186 is interposed between the differential planetary gearing 10 and the mechanical supercharger 20. While the rotational speed of the mechanical supercharger 20 is momentarily lowered upon the gear change of the manual transmission 40e in the twelfth embodiment, the provision of the one-way clutch 186 eliminates an instantaneous drop in the rotational speed of the mechanical supercharger 20 in the thirteenth embodiment.

The operation of this embodiment thus constructed will be described below.

Figure 32:
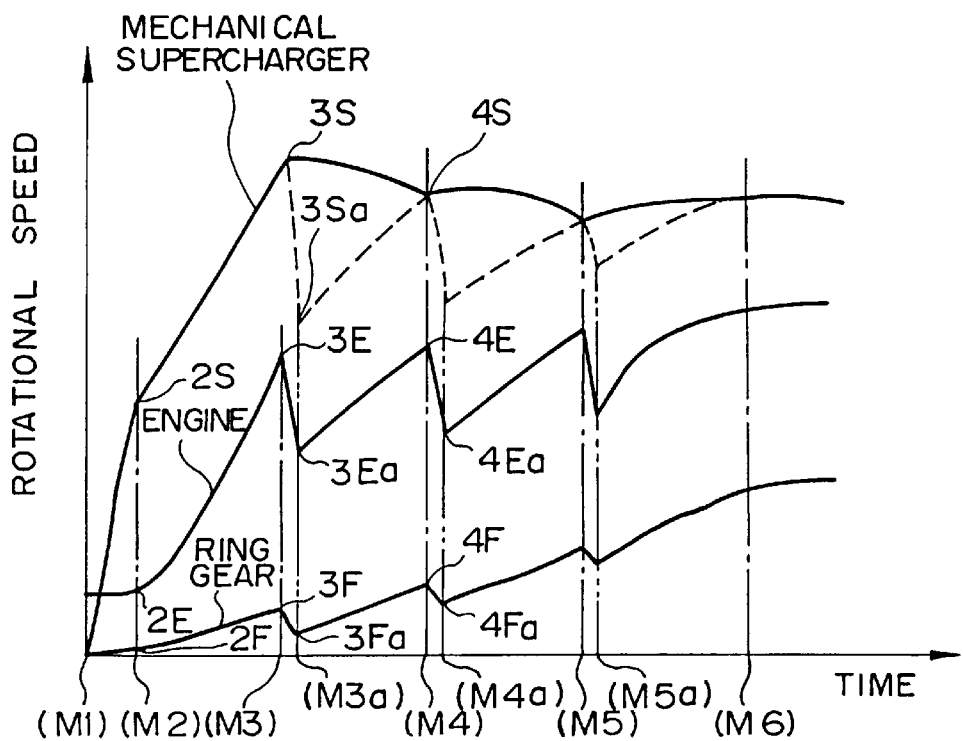
FIG. 32 is a graph for explaining the relationship between rotational speeds of an engine, a mechanical supercharger, and a ring gear according to the thirteenth embodiment.

A side view showing the relationship between rotational speeds of the engine 1, the differential planetary gearing 10, and the mechanical supercharger 20 is the same as FIG. 29 in connection with the twelfth embodiment and, hence, is not illustrated. FIG. 32 is a graph showing the relationship between the respective rotational speeds, in which the horizontal axis represents time and the vertical axis represents the rotational speeds of the engine 1, the mechanical supercharger 20, and the ring gear 14.

(A-5) VEHICLE STOPPED STATE

This state is the same as the above (A-4) VEHICLE STOPPED STATE in the twelfth embodiment and, hence, will not be described here.

(B-5) VEHICLE START-UP STATE FROM STOPPED STATE

This state is the same as the above (B-4) VEHICLE START-UP STATE FROM STOPPED STATE in the twelfth embodiment and, hence, will not be described here.

(C-5) VEHICLE ACCELERATED STATE FROM START-UP STATE

This state is the same as (C-4) VEHICLE ACCELERATED STATE FROM START-UP STATE in the twelfth embodiment and, hence, will not be described here.

(D-5) VEHICLE FURTHER ACCELERATED STATE WITH ADDITIONAL DEPRESSION OF ACCELERATOR PEDAL

When the accelerator pedal 61 is depressed even further to further accelerate the vehicle, the rotational speeds of the engine 1, the mechanical supercharger 20, and the ring gear 14 are changed in a like manner to the twelfth embodiment until a state of time (M3) in FIG. 32.

At this time (M3), when the operator makes a shift from the first-gear position to the second-gear position in correspondence with the vehicle speed, the rotational speeds of the engine 1 and the ring gear 14 are momentarily reduced as with the twelfth embodiment. Upon such a drop in the twelfth embodiment, the rotational speed of the mechanical supercharger 20 is also momentarily reduced to the position 3S*a*. By contrast, in the thirteenth embodiment, the rotational speed of the differential planetary gearing 10 is lowered likewise, but the mechanical supercharger 20 is disconnected by the one way clutch 186 from the differential planetary gearing 10 so as to be free from the driving by the differential planetary gearing 10. At this time, therefore, the mechanical supercharger 20 maintains its rotation due to the inertial moment and its rotational speed is not so reduced. Then, the rotational speed of the differential planetary gearing 10 is increased because of an increase in the rotational speeds of the engine 1 and the ring gear 14 in the secondgear state. When the rotational speed of the differential planetary gearing 10 exceeds the rotational speed of the mechanical supercharger 20, the mechanical supercharger 20 is connected to the differential planetary gearing 10 again, through the one-way clutch 186 to be driven by the differential planetary gearing 10. As a result, the mechanical supercharger 20 is prevented from changing its rotational speed momentarily, unlike the twelfth embodiment, and can be smoothly rotated with advantages of a shorter accelerating time and less consumption of energy.

(E-5) VEHICLE ACCELERATION END STATE WITH FURTHER DEPRESSION OF ACCELERATOR PEDAL, (F-5) STATE WHERE ENGINE ROTATIONAL SPEED OR VEHICLE SPEED IS ALMOST CONSTANT AT PREDETERMINED VALUE, and (G-4) WHEN FURTHER ACCELERATING VEHICLE JUST AFTER ENTERING STEADY RUNNING, OR CLIMBING LONG SLOPE, OR THE LIKE are the same as in the eleventh embodiment and, hence, will not be described here.

Figure 33:
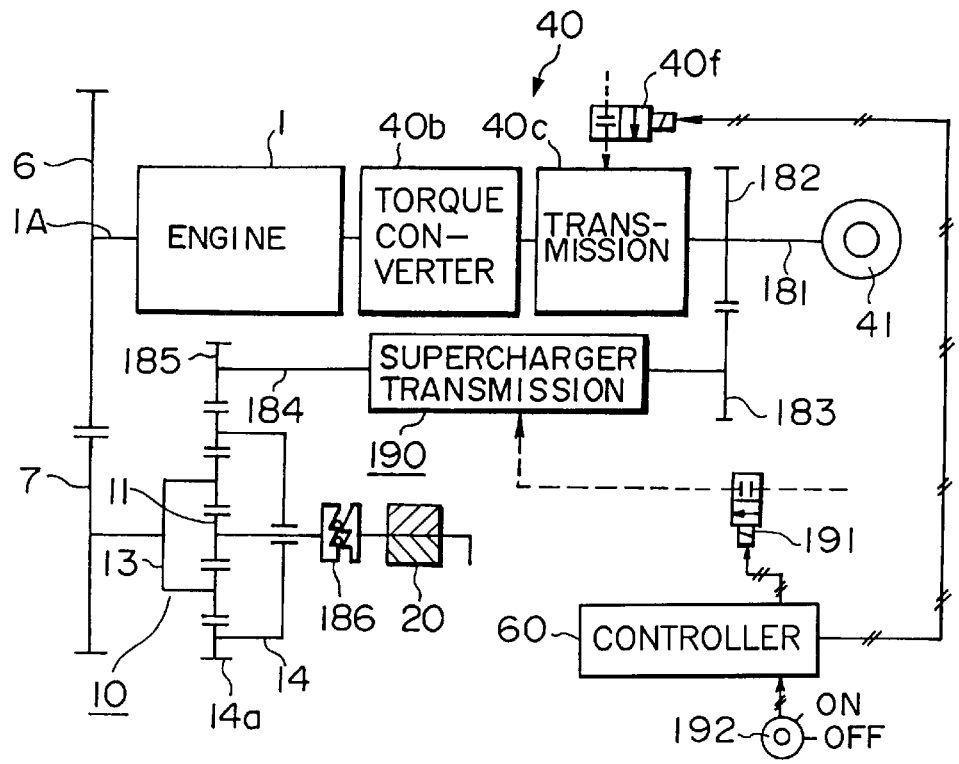
FIG. 33 is a conceptual diagram of a differential driving supercharger, the view showing fourteenth and fifteenth embodiments of the present invention (including a supercharger transmission).

FIG. 33 is a conceptual diagram of a differential driving supercharger, the view showing fourteenth and fifteenth embodiments of the present invention.

In each of the eleventh and twelfth embodiments, the differential driving supercharger is arranged so as to receive the power from the transmission 40c of the driving force transmission system 40 or from midway between the transmission 40c and the tire 41, and to rotate the ring gear 14 of the differential planetary gearing 10 through a gear, a shaft, and a gear. By contrast, in the present invention, the ring gear 14 of the differential planetary gearing 10 is rotated at a variable speed through a gear 183, a supercharger transmission 190, and a gear 185. The controller 60 outputs a command to a solenoid valve 191 for the supercharger transmission 190 to engage a desired one of the clutches (not shown) for the speed change. The controller 60 also outputs a control signal in accordance with the running speed or the working load to command the supercharger transmission 190 to select a speed reduction ratio. As another example, the operator can operate a supercharger selection switch 192 to select whether or not the supercharger transmission 190 is to be used at a high speed. By so selectively using the supercharger transmission 190, it is possible, for example, to set a large speed change ratio when the vehicle is running at a high speed on superhighways or the like and the operation of the mechanical supercharger 20 is not necessary, or to set a small speed change ratio when the vehicle is running at low speeds in urban districts or the like and the operation of the mechanical supercharger 20 is necessary. For construction machines and so on, it is also possible to utilize the mechanical supercharger 20 in the work field where the vehicle must be frequently started up and stopped or driven at low and medium speeds, and not to utilize the mechanical supercharger 20 when the vehicle is traveling at high speeds like when self-running. As a result, working efficiency can be improved and fuel economy, can be improved.

Figure 34:
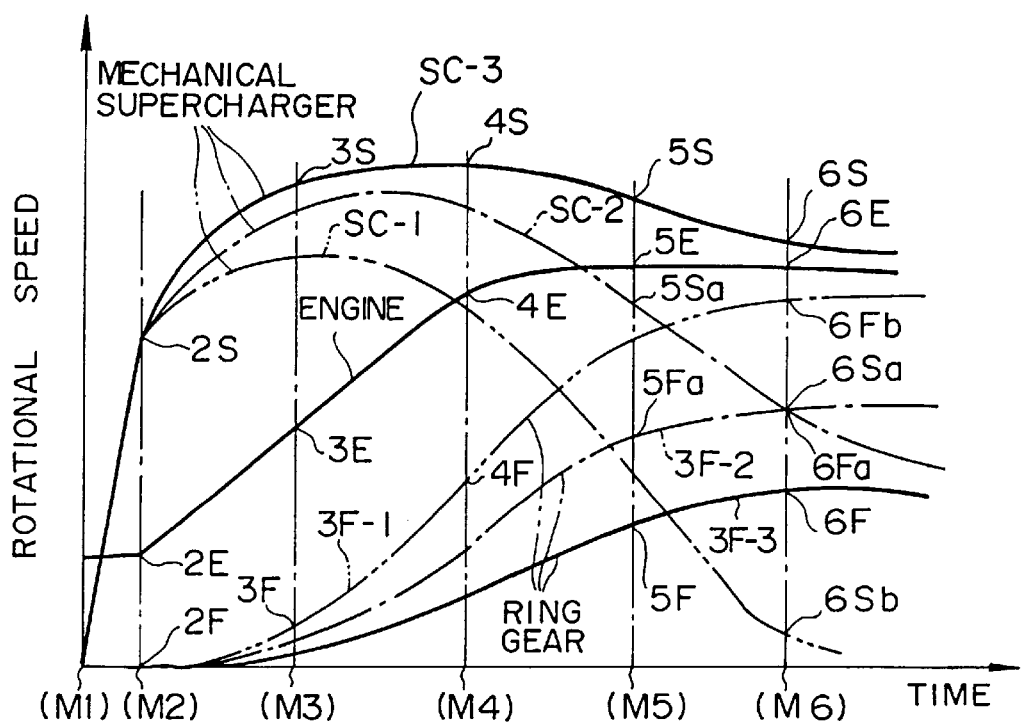
FIG. 34 is a graph for explaining the relationship between rotational speeds of an engine, a mechanical supercharger, and a ring gear according to the fourteenth embodiment (including an automatic transmission).

FIG. 34 is a graph showing the relationship between the rotational speeds of the engine 1, the mechanical supercharger 20, and the ring gear 14 in the fourteenth embodiment wherein the driving force transmission system 40 comprises the torque converter 40b and the automatic transmission 40c as with the eleventh embodiment.

Figure 35:
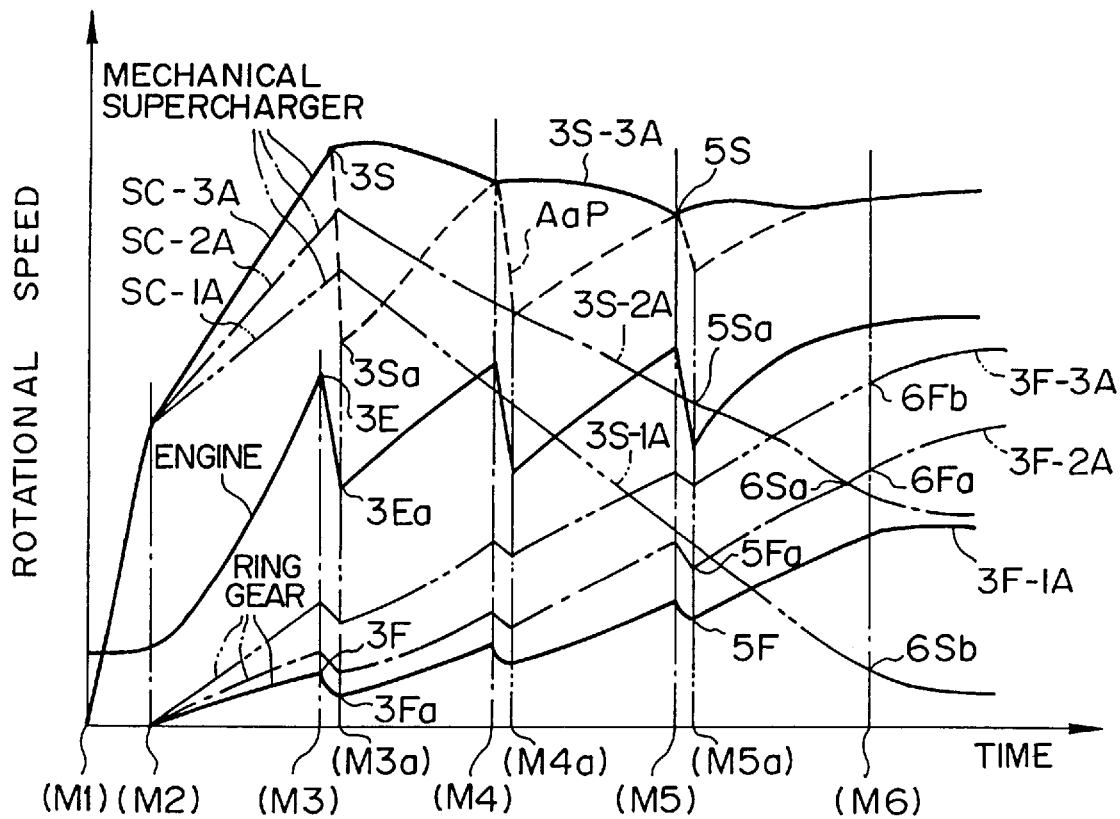
FIG. 35 is a graph for explaining the relationship between rotational speeds of an engine, a mechanical supercharger, and a ring gear according to the fifteenth embodiment (including a manual transmission).

FIG. 35 is a graph showing the relationship between the respective rotational speeds in the fifteenth embodiment wherein the driving force transmission system 40 comprises the main clutch 40d and the manual transmission 40e as with the twelfth embodiment.

In FIGS. 34 and 35, the horizontal axis represents time and the vertical axis represents the rotational speeds of the engine 1, the mechanical supercharger 20, and the ring gear 14.

The operation of the fourteenth embodiment using the automatic transmission 40c will be described below with reference to FIG. 34.

(A-6) VEHICLE STOPPED STATE and (B-6) VEHICLE START-UP STATE FROM STOPPED STATE are respectively the same as the above (A-3) VEHICLE STOPPED STATE and (B-3) VEHICLE START-UP STATE FROM STOPPED STATE in the eleventh embodiment and, hence, will not be described here.

(C-6) VEHICLE ACCELERATED STATE FROM START-UP STATE

At the time (M2), the operator depresses the accelerator pedal 61 downwardly by a larger amount. This time (M2) represents a state where the vehicle is going to be accelerated from the low idling rotational speed of 700 rpm. At this time (M2), the controller 60 outputs a control signal in accordance with the running speed or the working load to command the supercharger transmission 190 to select a speed reduction ratio. In accordance with the selected speed reduction ratio, the supercharger transmission 190 further changes the rotational speed of the output shaft 181 that has been changed by the automatic transmission 40c, thereby rotating the ring gear 14 through the shaft 184. From this time (M2), as shown in FIG. 34, the rotational speed of the mechanical supercharger 20 is varied along a curve SC-1 and the rotational speed of the ring gear 14 is varied along a curve SC-1, for example. In FIG. 34, curves SC-1, SC-2, and SC-3, representing the rotational speed of the supercharger transmission 90, correspond respectively to curves 3F-1, 3F-2, and 3F-3, representing the rotational speed of the ring gear 14.

(D-6) VEHICLE FURTHER ACCELERATED STATE WITH ADDITIONAL DEPRESSION OF ACCELERATOR PEDAL

When the accelerator pedal 61 is depressed even further to further accelerate the vehicle, the operation enters into a state of the time (M3) in FIG. 34. At this time (M3), the rotational speed of the engine 1 is raised to the position 3E and the ring gear 14 is rotating at a rotational speed 3F-3 in accordance with the speed reduction ratio of the supercharger transmission 190. Corresponding to the rotational speed of the engine 1 in the position 3E, therefore, the mechanical supercharger 20 is rotated through the planetary carrier 13, the planetary gears 12, and the sun gear 11 along the curve SC-3 as shown in FIG. 34.

(E-6) VEHICLE ACCELERATION END STATE WITH FURTHER DEPRESSION OF ACCELERATOR PEDAL

Since the rotational speed of the output shaft 181 of the automatic transmission 40c is varied in accordance with a command from the controller 60 and the speed reduction ratio of the supercharger transmission 190 is varied in correspondence with the vehicle speed, the rotational speed of the ring gear 14 is also automatically changed. Thus, as shown in FIG. 34, the rotational speed of the ring gear 14 is shifted from the low-speed curve SF-3 (point 5F) to the medium-speed curve SF-2 (point 5Fa). Correspondingly, the rotational speed of the mechanical supercharger 20 is shifted from the high-speed curve SC-3 (point 5S) to the medium-speed curve SC-2 (point 5Sa).

(F-6) STATE WHERE ENGINE ROTATIONAL SPEED OR VEHICLE SPEED IS ALMOST CONSTANT AT PREDETERMINED VALUE

After the time (M6), in this embodiment, the rotational speed of the ring gear 14 is shifted from the medium-speed curve SF-2 (point 6Fa) to the high speed curve SF-1 (point 6Fb) as with the above (E-6). Correspondingly, the rotational speed of the mechanical supercharger 20 is shifted from the medium-speed curve SC-2 (point 6Sa) to the low-speed curve SC-1 (point 6Sb). Therefore, when the vehicle speed is almost constant at a predetermined value, the mechanical supercharger 20 does not supply air in an excessive amount, and the output of the engine 1 is restricted, which results in better fuel economy.

(G-6) WHEN FURTHER ACCELERATING VEHICLE JUST AFTER ENTERING STEADY RUNNING, OR CLIMBING LONG SLOPE, OR THE LIKE

This state is the same as (G-3) WHEN FURTHER ACCELERATING VEHICLE JUST AFTER ENTERING STEADY RUNNING, OR CLIMBING LONG SLOPE, OR THE LIKE in the eleventh embodiment and, hence, will not be described here.

In the above description, the speed reduction ratio of the supercharger transmission 190 is changed in correspondence with the vehicle speed during the process, but the rotational speed of the mechanical supercharger 20 can be varied along any one of the curves SC-1, SC-2 and SC-3 continually. In this case, at the time (M2), the controller 60 outputs a command to the supercharger transmission 190 to select the speed reduction ratio based on a signal from the supercharger selection switch 192, operated by the operator for selecting the speed of the mechanical supercharger 20. In accordance with the command, any one of the curves SC-1A, SC-2A, and SC-3A, for example, is selected. Likewise, any one of the curves SF-1A, SF-2A and SF-3A, for example, is selected for the rotational speed of the ring gear 14.

The operation of the fifteenth embodiment using the manual transmission 40e will be described below with reference to FIG. 35.

(A-7) VEHICLE STOPPED STATE and (B-7) VEHICLE STARTUP STATE FROM STOPPED STATE are respectively the same as the above (A-4) VEHICLE STOPPED STATE and (B-4) VEHICLE START-UP STATE FROM STOPPED STATE in the twelfth embodiment and, hence, will not be described here.

(C-7) VEHICLE ACCELERATED STATE FROM START-UP STATE

At the time (M2), the operator depresses the accelerator pedal 61 downwardly in a larger amount. This time (M2)

represents a state where the vehicle is going to be accelerated from the low idling rotational speed of 700 rpm. The operator operates the control lever 59 in correspondence with the vehicle speed and depresses the accelerator pedal 61 downwardly. Thus, at this time (M2), upon the operation of the control lever by the operator, the first-gear of the manual transmission 40e is held in a meshed state. Based on the signals from the accelerator pedal depression sensor 62, the vehicle speed sensor 64, and the control lever position sensor 67, the controller 60 outputs a command to the supercharger transmission 190 to select a speed reduction ratio. In accordance with the selected speed reduction ratio, the supercharger transmission 190 further changes the rotational speed taken out of the output shaft 181 that has been changed by the automatic transmission 40c, thereby rotating the ring gear 14 through the shaft 184. From this time (M2), as shown in FIG. 35, the rotational speed of the mechanical supercharger 20 is varied along a curve SC-1A, and the rotational speed of the ring gear 14 is varied along a curve SF-1A, for example. In FIG. 35, curves SC-1A, SC-2A, and SC-3A, representing the rotational speed of the supercharger transmission 90, correspond respectively to curves 3F-1A, 3F-2A, and 3F-3A, representing the rotational speed of the ring gear 14.

(D-7) VEHICLE FURTHER ACCELERATED STATE WITH ADDITIONAL DEPRESSION OF ACCELERATOR PEDAL

This state is the same as (D-6) VEHICLE FURTHER ACCELERATED STATE WITH ADDITIONAL DEPRESSION OF ACCELERATOR PEDAL in the fourteenth embodiment and, hence, will not be described here.

At this time (M3), when the operator makes a shift from the first-gear position to the second-gear position in correspondence with the vehicle speed, the rotational speeds of the engine 1, the ring gear 14, and the mechanical supercharger 20 are momentarily reduced as with the twelfth embodiment. Such a drop is indicated by a dot line (Aap) in the form of saw teeth in FIG. 35. As with the thirteenth embodiment, the one-way clutch 186 is interposed between the mechanical supercharger 20 and the differential planetary gearing 10 in the fourteenth embodiment to prevent the rotational speed of the mechanical supercharger 20 from lowering momentarily. The thus-resulting rotational speed of the mechanical supercharger 20 is indicated by the curve SC-1A, SC-2A or SC-3A in FIG. 35.

(E-7) VEHICLE ACCELERATION END STATE WITH FURTHER DEPRESSION OF ACCELERATOR PEDAL

The rotational speed of the output shaft 181a of the manual transmission 40e is varied in accordance with the gear change made by the operator, and the controller 60 outputs a command to the supercharger transmission 190 to select a speed reduction ratio based on the signals from the accelerator pedal depression sensor 62, the vehicle speed sensor 64, and the control lever position sensor 67. In accordance with the selected speed reduction ratio, the supercharger transmission 190 further changes the rotational speed taken out of the output shaft 181a that has been changed by the manual transmission 40e, thereby rotating the ring gear 14 through the shaft 184. Thus, in response to the command from the controller 60, selected depending on the running speed or the working load, the rotational speed of the ring gear 14 is shifted from the low-speed curve SF-3A (point 5F) to the medium-speed curve SF-2A (point 5Fa), as shown in FIG. 35. Correspondingly, the rotational speed of the mechanical supercharger 20 is shifted from the high-speed curve SC-3A (point 5S) to the medium-speed curve SC-2A (point 5Sa).

(F-7) STATE WHERE ENGINE ROTATIONAL SPEED OR VEHICLE SPEED IS ALMOST CONSTANT AT PREDETERMINED VALUE

After the time (M6), in this embodiment, the rotational speed of the ring gear 14 is shifted from the medium-speed curve SF-2A (point 6Fa) to the high-speed curve SF-1A (point 6Fb) as with the above (F-6). Correspondingly, the rotational speed of the mechanical supercharger 20 is shifted from the medium-speed curve SC-2A (point 6Sa) to the low-speed curve SC-1A (point 6Sb). Therefore, when the vehicle speed is almost constant at a predetermined value, the mechanical supercharger 20 does not supply air in an excessive amount, and the output of the engine 1 is restricted, which results in better fuel economy.

(G-7) WHEN FURTHER ACCELERATING VEHICLE JUST AFTER ENTERING STEADY RUNNING, OR CLIMBING LONG SLOPE, OR THE LIKE

This state is the same as (G-4) WHEN FURTHER ACCELERATING VEHICLE JUST AFTER ENTERING STEADY RUNNING, OR CLIMBING LONG SLOPE, OR THE LIKE in the twelfth embodiment and, hence, will not be described here.

In the above process, the speed reduction ratio of the supercharger transmission 190 can be changed by the operator selectively operating the supercharger selection switch 192, as with the twelfth embodiment.

Practical examples of the supercharger transmission 190 of the differential driving supercharger for use in the fourteenth and fifteenth embodiments will be described below with reference to conceptual diagrams.

Figure 36:
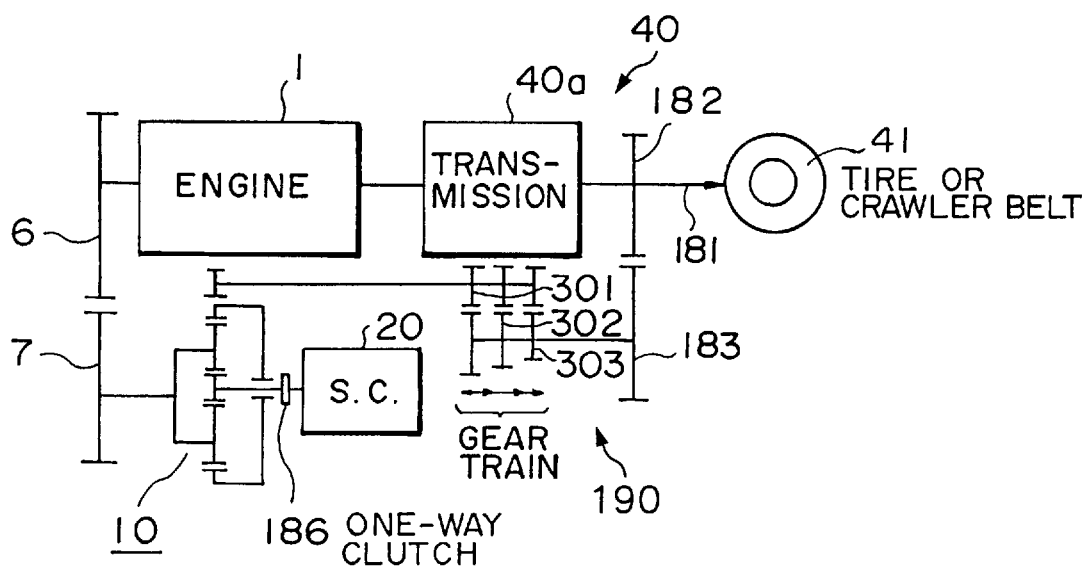
FIG. 36 is a diagram of an example wherein the supercharger transmission comprises a gear train.

FIG. 36 shows an example in which the supercharger transmission 190 comprises a train of gear pairs 301, 302, and 303. The speed reduction ratio is determined upon selective meshing of the desired one of the gear pairs 301, 302, and 303 by a synchromesh gear or the like in accordance with a command from the controller 60.

Figure 37:
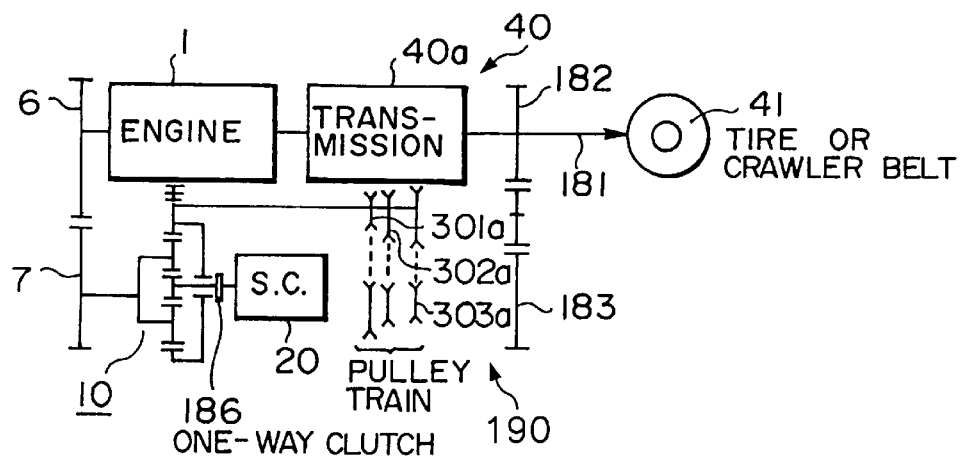
FIG. 37 is a diagram of an example wherein the supercharger transmission comprises a pulley train.

FIG. 37 shows an example in which the supercharger transmission 190 comprises a train of pulley pairs 301a, 302a, and 303a. The speed reduction ratio is determined upon selection of the desired one of the pulley pairs 301a, 302a, and 303a by the engagement of a clutch or the like in accordance with a command from the controller 60.

Figure 38:
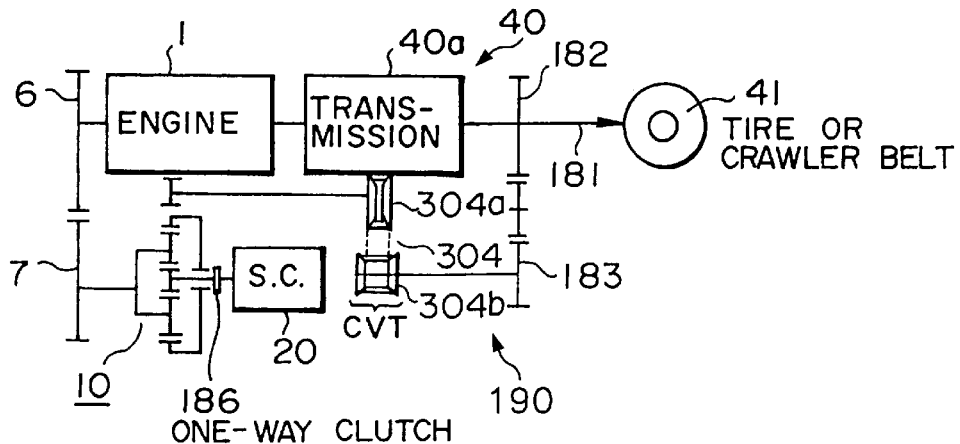
FIG. 38 is a diagram of an example wherein the supercharger transmission comprises a belt type continuously variable transmission (CVT).

FIG. 38 shows an example in which the supercharger transmission 190 comprises a belt type continuously variable transmission (CVT) 304. The speed reduction ratio is determined upon diameter change of pulleys 304a and 304b of the belt type continuously variable transmission 304 in accordance with a command from the controller 60.

Figure 39:
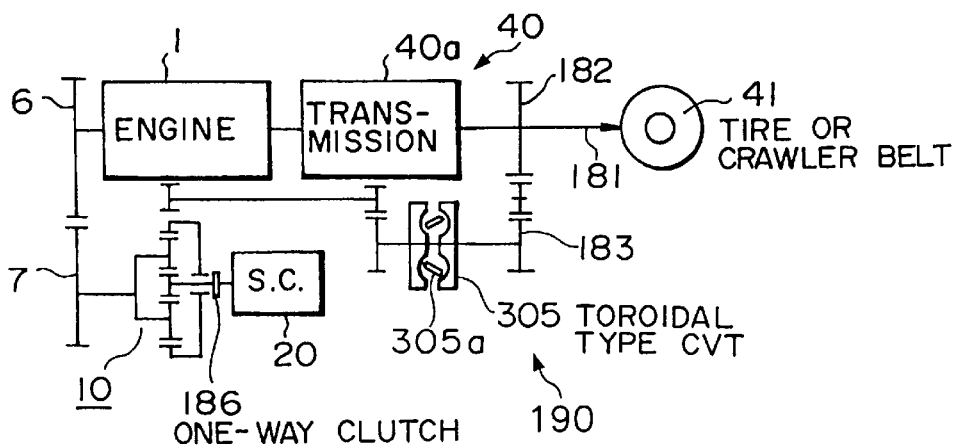
FIG. 39 is a diagram of an example wherein the supercharger transmission comprises a toroidal type continuously variable transmission.

FIG. 39 shows an example in which the supercharger transmission 190 comprises a toroidal type continuously variable transmission 305. The speed reduction ratio is determined upon position change of the contacts 305a of the toroidal type continuously variable transmission 305 in accordance with a command from the controller 60.

Figure 40:
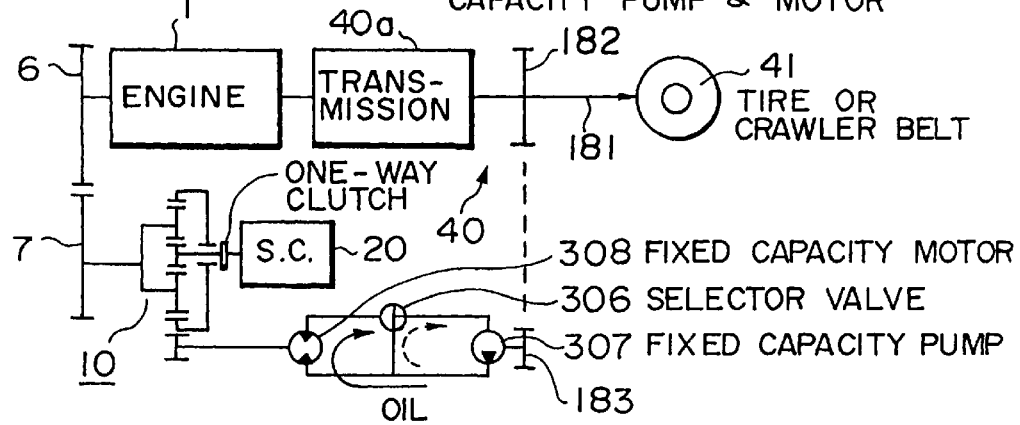
FIG. 40 is a diagram of an example wherein the supercharger transmission comprises a hydraulic combination of a selector valve, a fixed capacity pump, and a fixed capacity motor.

FIG. 40 shows an example in which the supercharger transmission 190 comprises a hydraulic combination of a selector valve 306, a fixed capacity pump 307, and a fixed capacity motor 308. The speed reduction ratio is determined by shifting a position of the selector valve 306 or by controlling a flow rate of oil passing through the same to thereby change a rotational speed of the fixed capacity motor 308 in accordance with a command from the controller 60.

Figure 41:
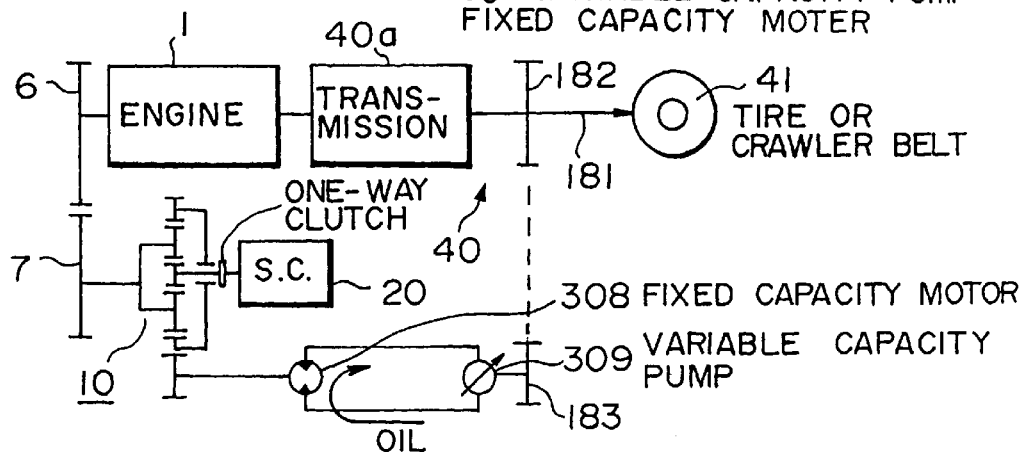
FIG. 41 is a diagram of an example wherein the supercharger transmission comprises a hydraulic combination of a variable capacity pump and a fixed capacity motor.

FIG. 41 shows an example in which the supercharger transmission 190 comprises a hydraulic combination of a variable capacity pump 309 and a fixed capacity motor 308. The speed reduction ratio is determined by controlling a delivery capacity of the variable capacity pump 309 to thereby change a rotational speed of the fixed capacity motor 308 in accordance with a command from the controller 60.

Figure 42:
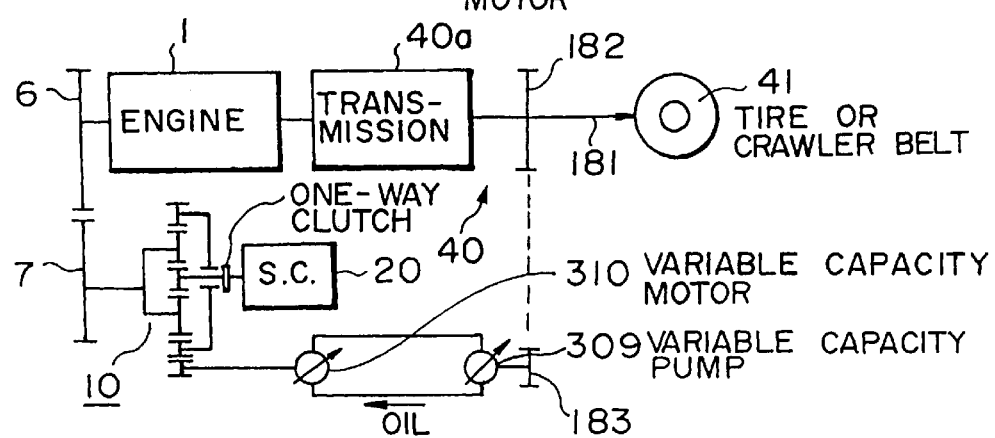
FIG. 42 is a diagram of an example wherein the supercharger transmission comprises a hydraulic combination of a variable capacity pump and a variable capacity motor.

FIG. 42 shows an example in which the supercharger transmission 190 comprises a hydraulic combination of a variable capacity pump 309 and a variable capacity motor 310. The speed reduction ratio is determined by controlling a delivery capacity of the variable capacity pump 309 or the motor 310, to thereby change a rotational speed of the variable capacity motor 310 in accordance with a command from the controller 60.

Figure 43:
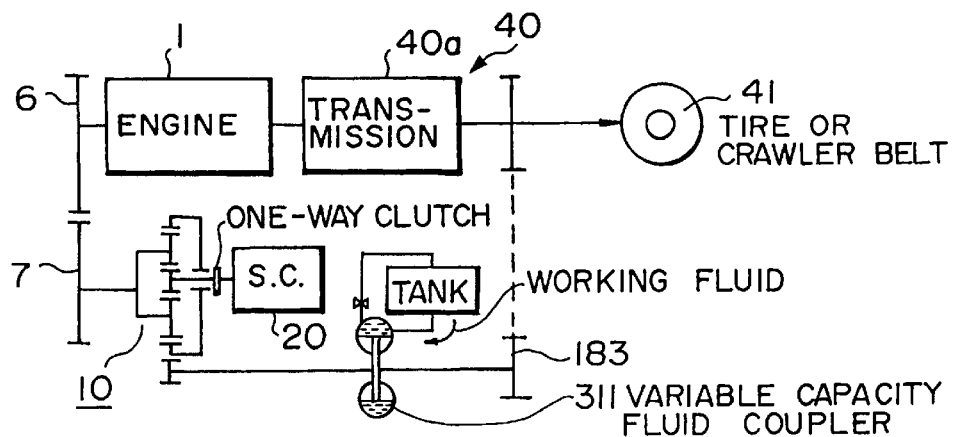
FIG. 43 is a diagram of an example wherein the supercharger transmission comprises a variable capacity fluid coupler.

FIG. 43 shows an example in which the supercharger transmission 190 comprises a variable capacity fluid coupler 311. The speed reduction ratio is determined by controlling a flow rate of working oil supplied to the fluid coupler 311, to thereby change a rotational speed of the variable capacity fluid coupler 311 in accordance with a command from the controller 60.

Figure 44:
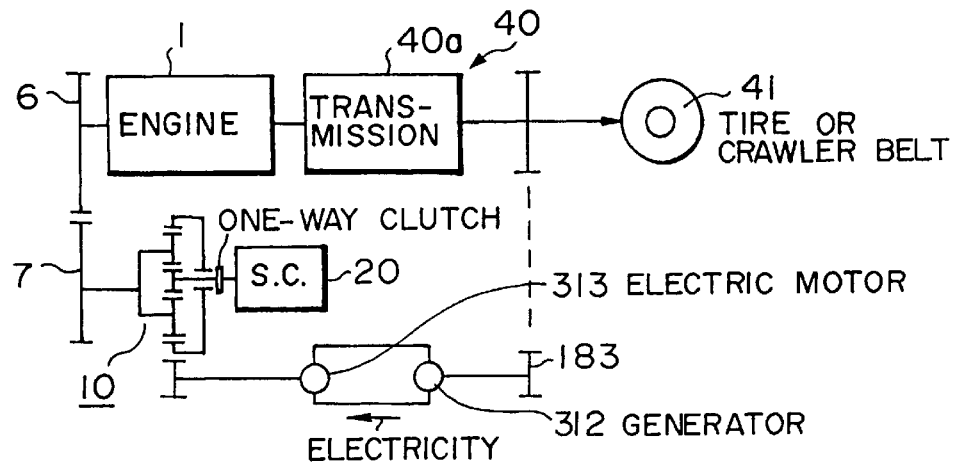
FIG. 44 is a diagram of an example wherein the supercharger transmission comprises an electrical combination of a generator and an electric motor.

FIG. 44 shows an example in which the supercharger transmission 190 comprises an electrical combination of a generator 312 and a motor 313. The speed reduction ratio is determined by controlling a current or voltage supplied to the generator 312 or the motor 313, to thereby change a rotational speed of the motor 313 in accordance with a command from the controller 60.

Next, differential driving superchargers of the sixteenth and seventeenth embodiments according to the present invention will be described. In the eleventh and twelfth embodiments described above, the ring gear 14 of the differential planetary gearing 10 is rotated by receiving the power from the transmission 40*a* of the driving force transmission system 40 or from midway between the transmission 40*a* and the tire 41. Also, in the thirteenth and fourteenth embodiments described above, the supercharger transmission 190 is added to the eleventh and twelfth embodiments.

The sixteenth and seventeenth embodiments of the present invention each include, in addition to the arrangement of the foregoing embodiments, a supercharger clutch 315 for controlling the rotation of the ring gear 14 of the differential planetary gearing 10 to be connected or disconnected selectively. The following description will be made as obtaining the power from midway between the transmission 40*a* and the tire 41. In view of the fact that the vehicle load during steady running is low and the engine output torque is not required to be increased by the mechanical supercharger 20, the supercharger clutch 315 is disengaged during the steady running. This makes the load of the ring gear 14 so small that the ring gear 14 idly rotates, As a result, the mechanical supercharger 20 stops its rotation, and a loss of the driving force is eliminated.

Figure 45:
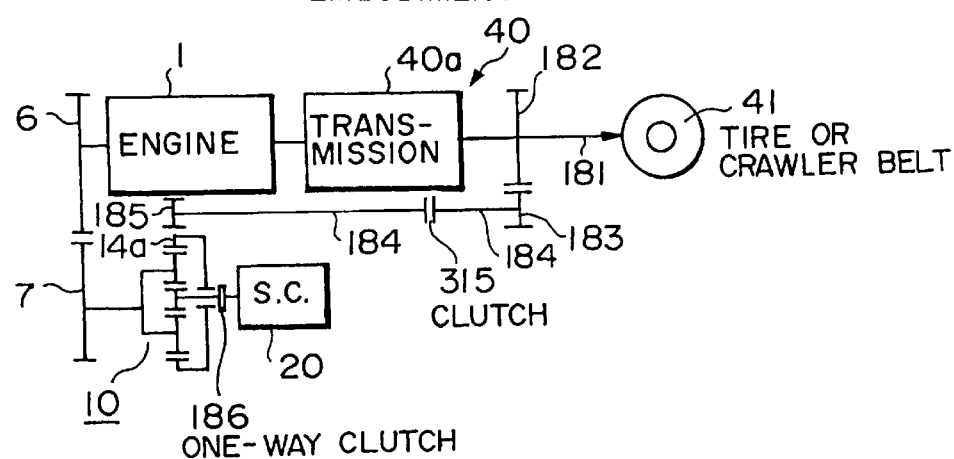
FIG. 45 is a conceptual diagram of a differential driving supercharger, the view showing a sixteenth embodiment of the present invention (including a supercharger clutch).

FIG. 45 is a conceptual diagram of a differential driving supercharger, the view showing a sixteenth embodiment of the present invention. The driving force transmission system 40 includes a gear 182 mounted on the output shaft 181 between the transmission 40*a* and the tire 41. The gear 182 is meshed with a gear 183 which is joined through a shaft 184 and a supercharger clutch 315 to a gear 185 for driving the ring gear 14. The gear 185 is meshed with the outer teeth 14*a* of the ring gear 14 of the differential planetary gearing 10.

The operation of this embodiment thus constructed will be described below with reference to FIG. 27.

In (A-8) VEHICLE STOPPED STATE, (B-8) VEHICLE START-UP STATE FROM STOPPED STATE, (C-8) VEHICLE ACCELERATED STATE FROM START-UP STATE, and (D-8) VEHICLE FURTHER ACCELERATED STATE WITH ADDITIONAL DEPRESSION OF ACCELERATOR PEDAL, the controller 60 engages the supercharger clutch 315, based on the signals from the accelerator pedal depression sensor 62, the vehicle speed sensor 64, and/or the control lever position sensor 67. As a result, the mechanical supercharger 20 is rotated at low and medium speeds of the engine 1 to increase the engine output torque.

In (E-8) VEHICLE ACCELERATION END STATE WITH FURTHER DEPRESSION OF ACCELERATOR PEDAL or (F-8) STATE WHERE ENGINE ROTATIONAL SPEED OR VEHICLE SPEED IS ALMOST CONSTANT AT PREDETERMINED VALUE, the controller 60 disengages the supercharger clutch 315, based on the signals from the accelerator pedal depression sensor 62, the vehicle speed sensor 64, and/or the control lever position sensor 67. Therefore, the ring gear 14 is deprived of the driving force to idly rotate, so that the rotation of the mechanical supercharger 20 is stopped. As a result, a loss of the driving force for the mechanical supercharger 20 is eliminated, and fuel economy is improved.

Figure 46:
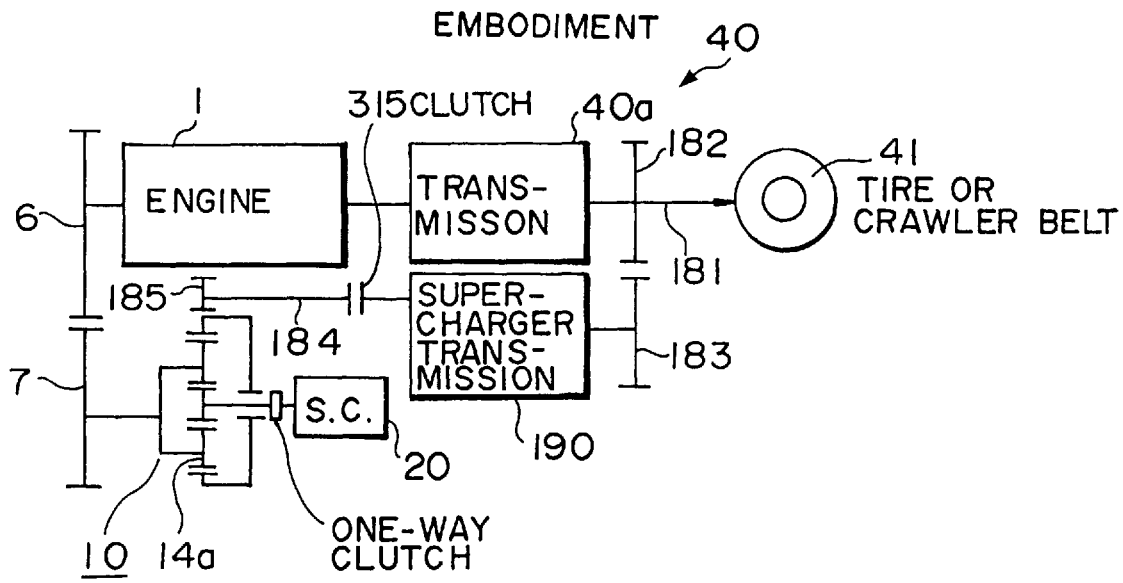
FIG. 46 is a conceptual diagram of a differential driving supercharger, the view showing a seventeenth embodiment of the present invention (including a supercharger clutch and a supercharger transmission).

FIG. 46 is a conceptual diagram of a differential driving supercharger, the view showing a seventeenth embodiment of the present invention. The driving force transmission system 40 includes a gear 182 mounted on the output shaft 181 between the transmission 40*a* and the tire 41. The gear 182 is meshed with a gear 183 which is joined through a shaft 184, a supercharger transmission 190 and a supercharger clutch 315 to a gear 185 for driving the ring gear 14. The gear 185 is meshed with the outer teeth 14*a* of the ring gear 14 of the differential planetary gearing 10.

The operation of this embodiment thus constructed will be described below with reference to FIG. 34.

In (A-9) VEHICLE STOPPED STATE, (B-9) VEHICLE START-UP STATE FROM STOPPED STATE, (C-9) VEHICLE ACCELERATED STATE FROM START-UP STATE, and (D-9) VEHICLE FURTHER ACCELERATED STATE WITH ADDITIONAL DEPRESSION OF ACCELERATOR PEDAL, the controller 60 selects a speed reduction ratio of the supercharger transmission 190 and establishes the connection of both of the supercharger transmission 190 and the supercharger clutch 315, based on the signals from the accelerator pedal depression sensor 62, the vehicle speed sensor 64, the control lever position sensor 67, and/or the supercharger selection switch 192. As a result, the mechanical supercharger 20 is rotated at low and medium speeds of the engine 1 to increase the engine output torque.

In (E-9) VEHICLE ACCELERATION END STATE WITH FURTHER DEPRESSION OF ACCELERATOR PEDAL or (F-9) STATE WHERE ENGINE ROTATIONAL SPEED OR VEHICLE SPEED IS ALMOST CONSTANT AT PREDETERMINED VALUE, the controller 60 disengages the supercharger clutch 315, based on the signals from the accelerator pedal depression sensor 62, the vehicle speed sensor 64, the control lever position sensor 67, and/or the supercharger selection switch 192. Therefore, the ring gear 14 is deprived of the driving force to idly rotate, so that the rotation of the mechanical supercharger 20 is stopped. As a result, a loss of the driving force for the mechanical supercharger 20 is eliminated and fuel economy is improved.

While the transmission 40a is not specifically limited in the above embodiments, it can be either the automatic transmission 40c or the manual transmission 40e. Also, the one-way clutch 186 is illustrated as being interposed between the mechanical supercharger 20 and the differential planetary gearing 10, but it can be dispensed with.

Figure 47:
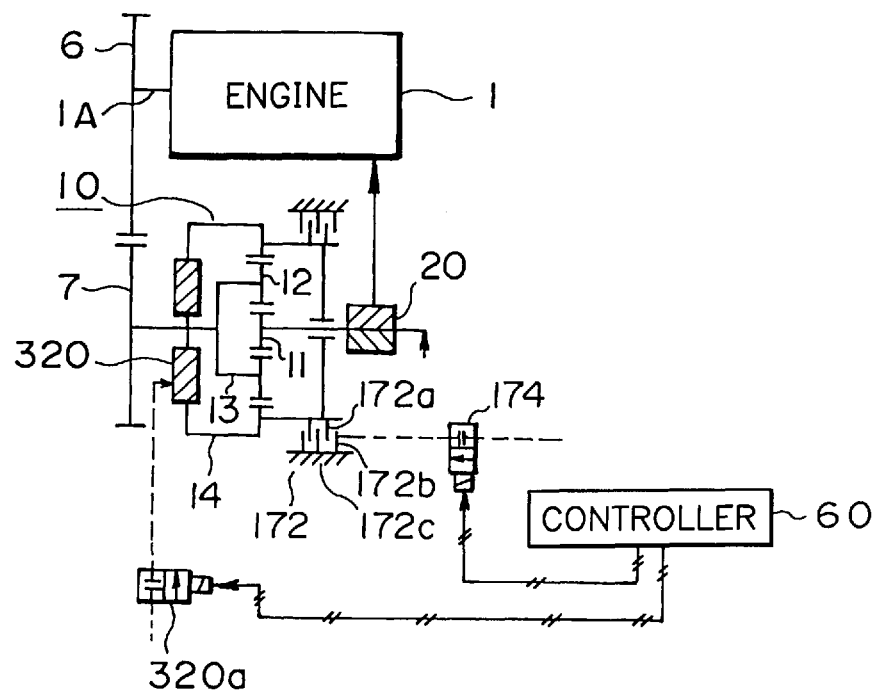
FIG. 47 is a conceptual diagram of a differential driving supercharger, the view showing an eighteenth embodiment of the present invention (including a continuously variable transmission for the ring gear).

Next, a differential driving supercharger of an eighteenth embodiment according to the present invention will be described with reference to FIG. 47.

In the eighteenth embodiment, the differential planetary gearing 10 comprises a sun gear 11, planetary gears 12, a planetary carrier 13, and a ring gear 14. Power of the engine 1 is inputted to the differential planetary gearing 10 through both a gear 6, fixedly attached to the engine output shaft 1A, and a gear 7, which is held in mesh with the gear 6 and fixedly attached to the planetary carrier 13. Further, between the gear 7 and the ring gear 14, there is disposed a ring gear continuously variable transmission 320, which is fixed to the gear 7.

The ring gear continuously variable transmission 320 comprises a belt type continuously variable transmission (CVT) or a toroidal type continuously variable transmission of which pulleys or contacts are controlled under a hydraulic pressure supplied through a ring gear solenoid valve 320a to vary a rotational speed of the ring gear 14 in accordance with a command from the controller 60.

The planetary gears 12, usually three in number, are rotatably mounted on the planetary carrier 13 with equal angular spacings therebetween. The three planetary gears 12 are each held in mesh with the sun gear 11 on the inner side and with the ring gear 14 on the outer side. The mechanical supercharger 20 is connected to the sun gear 11. On the outer side of the ring gear 14, the brake plates 172a of the brake unit 172 are attached to the ring gear 14, and the fixed-side brake plates 172b are attached to a fixed case 172c, such that all of the brake plates are relatively slidable in the axial direction and are in interdigitated relations. In accordance with respective commands from the controller 60, the brake unit 172 is operated to engage and disengage the brake plates 172a and the fixed-side brake plates 172b under a hydraulic pressure supplied through a brake solenoid valve 174.

With the above arrangement, including the ring gear continuously variable transmission 320 between the engine 1 and the ring gear 14 of the differential planetary gearing 10, the ring gear continuously variable transmission 320 can be made small in capacity, more compact, and inexpensive by utilizing a speed reduction ratio of the differential planetary gearing 10.

The operation of this embodiment thus constructed will be described below with reference to FIG. 34.

In (A-10) VEHICLE STOPPED STATE, (B-10) VEHICLE START-UP STATE FROM STOPPED STATE, (C-10) VEHICLE ACCELERATED STATE FROM START-UP STATE, and (D-10) VEHICLE FURTHER ACCELERATED STATE WITH ADDITIONAL DEPRESSION OF ACCELERATOR PEDAL, the controller 60 selects a speed reduction ratio of the ring gear continuously variable transmission 320 so as to rotate the mechanical supercharger 20 at a high speed based on the signals from the accelerator pedal depression sensor 62, the vehicle speed sensor 64, the control lever position sensor 67, and/or the supercharger selection switch 192. As a result, the mechanical supercharger 20 is rotated fast at low and medium speeds of the engine 1 to increase the engine output torque.

In (E-10) VEHICLE ACCELERATION END STATE WITH FURTHER DEPRESSION OF ACCELERATOR PEDAL or (F-10) STATE WHERE ENGINE ROTATIONAL SPEED OR VEHICLE SPEED IS ALMOST CONSTANT AT PREDETERMINED VALUE, the controller 60 shifts the ring gear continuously variable transmission 320 so as to rotate the mechanical supercharger 20 at a low speed based on the signals from the accelerator pedal depression sensor 62, the vehicle speed sensor 64, the control lever position sensor 67, and/or the supercharger selection switch 192. In the initial stage of the acceleration in the above process, the speed-up ratio is set to be large, to rotate the mechanical supercharger 20 at a higher speed for increasing the accelerating force. In the late stage of the acceleration, the speed-up ratio is set to be small, to rotate the mechanical supercharger 20 at a lower speed for transition to steady running. This is also effective to reduce a loss of the driving force for the mechanical supercharger 20 and to improve fuel economy.

Practical examples of the ring gear continuously variable transmission 320 of the differential driving supercharger for use in the eighteenth embodiment will be described below with reference to conceptual diagrams.

Figure 48:
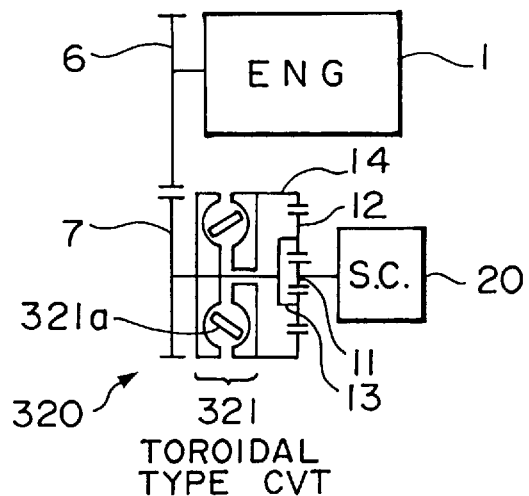
FIG. 48 is a diagram of an example wherein a toroidal type continuously variable transmission is used as the continuously variable transmission for the ring gear.

FIG. 48 shows an example in which the ring gear continuously variable transmission 320 comprises a toroidal type continuously variable transmission 321. The speed reduction ratio is determined upon position change of contacts 321a of the toroidal type continuously variable transmission 321 in accordance with a command from the controller 60.

Figure 49:
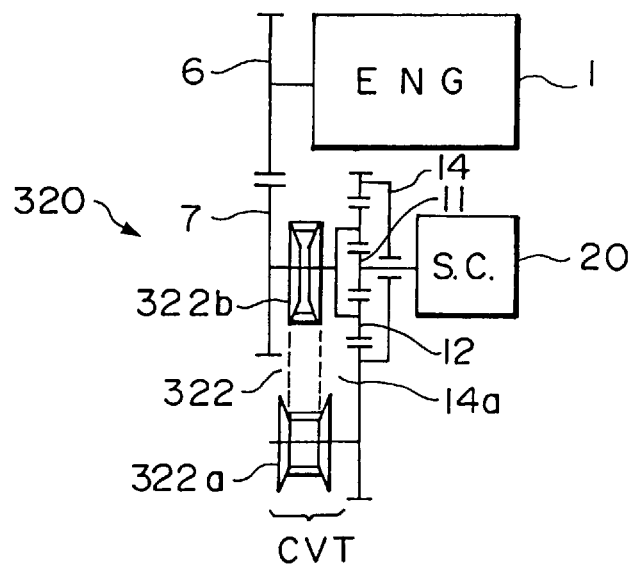
FIG. 49 is a diagram of an example wherein a belt type continuously variable transmission (CVT) is used as the continuously variable transmission for the ring gear.

FIG. 49 shows an example in which the ring gear continuously variable transmission 320 comprises a belt type continuously variable transmission (CVT) 322. The speed reduction ratio is determined upon a diameter change of pulleys 322a and 322b of the belt type continuously variable transmission 322 in accordance with a command from the controller 60.

Figure 50:
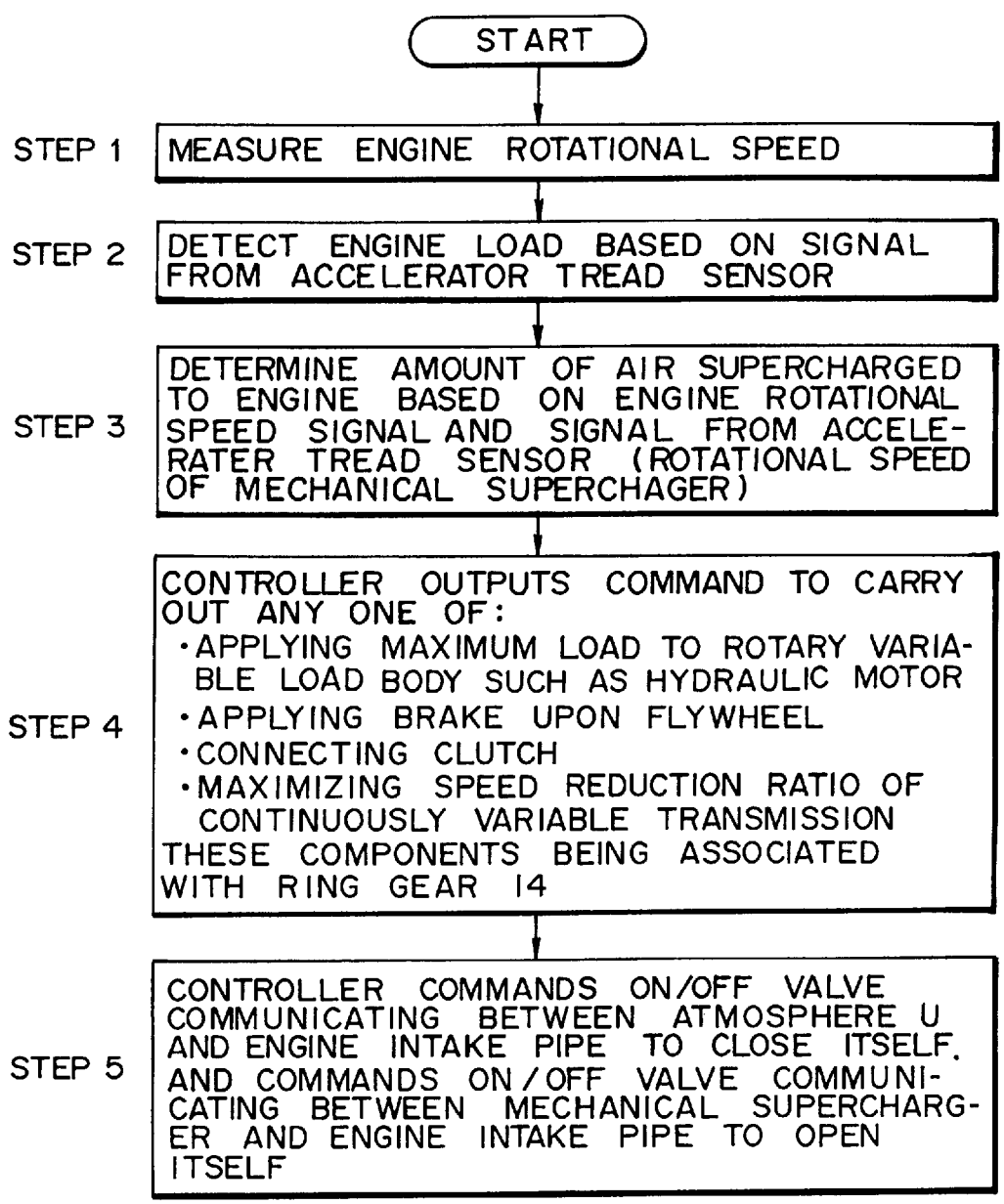
FIG. 50 is a flowchart for explaining the operation of main ones of the differential driving superchargers shown as the first to eighteenth embodiments of the present invention.

The foregoing operation of the differential driving supercharger can be summarized into a flowchart shown in FIG. 50. In step 1, the rotational speed of the engine 1 is detected, based on the rotational speed signal from the engine revolution number sensor 63.

In step 2, a load instruction applied from the operator to the engine 1 is detected, based on the signal from the accelerator pedal depression sensor 62 for detecting the amount of the depression of the accelerator pedal 61, or the signal from the rack position-sensor 66 associated with the injection pump 65.

In step 3, based on the rotational speed signal from the engine revolution number sensor 63 and the signal from the accelerator pedal depression sensor 62 (or the rack position sensor 66), the controller 60 determines an amount of air supercharged to the engine 1 from the mechanical supercharger 20, i.e., a target value of the rotational speed of the mechanical supercharger 20, from a map stored in a memory (not shown).

In step 4, depending on the determined rotational speed of the mechanical supercharger 20, the controller 60 outputs a command to the rotary variable load body, the flywheel 171, the clutch 186, or the continuously variable transmission 320 to carry out any one of applying a maximum load to the rotary variable load body, such as the hydraulic motor 30 associated with the ring gear 14, applying a brake upon the flywheel 171 associated with the ring gear 14, engaging the clutch 186 connected to the ring gear 14, or maximizing a speed reduction ratio of the continuously variable transmission 320 connected to the ring gear 14.

In step 5, the controller 60 outputs a command to the on/off valve 22, communicating between the atmosphere U and the intake pipe 23 of the engine 1, to close itself, and a command to the on/off valve 25, communicating between the atmosphere U and the intake pipe 23 of the engine 1, to open itself.

Figure 51:
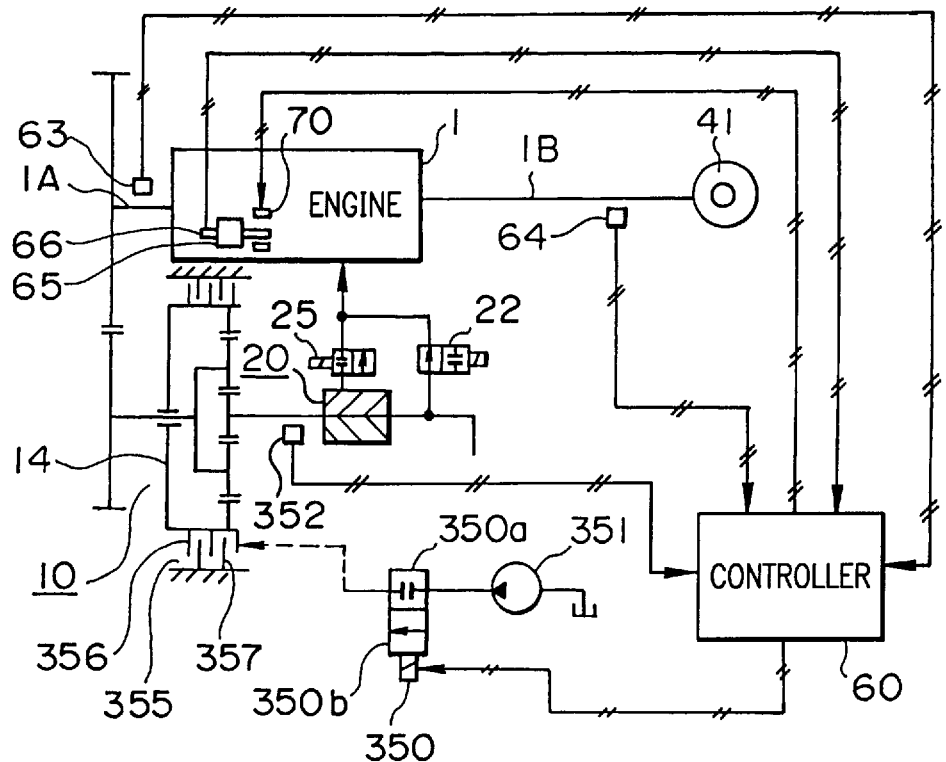
FIG. 51 is a conceptual diagram of a differential driving supercharger, the view showing a nineteenth embodiment of the present invention.

FIG. 51 is a conceptual diagram of a differential driving supercharger, the view showing a nineteenth embodiment of the present invention. While in the ninth embodiment the mechanical supercharger 20 is coupled to the differential planetary gearing 10, the brake unit 72 is associated with the ring gear 14, and the flywheel 171 is coupled to the ring gear 14 through the clutch unit 170, the nineteenth embodiment includes a clutch unit 355 associated with the ring gear 14. Also, in the ninth embodiment, the brake unit 72 is operated to engage and disengage the brake plates 172a and the fixed-side brake plates 172b under a hydraulic pressure supplied through the brake solenoid valve 174. By contrast, in the nineteenth embodiment, the clutch unit 355 comprises the movable clutch plates 356, on the side of the ring gear 14, and the fixed-side clutch plates 357, secured to a case around the ring gear 14, and is operated to engage and disengage all of the clutch plates or make a high-speed switching between the engaged and disengaged states under a hydraulic pressure supplied through a high-speed solenoid valve 350. The high-speed solenoid valve 350 is connected to the controller 60 and, upon receiving a command from the controller 60, supplies a hydraulic pressure from a pilot pump (not shown) to the clutch unit 355. Inputs to the controller 60 are the rotational speed signal from the engine revolution number sensor 63 associated with the engine 1 and the signal from the rack position sensor 66 for detecting the rack position of the injection pump 65.

The operation of this embodiment thus constructed will be described below.

Figure 52:
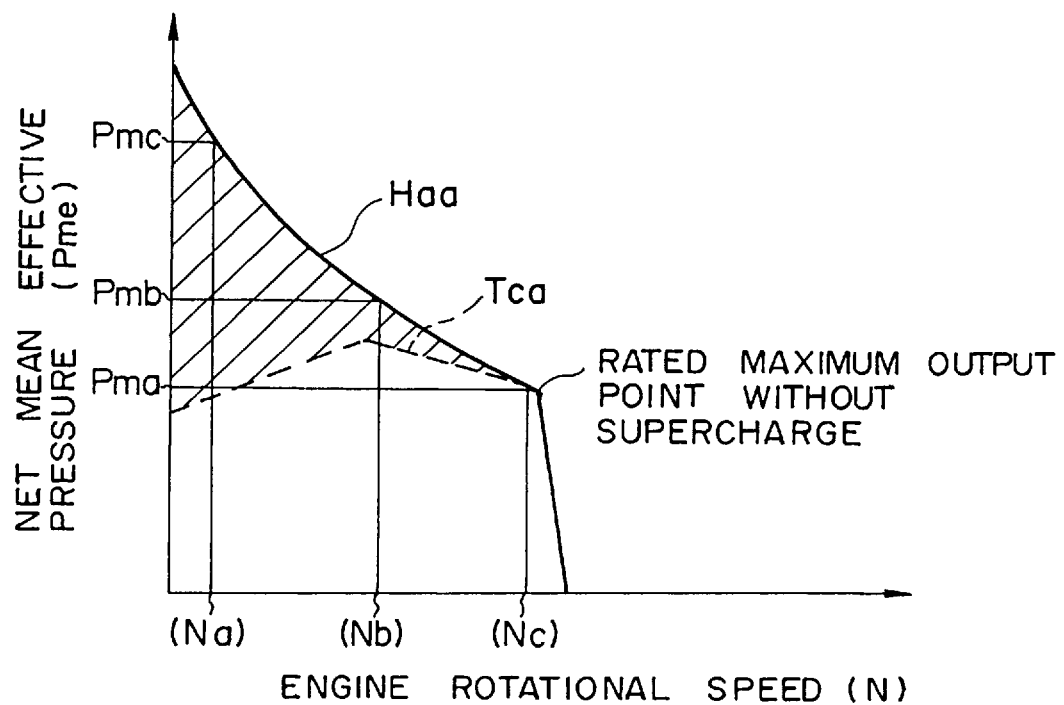
FIG. 52 is a graph for explaining a net mean effective pressure in the present invention and a net mean effective pressure in the prior art with respect to the engine rotational speed.
Figure 53:
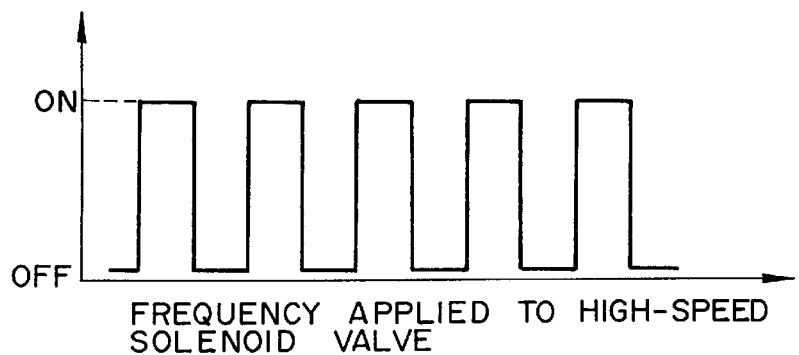
FIG. 53 is a chart for explaining the operation of high-speed on/off switching control of a high-speed solenoid valve.

A description will be made with reference to FIG. 52. In FIG. 52, the horizontal axis represents a rotational speed of the engine 1 and the vertical axis represents a net mean effective pressure. Referring to FIG. 52, when the controller 60 determines the engine rotational speed to be in the rated load rotational speed position (point Na), based on the rotational speed signal from the engine revolution number sensor 63, and also determines a load instruction to the engine 1 to be near the rated maximum output point without supercharge (point Pma), based on the signal from the rack position sensor 66 for the injection pump 65, the controller 60 does not output a command to the high-speed solenoid valve 350 so that the valve 350 is held in a port position 350a to supply no hydraulic pressure from the pilot pump 351 to the clutch unit 355. Therefore, the movable clutch plates 356 and the fixed-side clutch plates 357 are disengaged from each other. Since this allows the ring gear 14 to freely rotate, the speed reduction ratio of the differential planetary gearing 10 becomes zero to stop the mechanical supercharger 20 and effect no supercharging of air to the engine 1. Then, when the controller 60 determines the rotational speed of the engine 1 to be near the medium-speed rotational speed position (point Nb) and also determines a load instruction to the engine 1 to be near the higher output point (point Pmb), based on the signal from the rack position sensor 66, the controller 60 outputs a command for high-speed on/off switching control of the high-speed solenoid valve 350 as shown in FIG. 53, so that the valve 350 is switched at a high speed between its port positions 350a and 350b, causing the hydraulic pressure from the pilot pump 351 to be supplied to the clutch unit 355 in a rapid intermittent manner. Therefore, the movable clutch plates 356 and the fixed-side clutch plates 357 repeat the engagement and disengagement at a high speed, so that the ring gear 14 is rotated at a reduced speed responsive to the switching control speed of the high-speed solenoid valve 350. As a result, the rotation of the ring gear 14 is restricted, the speed reduction ratio of the differential planetary gearing 10 becomes a medium value, and the mechanical supercharger 20 is rotated at a medium speed to effect supercharging of air to the engine 1. Correspondingly, the net mean effective pressure of the engine 1 is raised to the medium-speed rotational speed position (point Pmb) giving a higher pressure than near the rated maximum output point without supercharge, and the generated torque is also increased.

Subsequently, when the controller 60 determines the rotational speed of the engine 1 to be near the low-speed rotational speed position (point Nc) and also determines a load instruction to the engine 1 to be near the even higher output point (point Pmc), based on the signal from the rack position sensor 66, the controller 60 outputs a command to the high-speed solenoid valve 350 to switch to the port position 350b, so that the hydraulic pressure from the pilot pump 351 is continuously supplied to the clutch unit 355. Therefore, the movable clutch plates 356 and the fixed-side clutch plates 357 are held engaged, to stop the rotation of the movable clutch plates 356. As a result, the rotation of the ring gear 14 is stopped, the speed reduction ratio of the differential planetary gearing 10 becomes a maximum value, and the mechanical supercharger 20 is rotated at a higher speed to increase the amount of air supercharged to the engine 1. Correspondingly, the net mean effective pressure of the engine 1 is raised to the low rotational speed position (point Pmc), giving a higher pressure than in the medium rotational speed position, and the generated torque is also further increased.

As a result of the above, while an upper limit curve of the output torque of a prior art engine without supercharge is expressed by the dashed line Tca in FIG. 52, the net mean effective pressure is enlarged in the present invention, as indicated by a hatched area in FIG. 52, because the mechanical supercharger 20 is driven by the differential planetary gearing 10 at a variable rotational speed. Thus, as will be seen from FIG. 52, the mechanical supercharger 20 can be controlled by the differential planetary gearing 10 within an operating area which is defined between two curves, i.e., at an upper limit by an output constant curve (solid line Haa) passing the rated maximum output point without supercharge, and at a lower limit by the vicinity of the upper limit curve (solid line Haa) of the output torque of the prior art engine without supercharge or by the vicinity of an output upper limit curve of the prior art engine without supercharge just before smoke deterioration (due to a lowering of the air excess rate).

In the above process, the clutch unit 355 is disengaged at the rated load rotational speed position (point Na) and engaged near the low-speed rotational speed position (point Nc). Also, in the medium-speed rotational speed position (point Pmb), between the rated load rotational speed position (point Na) and the low-speed rotational speed position (point Nc), the high-speed solenoid valve 350 is operated to close for a predetermined time and open for a variable time, for example, thereby applying a braking torque to the ring gear 14 so that the ring gear 14 is rotated at a variable speed. As a result, the rotational speed of the ring gear 14 ranging from the rated load rotational speed position (point Na) to near the low-speed rotational speed position (point Nc) is changed variably along a curve of primary or secondary degree, etc. With this change in the rotational speed of the ring gear 14, the rotational speed of the mechanical supercharge 20 is also changed.

Figure 54:
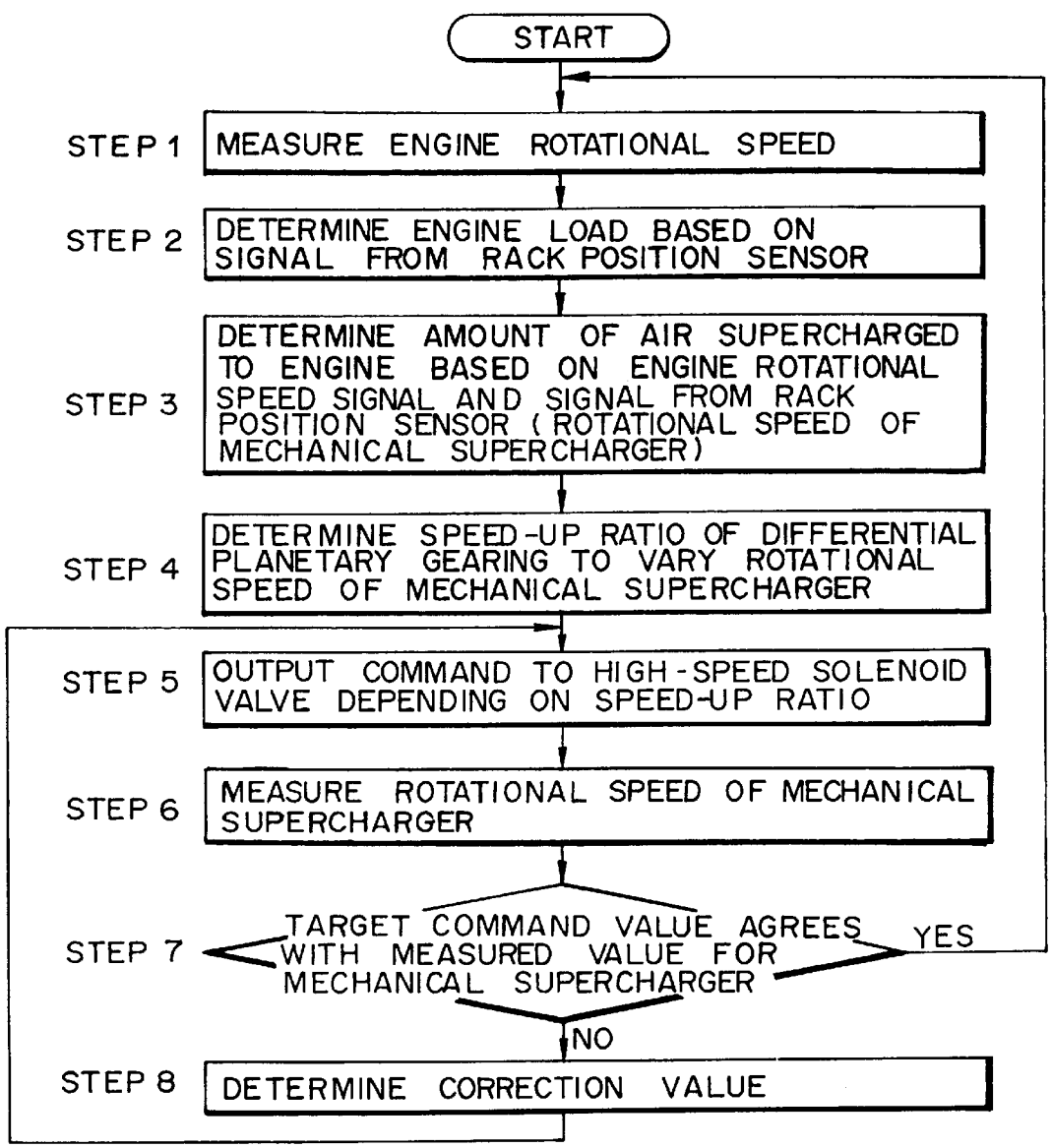
FIG. 54 is a flowchart showing the operation of the nineteenth embodiment.

The above-described control can be summarized into a flowchart shown in FIG. 54.

In step 1, the rotational speed of the engine 1 is detected, based on the rotational speed signal from the engine revolution number sensor 63.

In step 2, a load instruction applied from the operator to the engine 1 is detected, based on the signal from the rack position sensor 66 for the injection pump 65.

In step 3, based on the rotational speed signal from the engine revolution number sensor 63 and the signal from the rack position sensor 66, the controller 60 determines an amount of air supercharged to the engine 1 from the mechanical supercharger 20, i.e., a target value of the rotational speed of the mechanical supercharger 20, from a map stored in a memory (not shown).

In step 4, depending on the amount of air supercharged to the engine 1 from the mechanical supercharger 20, the controller 60 determines a speed reduction ratio of the differential planetary gearing 10 to vary the rotational speed of the mechanical supercharger 20 from a map stored in the memory (not shown).

In step 5, depending on the determined speed reduction ratio of the differential planetary gearing 10, the controller 60 outputs a command to the high-speed solenoid valve 350 to perform engagement, slippage, and disengagement between the variable brake plates 172*a* and the fixed-side brake plates 172*b*.

In step 6, the rotational speed of the mechanical supercharger 20 is detected, based on the rotational speed signal from a mechanical supercharger revolution number sensor 352.

In step 7, the target value of the rotational speed of the mechanical supercharger 20, determined in step 3, is compared with the rotational speed measured by the mechanical supercharger revolution number sensor 352 in step 6.

If both of the values agree with each other in step 7, then the control flow returns to step 1. If not, then the control flow goes to step 8 to determine a correction value, followed by returning to step 5.

Figure 55:
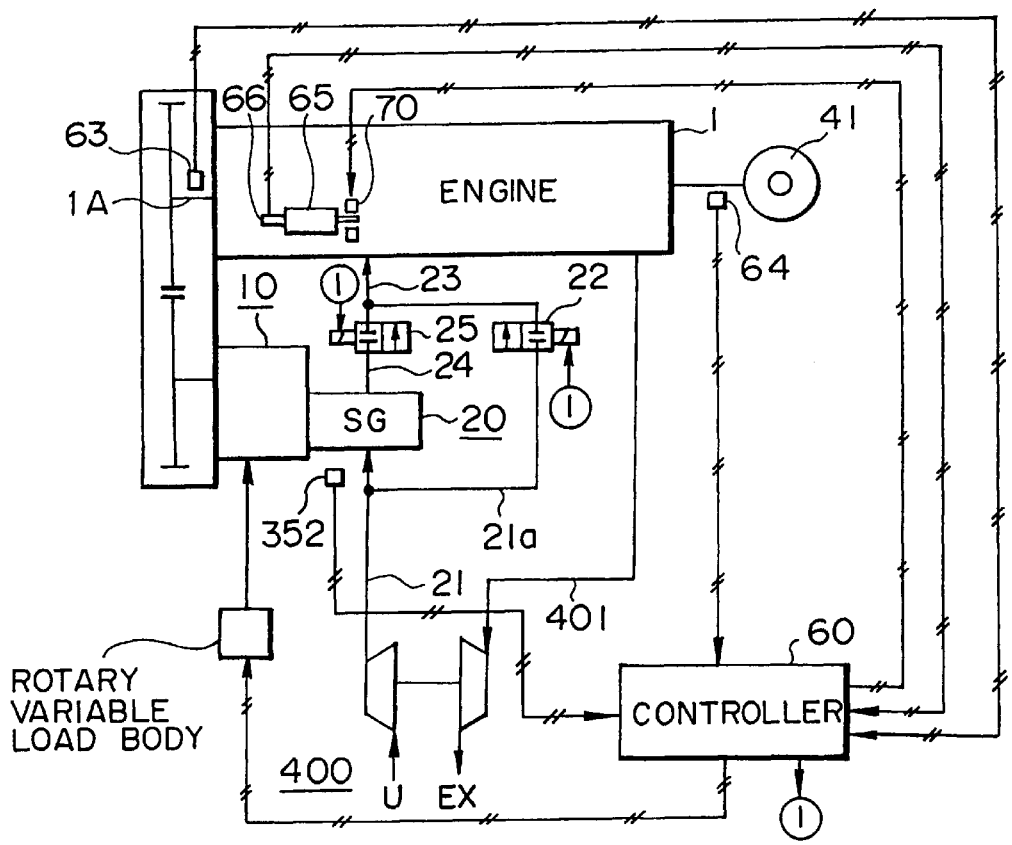
FIG. 55 is a conceptual diagram of a differential driving supercharger, the view showing a twentieth embodiment of the present invention.

FIG. 55 is a conceptual diagram of a differential driving supercharger, the view showing a twentieth embodiment of the present invention. In FIG. 55, the differential planetary gearing 10 is connected to the output shaft 1A of the engine 1, and the mechanical supercharger 20 and the rotary variable load body, e.g., the variable hydraulic motor 30, are associated with the differential planetary gearing 10. The line 21 on the intake side of the mechanical supercharger 20 is communicated with the atmosphere U through a turbosupercharger 400 and a filter (not shown), and the on/off valve 22 is disposed in a line 21*a*, which is branched from the line 21 between the mechanical supercharger 20 and the turbosupercharger 400, the line 21*a* being connected to the intake pipe 23 of the engine 1. The on/off valve 25 is disposed in the line 24 on the delivery side of the mechanical supercharger 20, the line 24 being connected to the intake pipe 23 of the engine 1. The on/off valves 22 and 25 are connected to the controller 60 and are opened and closed in accordance with commands from the controller 60 so that air is directly supplied from the atmosphere U to the engine 1 through the filter (not shown), the line 21*a*, the on/off valve 22, and the intake pipe 23, or air is supplied to the engine 1 through the mechanical supercharger 20, the line 24, the on/off valve 25, and the intake pipe 23, in a selective manner. An exhaust gas line 401 from the engine 1 is connected to the turbosupercharger 400. The other components, such as the controller 60, the engine revolution number sensor 63, the vehicle speed sensor 64, the injection pump 65, the rack position sensor 66, the control lever position sensor 67, and the shift position sensor 69, are not shown, but can be constructed or arranged similarly to those in FIG. 1.

The operation of this embodiment thus constructed will be described below.

Figure 56:
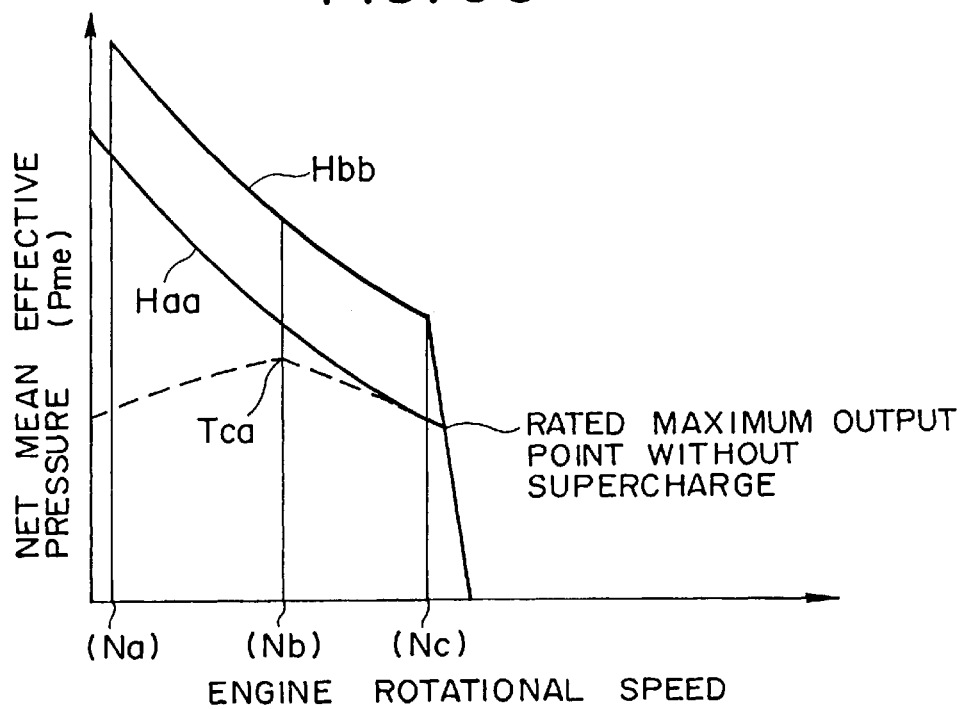
FIG. 56 is a graph for explaining a net mean effective pressure in the present invention equipped with a mechanical supercharger alone and a turbosupercharger in addition to the mechanical supercharger, and a net mean effective pressure in the prior art with respect to the engine rotational speed.
Figure 57:
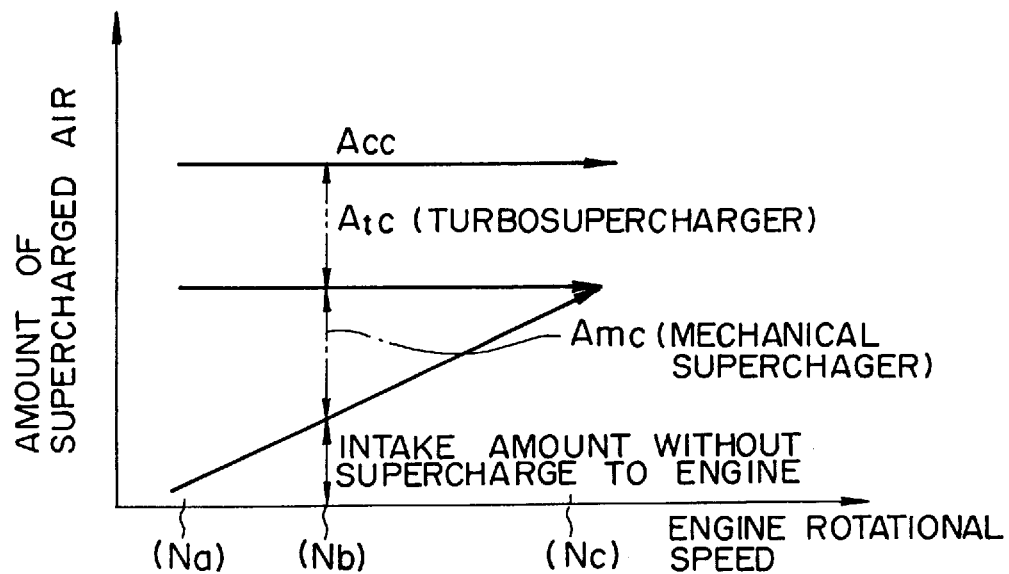
FIG. 57 is a graph for explaining the supply of air supercharged to the engine from the mechanical supercharger and the turbosupercharger in the present invention with respect to the engine rotational speed.

As with the above tenth embodiment, the mechanical supercharger 20 is driven by the differential planetary gearing 10 at a variable speed depending on change in the rotational speed of the engine 1. Specifically, as the rotational speed of the engine 1 lowers, the net mean effective pressure (Pme) is increased to make the engine 1 produce an equi-output (indicated by solid line Haa) as shown in FIG. 56. Referring to FIG. 57, the horizontal axis represents a rotational speed of the engine 1 and the vertical axis represents an amount of air supercharged to the engine 1. In FIG. 57, a one-dot-chain line represents an amount of air supercharged from the mechanical supercharger 20 and a two-dot-chain line represents an amount of air supercharged from the turbosupercharger 400. As seen from FIG. 57, in a low-speed rotation range (near the point Na) of the engine 1, the mechanical supercharger 20 is sped up by the differential planetary gearing 10 to a high speed so that air is supercharged in a sufficient amount to provide equi-horsepower as shown. At this time, the turbosupercharger 400 is rotated at a certain rotational speed while receiving the exhaust gas, thereby supplying air to the mechanical supercharger 20.

In a medium-speed rotation range (near the point Nb) of the engine 1, the mechanical supercharger 20 is sped up by the differential planetary gearing 10 to a medium speed so that air is supercharged in a predetermined amount (Amc). At this time, the turbosupercharger 400 is rotated at a certain rotational speed while receiving the exhaust gas, thereby supplying a predetermined amount (Atc) of air to the mechanical supercharger 20. As a result, the engine 1 is provided with a certain amount of air (indicated by a solid line Acc).

In a high-speed rotation range (near the point Nc) of the engine 1, the mechanical supercharger 20 is stopped by the differential planetary gearing 10. At this time, the turbosupercharger 400 is rotated at a certain rotational speed while receiving the exhaust gas, whereby air is directly supplied from the turbosupercharger 400 to the engine 1 through the line 21*a*, the on/off valve 22, and the intake pipe 23. As a result, the engine 1 is provided with the certain amount Acc of air.

Thus, the certain amount Acc of air can be supplied to the engine by the foregoing hybrid supercharger of the present invention in which air is supercharged by both of the mechanical supercharger 20 and the turbosupercharger 400 as shown in FIG. 57.

Figure 58:
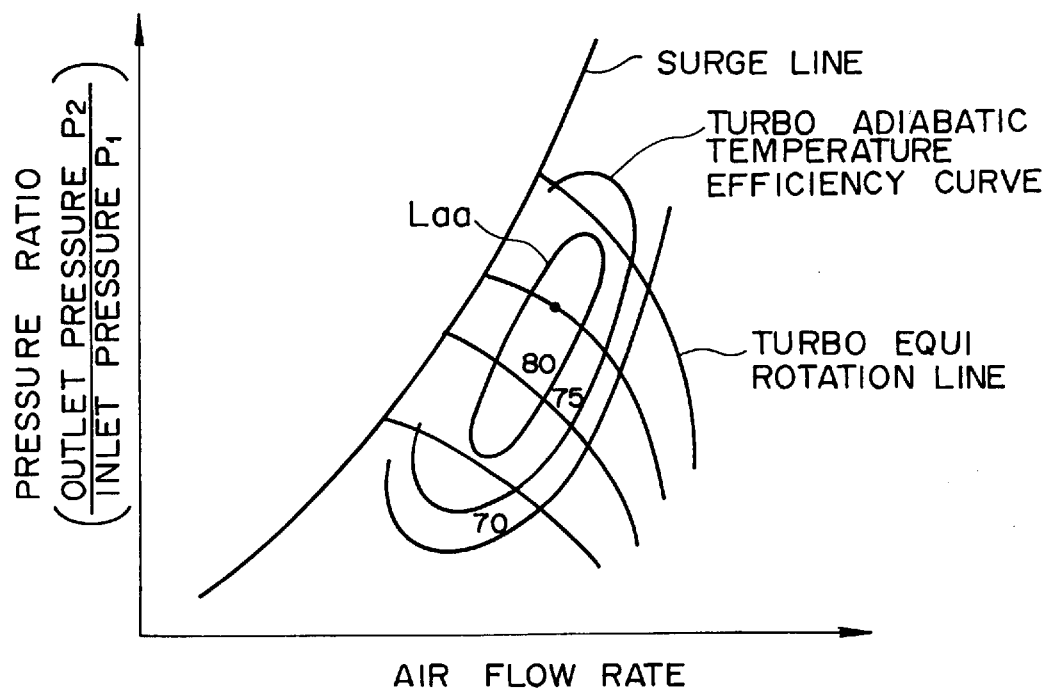
FIG. 58 is a graph for explaining compressor efficiency of a hybrid turbosupercharger comprising a mechanical supercharger and a turbosupercharger according to the present invention.

By keeping the amount of air required for the engine 1, and the flow rate of fuel supplied to the same, constant with the hybrid supercharger, exhaust gas energy becomes constant. The rotational speed of the turbosupercharger 400 also becomes constant. Since the constant exhaust gas energy allows the turbosupercharger 400 to be rotated at a constant speed, it is possible to employ a compressor with a diffuser having a narrow range map as shown in FIG. 58. Accordingly, the compressor can be operated in a maximum efficiency area (Laa), and hence the turbo efficiency can be increased about 5% in comparison with a wide range turbo. Taking into account the difference in efficiency between the rated point and maximum torque as well, the turbo efficiency is about 10% higher than in the prior art.

Figure 59:
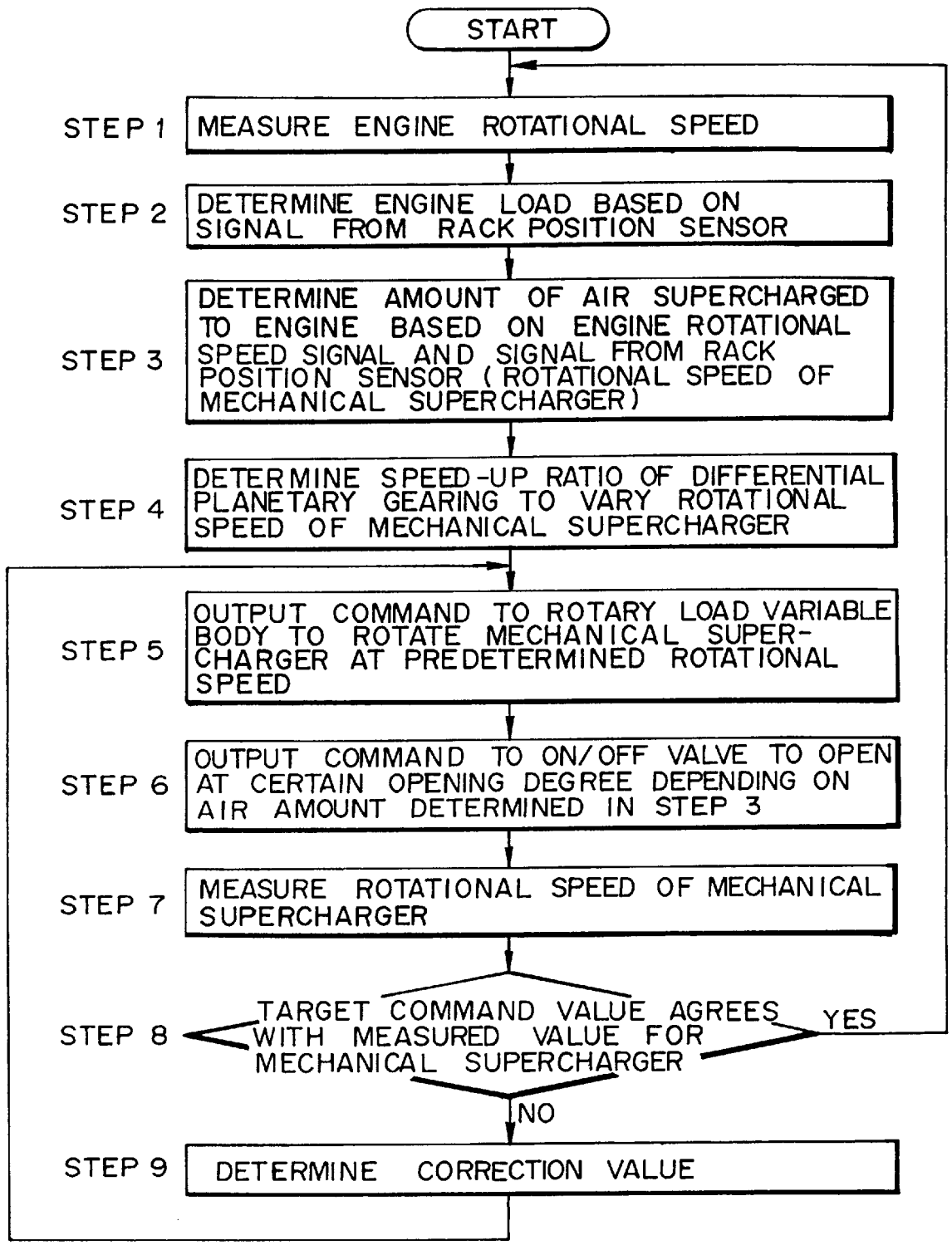
FIG. 59 is a flowchart showing the operation of the twentieth embodiment.

The above-described control can be summarized into a flowchart shown in FIG. 59.

In step 1, the rotational speed of the engine 1 is detected, based on the rotational speed signal from the engine revolution number sensor 63.

In step 2, a load instruction applied from the operator to the engine 1 is detected, based on the signal from the rack position sensor 66 for the injection pump 65.

In step 3, based on the rotational speed signal from the engine revolution number sensor 63 and the signal from the rack position-sensor 66, the controller 60 determines an amount of air supercharged to the engine 1 from the mechanical supercharger 20, i.e., a target value of the rotational speed of the mechanical supercharger 20, from a map stored in a memory (not shown).

In step 4, depending on the amount of air supercharged to the engine 1 from the mechanical supercharger 20, the controller 60 determines a speed reduction ratio of the differential planetary gearing 10 to vary the rotational speed of the mechanical supercharger 20 from a map stored in the memory (not shown).

In step 5, depending on the determined speed reduction ratio of the differential planetary gearing 10, the controller 60 outputs a command to the rotary variable load body to rotate the mechanical supercharger 20 at a predetermined rotational speed.

In step 6, the controller 60 outputs a command to the on/off valve 22 to open at a certain opening degree depending on the air amount determined in step 3.

In step 7, the rotational speed of the mechanical supercharger 20 is detected, based on the rotational speed signal from the mechanical supercharger revolution number sensor 352.

In step 8, the target value of the rotational speed of the mechanical supercharger 20 determined in step 3 is compared with the rotational speed measured by the mechanical supercharger revolution number sensor 352 in step 7.

If both of the values agree with each other in step 8, then the control flow returns to step 1. If not, then the control flow goes to step 9 to determine a correction value, followed by returning to step 5.

With the present invention, by keeping the amount of air required for the engine 1, and the flow rate of fuel supplied to the same, constant with the hybrid supercharge, the net mean effective pressure can be increased by the turbosupercharger 400 from the net mean effective pressure (Haa) provided by the mechanical supercharger 20 alone to a higher net mean effective pressure (Hbb) provided by both of the mechanical supercharger 20 and the turbosupercharger 400, as shown in FIG. 56.

Figure 60:
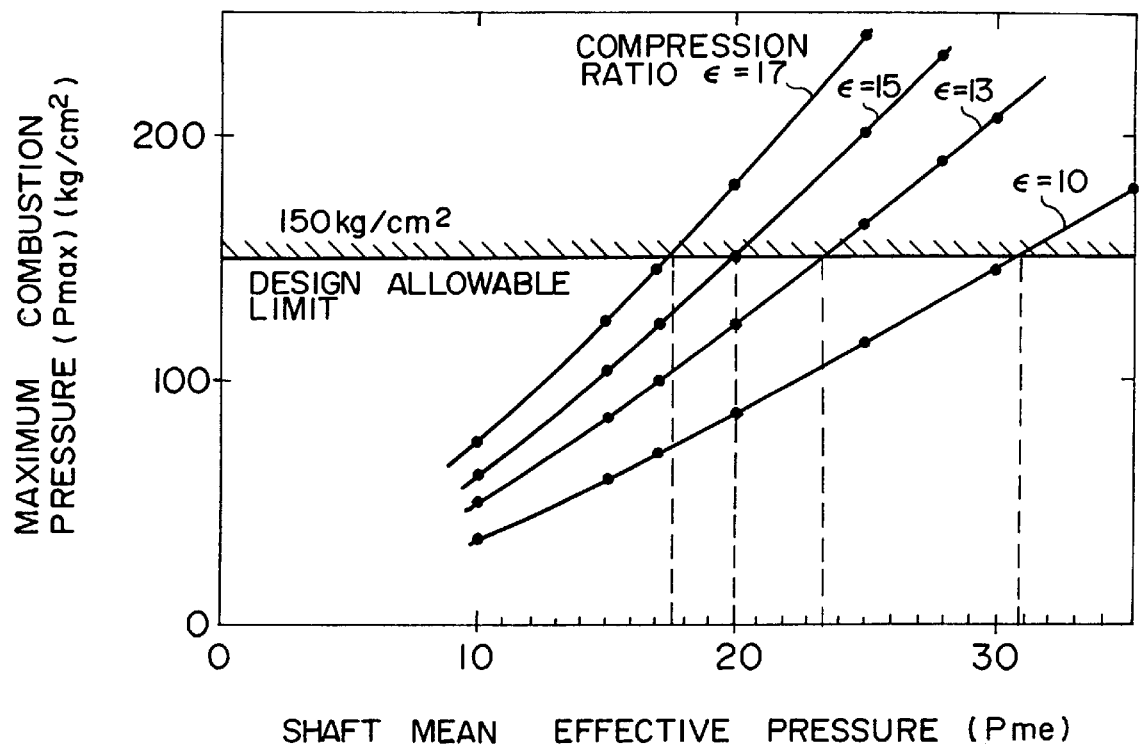
FIG. 60 is a graph for explaining the relationship of a compression ratio $\epsilon$ and a design allowable limit of a maximum combustion pressure Pmax with respect to a shaft mean effective pressure Pme and the maximum combustion pressure Pmax in a cylinder.

Further, the present invention has an advantage in that since the mechanical supercharger 20, driven by the differential driving gearing 10 at a variable rotational speed, enables air to be supercharged in a predetermined amount to the engine 1, no limitations are imposed on the intake air and the compression ratio $\epsilon$ can be reduced to provide a higher shaft mean effective pressure as shown in FIG. 60.

In FIG. 60, the horizontal axis represents a shaft mean effective pressure and the vertical axis represents a maximum combustion pressure Pmax in a cylinder. Also, each solid line represents a compression ratio $\epsilon$ of the engine 1. The compression ratio $\epsilon=10$ or below corresponds to a ratio for gasoline engines and indicates an area where diesel engines cannot exhibit specific superior thermal efficiency.

Further, diesel engines have a maximum combustion pressure Pmax of about 150 Kg/cm$^2$. In an area exceeding such a level, the bearings for the crankshafts, connecting rods, etc., are so large that an efficient construction cannot be achieved, because of imbalance in design.

Conventionally, the compression ratio $\epsilon$ in design is from 15 to 19 for the direct injection type and from 19 to 24 for the sub-chamber injection type, aiming to ensure good start-up properties at low temperature.

By contrast, in the present invention, it has been confirmed by the applicant from test results that the temperature of the intake air is raised through supercharging, even with ambient air at low temperature because air is supercharged in a predetermined amount to the engine by the mechanical supercharger 20 even at low engine speeds. For example, even at an engine cracking speed, i.e., even at the start-up where the rotational speed of the engine 1 is about 80 rpm, it has been confirmed that if the mechanical supercharger 20 is rotated at a reduction ratio of about 6 (the rotational speed of the mechanical supercharger 20 is about 480 rpm), the temperature of the intake air is raised about 45° C. across the mechanical supercharger 20 due to nearadiabatic compression. Therefore, even low-temperature air taken in from the ambient at −20° C. is raised to +25° C. after being supercharged by the mechanical supercharger 20. Consequently, start-up properties comparable to those of the engine 1, operated with the conventional arrangement, can be achieved even if the compression ratio $\epsilon$ in design is low.

Figure 61:
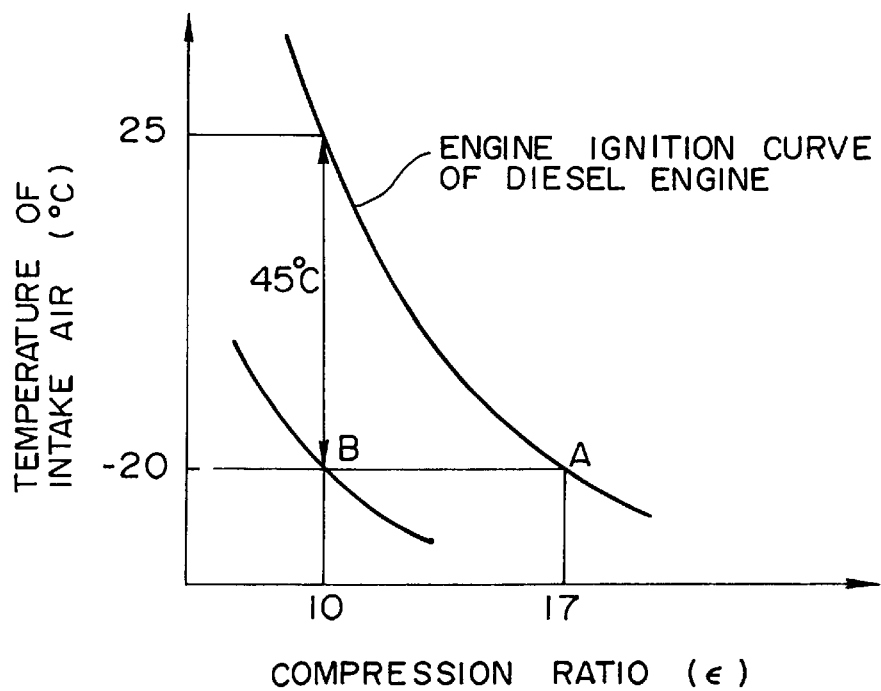
FIG. 61 is a graph for explaining ignition properties of a diesel engine with respect to a compression ratio $\epsilon$ and the intake air temperature.

Referring to FIG. 61, the horizontal axis represents a compression ratio $\epsilon$, the vertical axis represents a temperature of the intake air, and each solid curve represents start-up properties of the engine 1 without supercharger At the compression ratio $\epsilon=17$, for example, the engine 1 reaches a start-up enable limit under the ambient at −20° C. (indicated by point A in FIG. 61). On the other hand, when air is taken in while being compressed by the mechanical supercharger 20, there is obtained a start-up limit capability comparable to that of the engine 1 operated with the conventional arrangement (as indicated by point B in FIG. 61), even if the compression ratio $\epsilon$ is as low as 10. Therefore, the present invention requires the compression ratio $\epsilon$ to be from 10 to 15 for the direct injection type and from 10 to 20 for the sub-chamber injection type. The lower limit compression ratio $\epsilon=10$ is set from the reason that this or smaller value corresponds to a ratio for gasoline engines and indicates an area where diesel engines cannot exhibit specific superior thermal efficiency. The upper limit compression ratio $\epsilon$, i.e., the compression ratio $\epsilon=15$ for the direct injection type and 20 for the sub-chamber injection type, is set to ensure a start-up limit capability comparable to that at the upper limits in the conventional arrangement.

Figure 62:
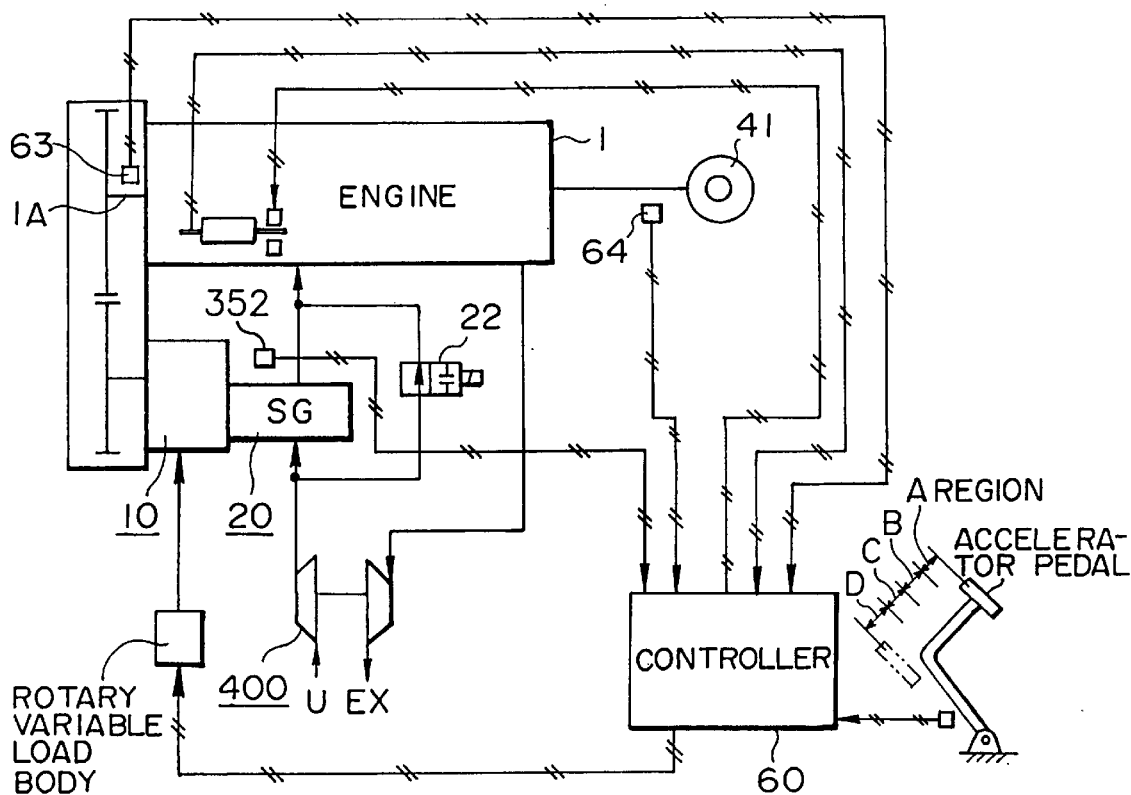
FIG. 62 is a conceptual diagram of a differential driving supercharger, the view showing a twenty-first embodiment of the present invention.

Next, an embodiment of the present invention when mounted on an actual vehicle will be described. FIG. 62 is a conceptual diagram of a differential driving supercharger, the view showing a twenty-first embodiment of the present invention. In FIG. 62, which is almost similar to FIG. 55, inputs to the controller 60 are the rotational speed signal, from the engine revolution number sensor 63 associated with the engine 1, and the signal from the rack position sensor 66, for detecting the rack position of the injection pump 65, as with the ninth embodiment. Also, the accelerator pedal 61, which is depressed downwardly by the operator for accelerating the vehicle, the accelerator pedal depression sensor 62, the vehicle speed sensor 64, and the control lever position sensor 67 are associated with the controller 60. Furthermore, a stroke of the accelerator pedal 61 is divided into a plurality of accelerator pedal depression regions, e.g., regions A, B, C, and D.

Figure 63:
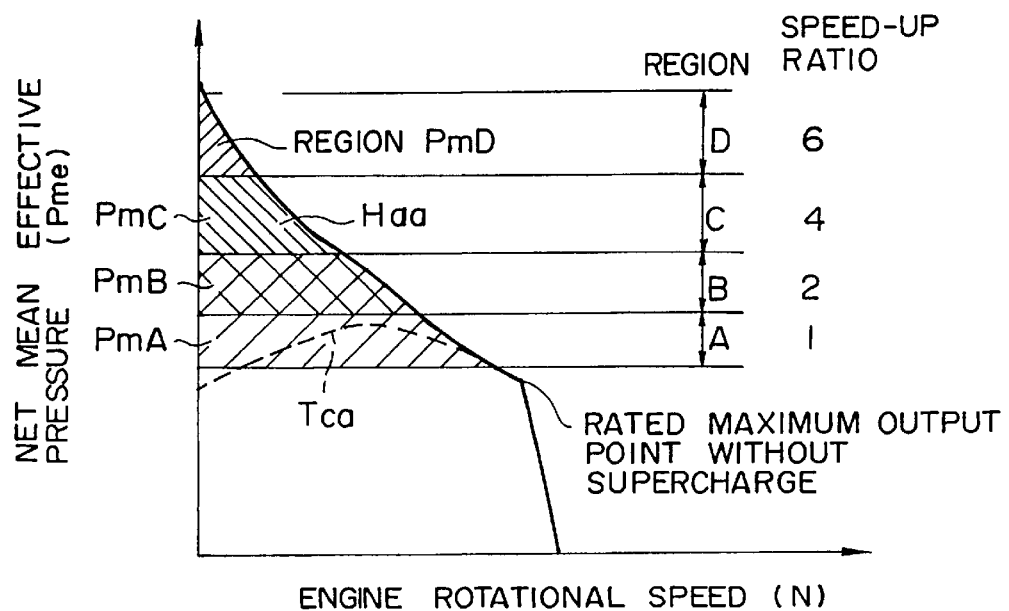
FIG. 63 is a graph for explaining how a predetermined net mean effective pressure is obtained depending on the engine rotational speed and an accelerator pedal depression region.

In FIG. 63, the horizontal axis represents a rotational speed of the engine 1, the vertical axis represents a net mean effective pressure Pme, and the horizontal solid lines demarcate the respective accelerator pedal depression regions shown as one example. A speed-up ratio β=2 of the differential planetary gearing 10 is set for each of regions PmA, PmB, PmC and PmD of the net mean effective pressure Pme. For example, the speed-up ratio β is 1 in the region PmA, 2 in the region PmB, 4 in the region PmC, and 6 in the region PmD, respectively, these set values being stored in a memory (not shown). Also, the regions PmA, PmB, PmC, and PmD of the net mean effective pressure Pme are set corresponding to the accelerator pedal depression regions A, B, C, and D, respectively.

Figure 64:
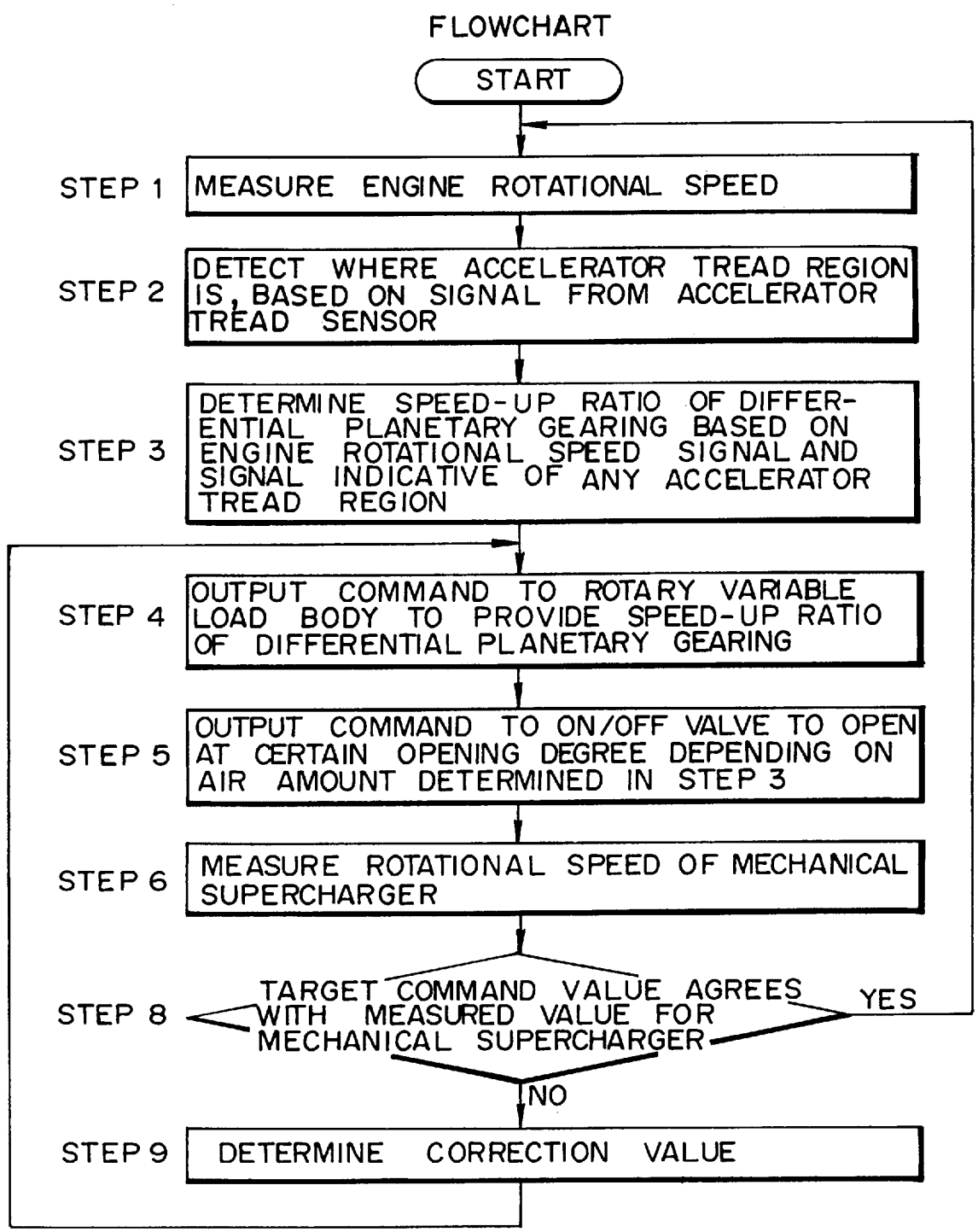
FIG. 64 is a flowchart showing the operation of the twenty-first embodiment.

The operation of this embodiment will be described with reference to a flowchart of FIG. 64.

In step 1, by way of example, the rotational speed of the engine 1 is detected, based on the rotational speed signal from the engine revolution number sensor 63.

In step 2, based on the signal from the accelerator pedal depression sensor 62, the controller 60 detects in which one of the accelerator pedal depression regions is the accelerator pedal 61, depressed downwardly by the operator. As an alternative, whether the accelerator pedal depression region is A, B, C, or D can also be detected based on the signal from the rack position sensor 66, associated with the injection pump 65, which receives a load instruction applied from the operator to the engine 1.

In step 3, based on the rotational speed signal from the engine revolution number sensor 63 and the signal indicative of any accelerator pedal depression region, the controller 60 determines a speed-up ratio of the differential planetary gearing 10 to vary the rotational speed of the mechanical supercharger 20 from a map stored in a memory (not shown). If the accelerator pedal 61 is in the region D, for example, the speed-up ratio (e.g., 6) of the differential planetary gearing 10 is determined from the map stored in the memory (not shown) so that the shaft mean effective pressure Pme is in the corresponding region PmD, as shown in FIG. 63.

In step 4, based on the determined speed-up ratio of the differential planetary gearing 10, the controller 60 outputs a command to the rotary variable load body to set the differential planetary gearing 10 to have that speed-up ratio, thereby rotating the mechanical supercharger 20 at a predetermined speed.

In step 5, the controller 60 outputs a command to the on/off valve 22 to open to a certain opening degree, depending on the air amount determined in step 3. Step 5 can be replaced by step 4.

In step 6, the rotational speed of the mechanical supercharger 20 is detected, based on the rotational speed signal from the mechanical supercharger revolution number sensor 352.

In step 7, the target value, of the rotational speed of the mechanical supercharger 20 determined in step 3, is compared with the rotational speed measured by the mechanical supercharger revolution number sensor 352 in step 6.

If both of the values agree with each other in step 7, then the control flow returns to step 1. If not, then the control flow goes to step 8 to determine a correction value, followed by returning to step 4.

Figure 65:
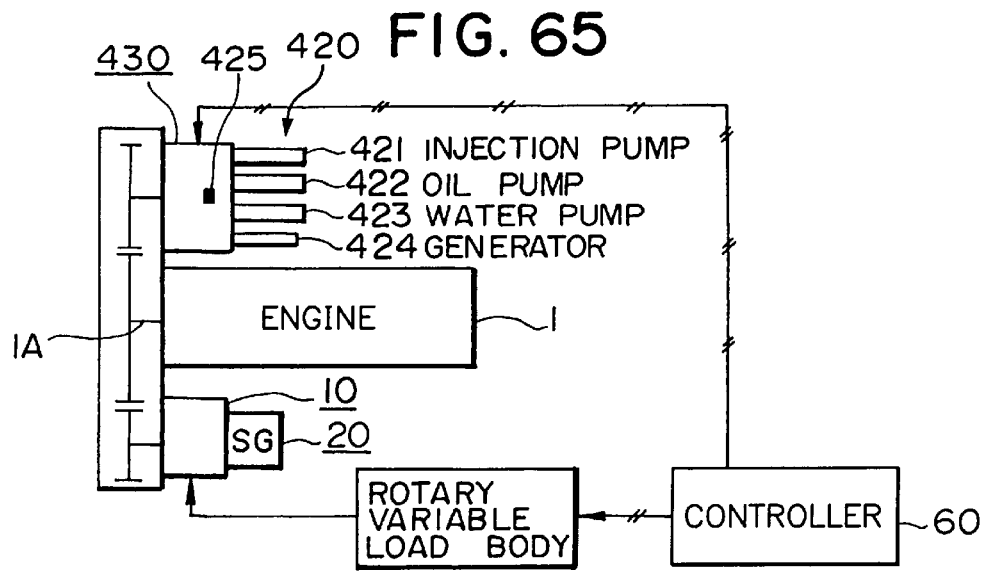
FIG. 65 is a conceptual diagram of a differential driving supercharger, the view showing a twenty-second embodiment of the present invention.

FIG. 65 is a conceptual diagram of a differential driving supercharger, the view showing a twenty-second embodiment of the present invention. Accessories 420, such as an injection pump 421 for an accumulator type injection system, an oil pump 422 for a lubricating system, a water pump 423 for a cooling system, and a generator 424, are associated with the engine 1. Conventionally, these accessories 420 are rotated in conjunction with the rotation of the engine 1 at a fixed ratio. In the following twentysecond and subsequent embodiments, the accessories 420 are rotated through a device of the type being inversely proportional to the engine rotational speed or the variable type so that the accessories are sped up in a low-speed range. Referring to FIG. 65, as with the first embodiment, the differential planetary gearing 10 is connected to the output shaft 1A of the engine 1 from one side, and the mechanical supercharger 20 and the rotary variable load body, e.g., the variable hydraulic motor 30, are associated with the differential planetary gearing 10. Also, the accessories 420, including the injection pump 421, the oil pump 422, the cooling system water pump 423, and the generator 424, are connected to the output shaft 1A from the other side through a speed-up ratio varying device 430. The speed-up ratio varying device 430, though not shown in detail, can be constructed like a combination of the differential planetary gearing 10 and the rotary variable load body so that it speeds up in a low-speed range of the engine 1 to increase the rotational speeds of the injection pump 421, the oil pump 422, the cooling system water pump 423, and the generator 424. An accessory rotational speed sensor 425 is associated with each of the accessories 420 to detect the rotational speed of the corresponding accessory. The other components, such as the controller 60, the engine revolution number sensor 63, the vehicle speed sensor 64, the injection pump 65, the rack position sensor 66, the control lever position sensor 67, and the shift position sensor 69, are not shown, but can be constructed or arranged similarly to those in FIG. 1.

The operation of this embodiment will be described below.

Figure 66:
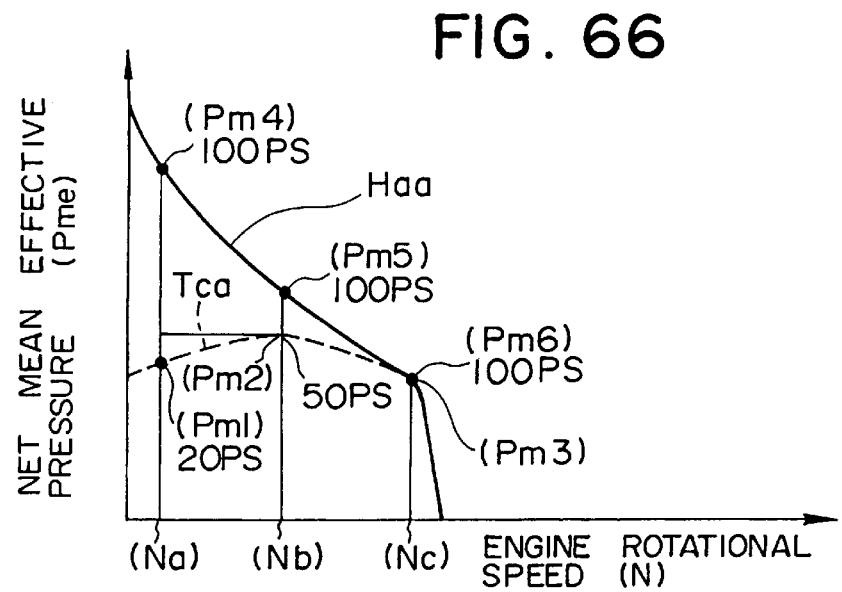
FIG. 66 is a graph for explaining equi-horsepower produced by the engine according to the present invention and horsepower produced by a prior art engine with respect to the engine rotational speed.
Figure 67:
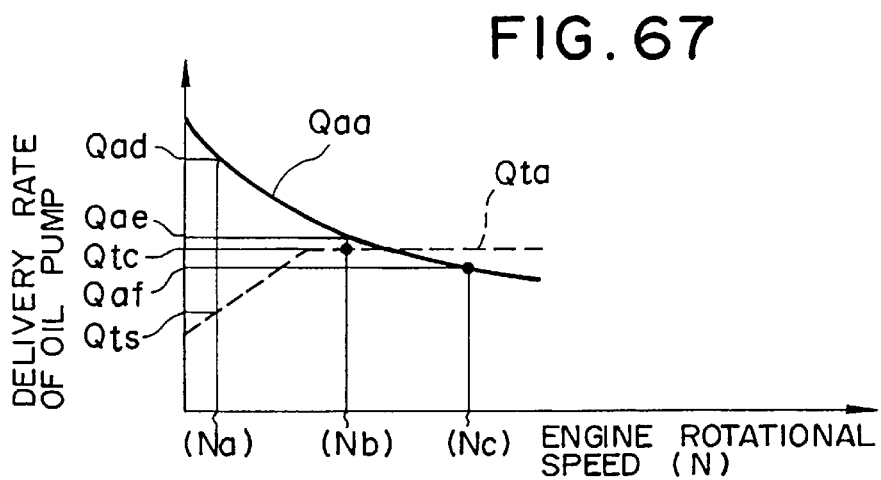
FIG. 67 is a graph for explaining the relationship between a delivery rate of an oil pump for the engine according to the present invention and a delivery rate of an oil pump for the prior art engine with respect to the engine rotational speed.

The relationship between an output of the engine and the oil pump 422 for a lubricating system will be described with reference to, by way of examples, graphs shown in FIGS. 66 and 67. In FIG. 66, the horizontal axis represents a rotational speed of the engine 1, the vertical axis represents a net mean effective pressure Pme, a solid line represents an equi-output Haa obtained in the present invention, and the dashed line represents an output Tca in the prior art. In FIG. 67, the horizontal axis represents a rotational speed of the engine 1, the vertical axis represents a delivery rate Q of the oil pump 422, a solid line represents a delivery rate Qaa of the oil pump 422 in the present invention, and the dashed line represents a delivery rate Qta of an oil pump in the prior art. In the prior art, for example, when the engine 1 is in a low-speed rotation range (near the point Na) with 20 horsepower (point Pm1) in FIG. 66, a corresponding delivery rate Qts of the prior art oil is also small as shown in FIG. 67. In a medium-speed rotation range (near the point Na) with 50 horsepower (point Pm2), the prior art oil pump produces a certain delivery rate Qtc. Further, in a high-speed rotation range (near the point Nc) with 100 horsepower (point Pm3), the prior art oil pump also produces the certain delivery rate Qtc. By contrast, in the present invention, when the engine 1 is in the low-speed rotation range (near the point Na) with 100 horsepower (point Pm4), a corresponding delivery rate Qad of the oil pump 422 is increased as shown in FIG. 67. In the medium-speed rotation range (near the point Nb) with 100 horsepower (point Pm5), the oil pump 422 produces a certain delivery rate Qae smaller than the delivery rate Qad in the low-speed rotation range. Further, in the high-speed rotation range (near the point Nc) with 100 horsepower (point Pm6), the oil pump 422 produces a certain delivery rate Qaf. In other words, when the mechanical supercharger 20 is driven by the differential planetary gearing 10 to rotate at an increased speed so that the engine 1 outputs equi-horsepower, the rotational speed of the oil pump 422 is increased depending on the rotational speed and/or work load of the mechanical supercharger 20. Thus, since the accessories 420 are sped up in the low-speed range by the speed-up ratio varying device 430, it is possible to compensate for an increase in the amount of lubricating oil and the amount of cooling water required for the engine 1 because of much greater torque at low speeds than conventional. Similarly, the high-torque engine 1 used in the present invention also demands a higher injection pressure at low speeds, and such a demand can be met by speeding up the injection pump in the low-speed range. Therefore, lubrication failures (particularly formation of oil films in the low-speed range) in main moving portions and cooling failures in the respective portions, due to an increased output in the low-speed range, are avoided. As a result, the high-torque engine 1 can be achieved which has reliability and durability comparable or superior to conventional engines.

Figure 68:
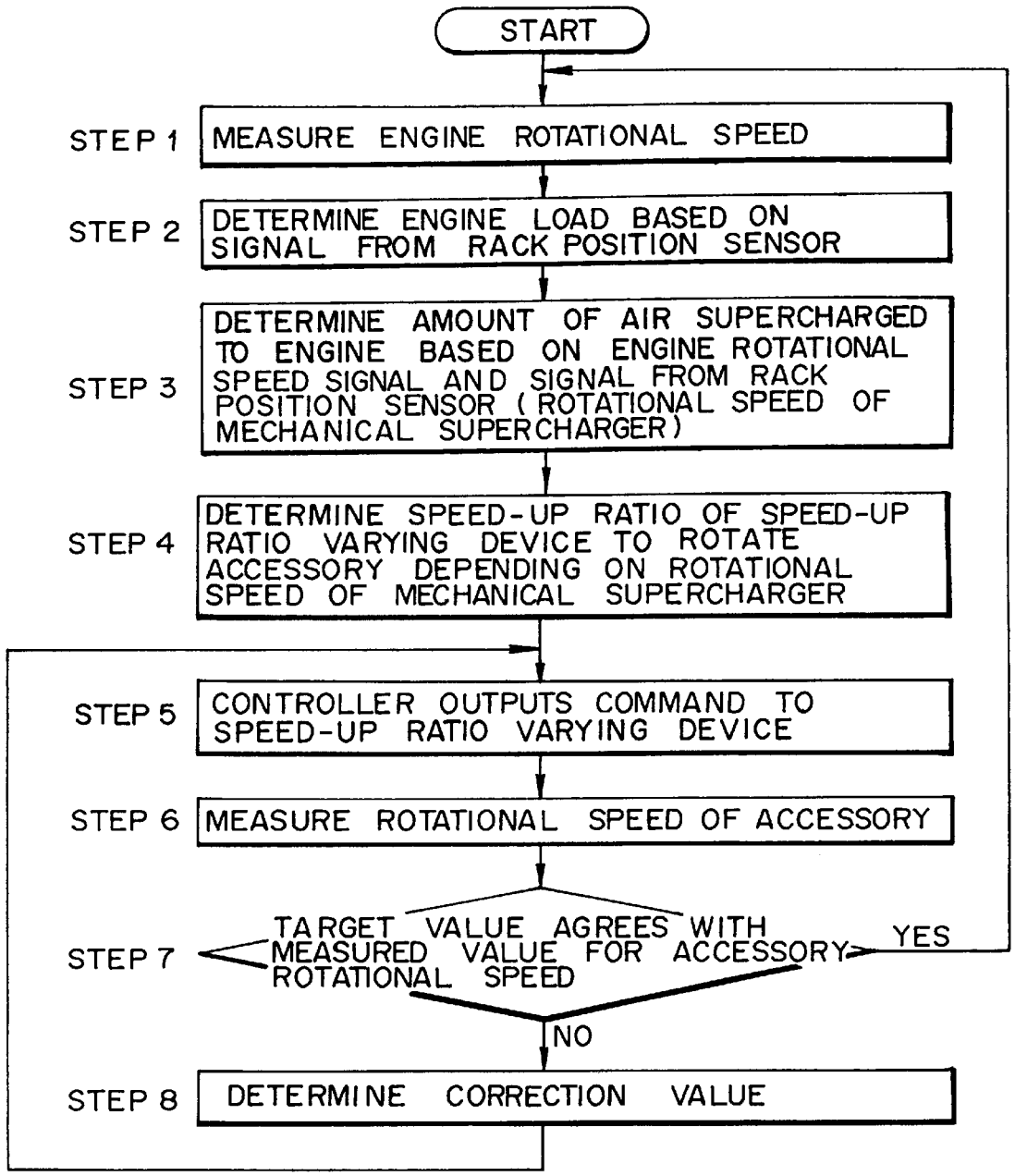
FIG. 68 is a flowchart showing the operation of the twenty-second embodiment.

The operation of this embodiment will be described with reference to a flowchart of FIG. 68.

In step 1, by way of example, the rotational speed of the engine 1 is detected, based on the rotational speed signal from the engine revolution number sensor 63.

In step 2, a load instruction applied from the operator to the engine 1 is detected, based on the signal from the rack position sensor 66 for the injection pump 65.

In step 3, based on the rotational speed signal from the engine revolution number sensor 63 and the signal from the rack position sensor 66, the controller 60 determines an amount of air supercharged to the engine 1 from the mechanical supercharger 20, i.e., a target value of the rotational speed of the mechanical supercharger 20, from a map stored in a memory (not shown).

In step 4, depending on the amount of air supercharged to the engine 1 from the mechanical supercharger 20, the controller 60 determines a speed-up ratio for the speed-up ratio varying device 430 to rotate each of the accessories 420 from a map stored in the memory (not shown).

In step 5, the controller 60 outputs a command to the speed-up ratio varying device 430 to provide a speed-up ratio equal to the determined one.

In step 6, the rotational speed of the accessory 420 is detected, based on the rotational speed signal from the accessory rotational speed sensor 425.

In step 7, the target value of the rotational speed of the accessory 420, determined in step 3, is compared with the rotational speed measured by the accessory rotational speed sensor 425 in step 6.

If both of the values agree with each other in step 7, then the control flow returns to step 1. If not, then the control flow goes to step 8 to determine a correction value, followed by returning to step 5.

Figure 69:
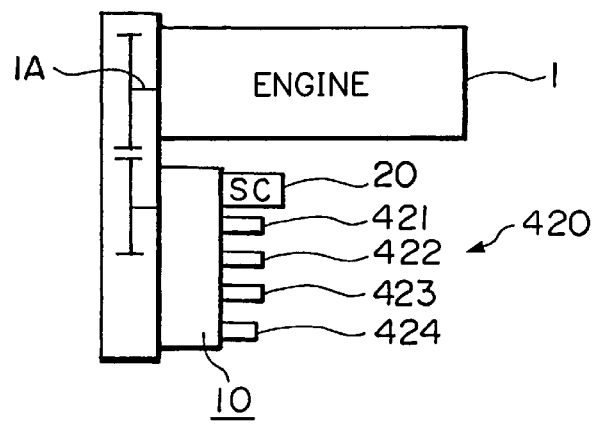
FIG. 69 is a conceptual diagram of a differential driving supercharger, the view showing a twenty-third embodiment of the present invention.

FIG. 69 is a conceptual diagram of a differential driving supercharger, the view showing a twenty-third embodiment of the present invention. Note that the same parts as those in the twenty-second embodiment are denoted by the same reference numerals and will not be described here.

Referring to FIG. 69, as with the first embodiment, the differential planetary gearing 10 is connected to the output shaft 1A of the engine 1 from one side, and the mechanical supercharger 20 and the rotary variable load body, e.g., the variable hydraulic motor 30, are associated with the differential planetary gearing 10. Also, the accessories 420, including the injection pump 421, the oil pump 422, the cooling system water pump 423, and the generator 424, are connected to the differential planetary gearing 10. The other components, such as the controller 60, the engine revolution number sensor 63, the vehicle speed sensor 64, the injection pump 65, the rack position sensor 66, the control lever position sensor 67, and the shift position sensor 69, are not shown, but can be constructed or arranged similarly to those in FIG. 1.

The operation of this embodiment is the same as the twenty-second embodiment and, hence, will not be described here.

Figure 70:
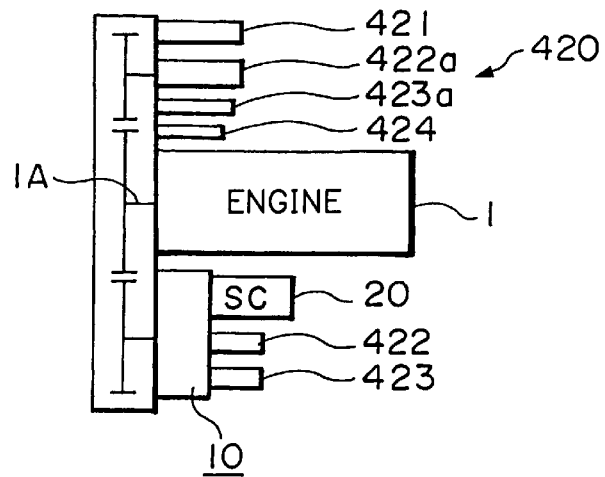
FIG. 70 is a conceptual diagram of a differential driving supercharger, the view showing a twenty-fourth embodiment of the present invention.

FIG. 70 is a conceptual diagram of a differential driving supercharger, the view showing a twenty-fourth embodiment of the present invention. Note that the same parts as those in the twenty-second embodiment are denoted by the same reference numerals and will not be described here.

Referring to FIG. 70, as with the first embodiment, the differential planetary gearing 10 is connected to the output shaft 1A of the engine 1 from one side, and the mechanical supercharger 20 and the rotary variable load body, e.g., the variable hydraulic motor 30, are associated with the differential planetary gearing 10. Also, some of the accessories 420, i.e., the oil pump 422 and the cooling system water pump 423, are connected to the differential planetary gearing 10. Further, the accessories 420, including the injection pump 421, an oil pump 422a, a cooling system water pump 423a, and the generator 424, are connected to the output shaft 1A of the engine 1 so as to be rotated in conjunction with the rotation of the engine 1 at a fixed ratio, as with the prior art. The other components, such as the controller 60, the engine revolution number sensor 63, the vehicle speed sensor 64, the injection pump 65, the rack position sensor 66, the control lever position sensor 67, and the shift position sensor 69, are not shown, but can be constructed or arranged similarly to those in FIG. 1.

The twenty-fourth embodiment operates such that, in a low-speed range of the engine 1, the mechanical supercharger 20 is driven by the differential planetary gearing 10 at an increased speed and, simultaneously, the oil pump 422 and the cooling system water pump 423, as the accessories 420, are sped up by the differential planetary gearing 10 to compensate for an increase in the amount of lubricating oil and the amount of cooling water required for the engine 1.

Figure 71:
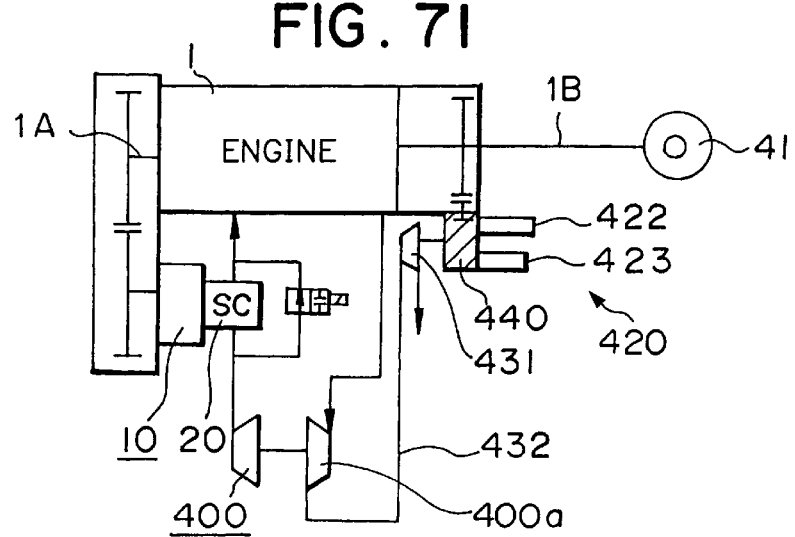
FIG. 71 is a conceptual diagram of a differential driving supercharger, the view showing a twenty-fifth embodiment of the present invention.
Figure 72:
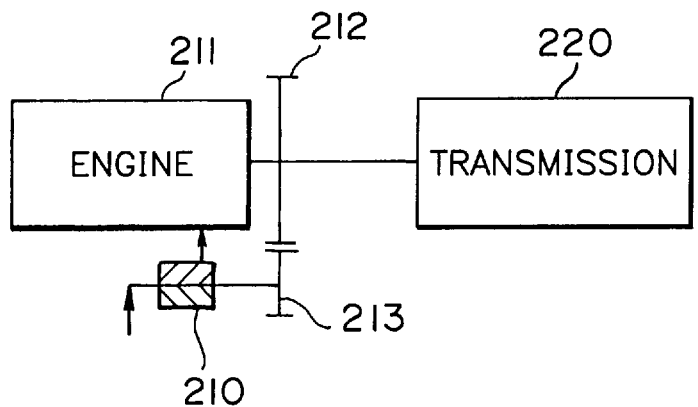
FIG. 72 is a diagram showing a prior art mechanical supercharge arrangement directly driven by a gear.
Figure 73:
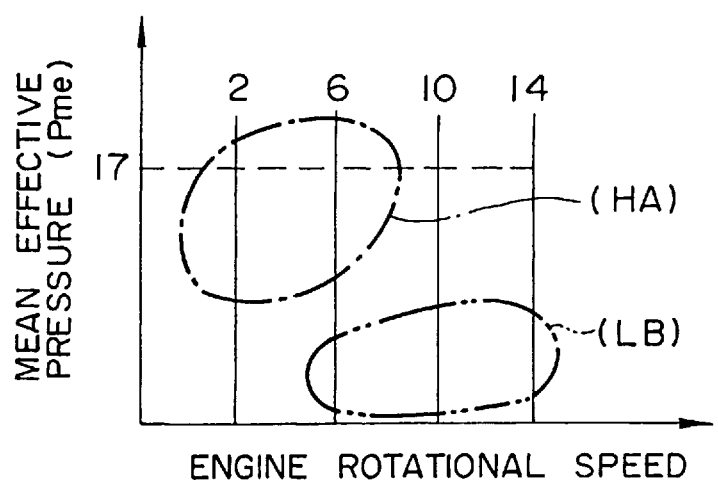
FIG. 73 is a graph showing states of air supply to an engine in the prior art mechanical supercharge arrangement.
Figure 74:
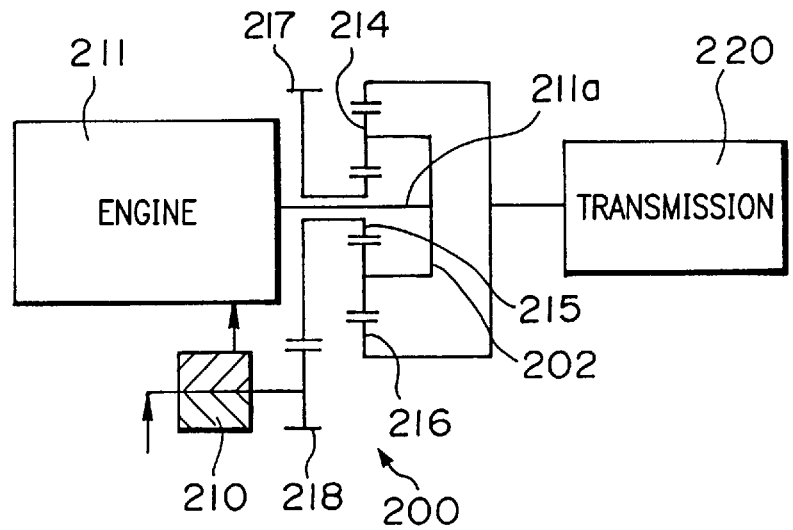
FIG. 74 is a conceptual diagram of a first prior art differential driving supercharger.
Figure 75:
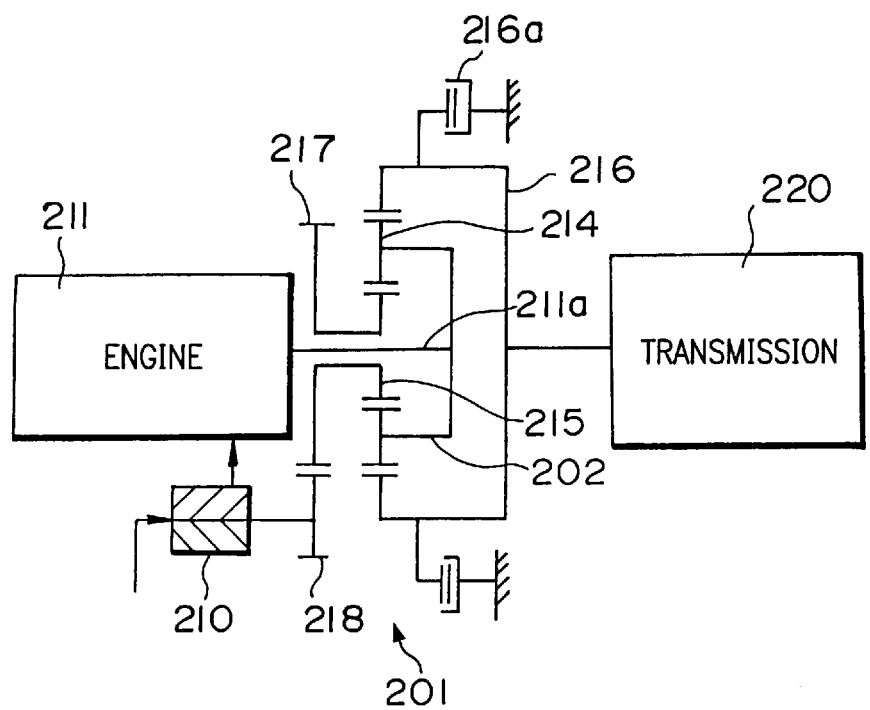
FIG. 75 is a conceptual diagram of a second prior art differential driving supercharger.
Figure 76:
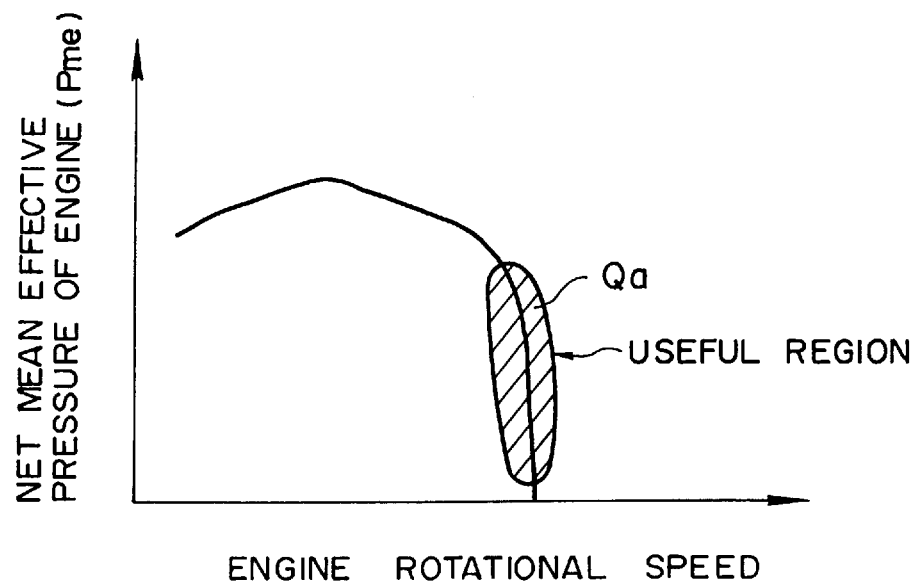
FIG. 76 is a graph for explaining an engine output desired to be higher at high rotational speeds in accordance with usage conditions.
Figure 77:
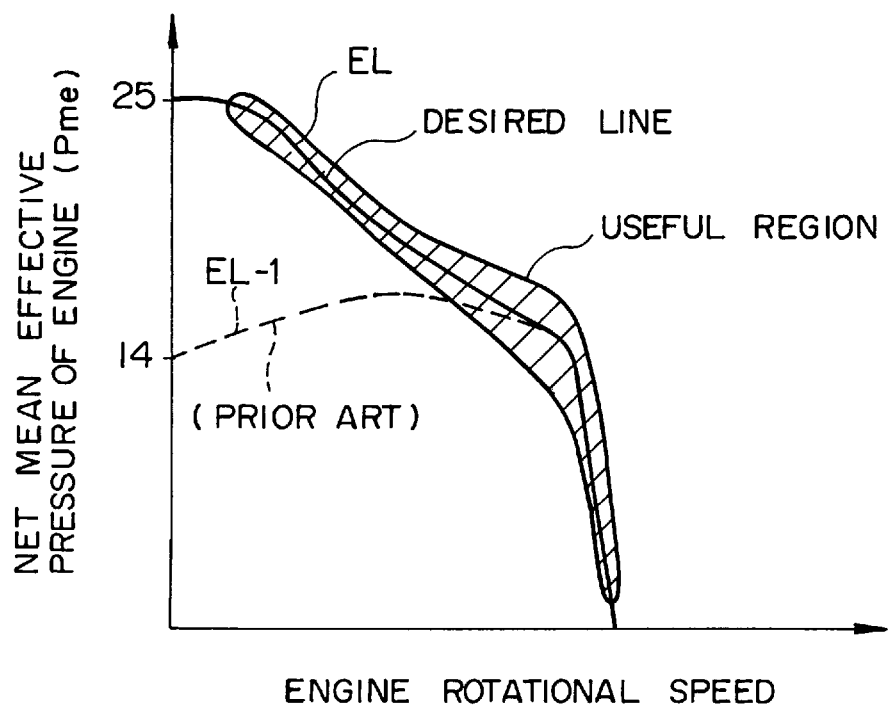
FIG. 77 is a graph for explaining an engine output desired to be higher at low and medium rotational speeds in accordance with usage conditions.
Figure 78:
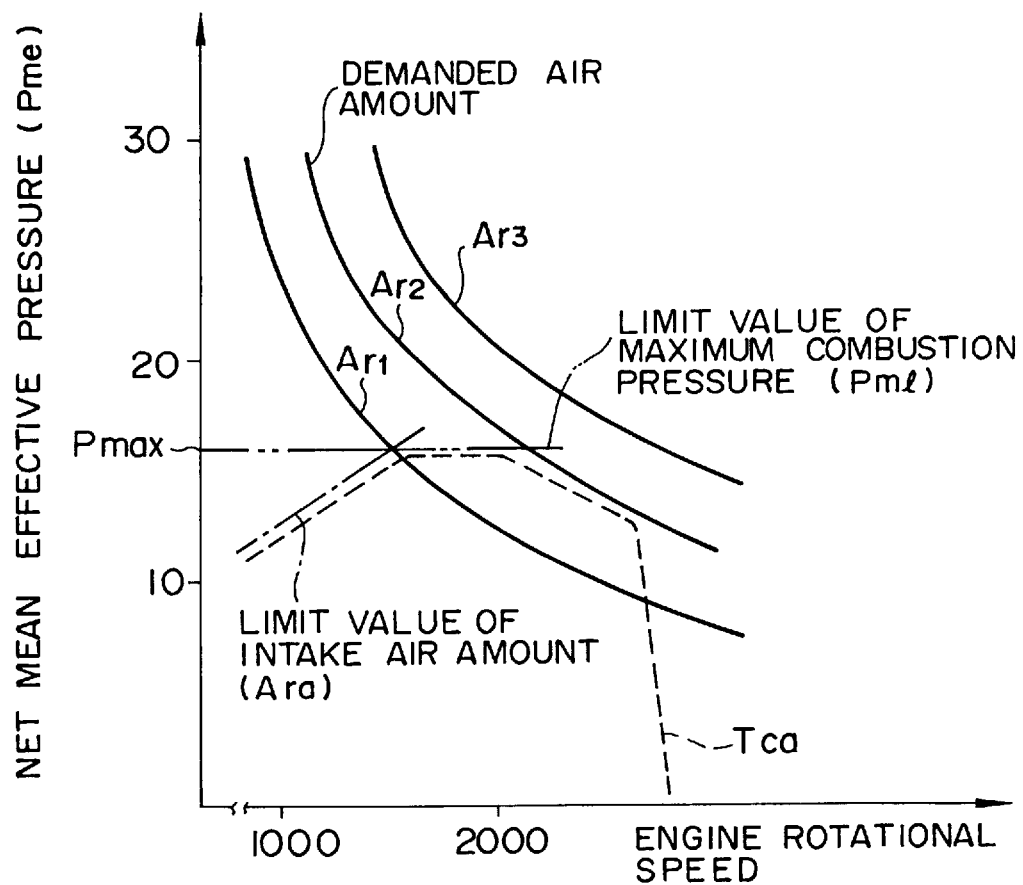
FIG. 78 is a graph for explaining a limit of the intake air amount with respect to change in an engine rotational speed, and a limit of the output torque in engines presently used attributable to a limit value in design of a maximum combustion pressure.
Figure 79:
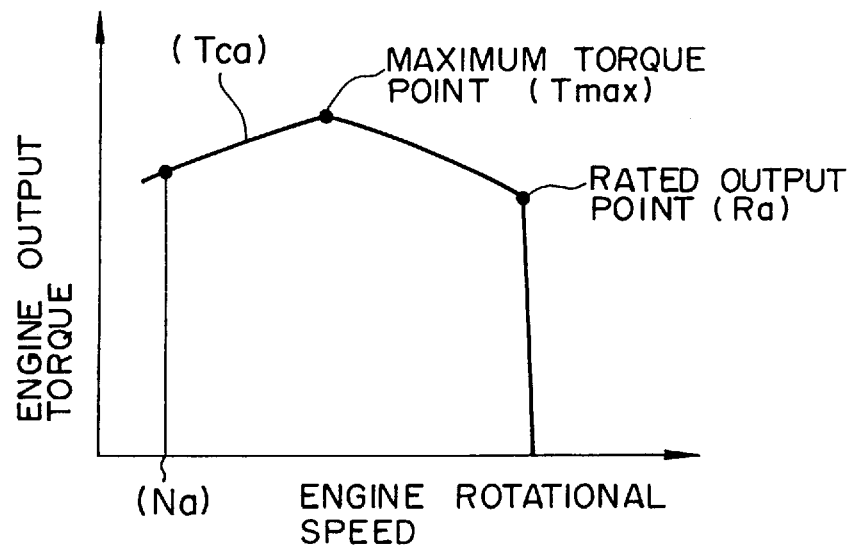
FIG. 79 is a graph for explaining the output torque of a prior art engine with respect to the engine rotational speed.
Figure 80:
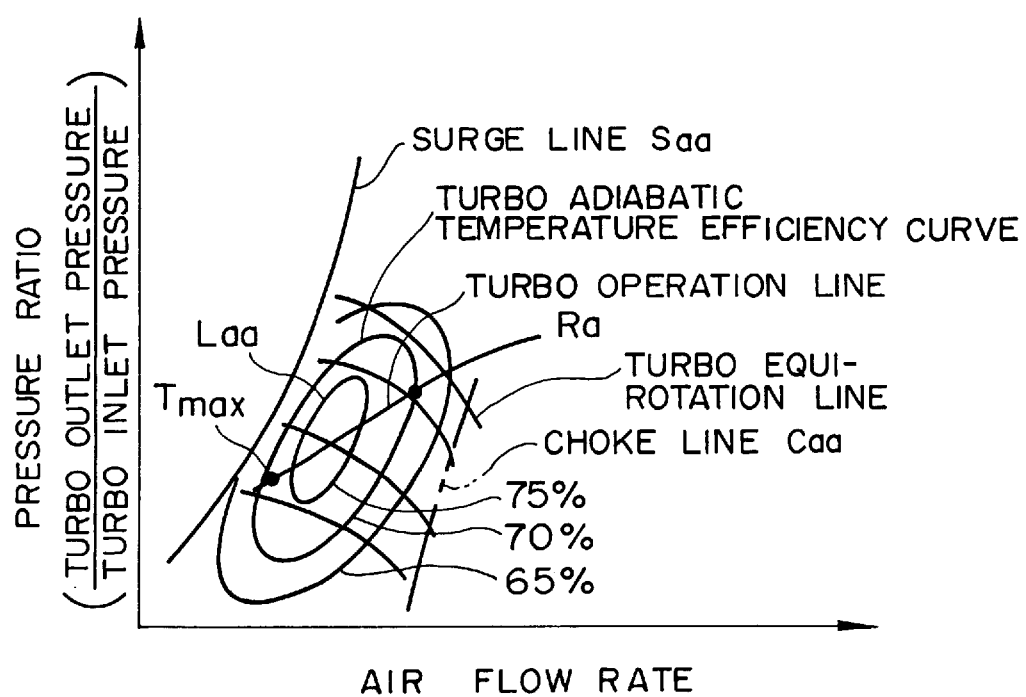
FIG. 80 is a graph for explaining compressor efficiency of a prior art turbosupercharger in the case of using the turbosupercharger alone.

FIG. 71 is a conceptual diagram of a differential driving supercharger, the view showing a twenty-fifth embodiment of the present invention. In the twenty-fifth embodiment, as with the twentieth embodiment, the mechanical supercharger 20 and the rotary variable load body, e.g., the variable hydraulic motor 30, are associated with the differential planetary gearing 10. In addition, a turbosupercharger 400 is disposed in the line on the intake side of the mechanical supercharger 20. Furthermore, in the twenty-fifth embodiment, a line 432 is connected to an exhaust port 400a of the turbosupercharger 400, and a turbine 431 is connected to the line 432. A variable speed-up switching device 440, for driving the accessories 420 and recovering energy, is associated with the turbine 431. The oil pump 422 and the cooling system water pump 423, as the accessories 420, are associated with the variable speed-up switching device 440, which is in turn coupled to the output shaft 1B of the engine 1. The other components, such as the controller 60, the engine revolution number sensor 63, the vehicle speed sensor 64, the injection pump 65, the rack position sensor 66, the control lever position sensor 67 and the shift position sensor 69, are not shown, but can be constructed or arranged similarly to those in FIG. 1.

The twenty fifth embodiment operates as follows. In a low-speed range of the engine 1, based on the signals from the engine revolution number sensor 63 and the rack position sensor 66, the controller 60 outputs a command to the variable speed-up switching device 440 to transmit the driving force of the turbine 431 to the oil pump 422 and the cooling system water pump 423, as the accessories 420, thereby rotating these pumps. Accordingly, in a low-speed range of the engine 1, the oil pump 422 and the cooling system water pump 423, as the accessories 420, can be sped up to compensate for an increase in the amount of lubricating oil and the amount of cooling water required for the engine 1. Also, in a high-speed range of the engine 1, the controller 60 outputs a command to the variable speed-up switching device 440 to switch a transmission path of the driving force of the turbine 431 for connection with not the accessories 420 but the output shaft 1B. As a result, the oil pump 422 and the cooling system water pump 423, as the accessories 420, are stopped and the driving force of the turbine 431 is transmitted to the output shaft 1B for recovery of energy.

INDUSTRIAL APPLICABILITY

The present invention offers a differential driving supercharger and a method for controlling the same which are adapted for engines of vehicles such as automobiles, trucks, wheel loaders, cranes and other construction machines, with resultant advantages that acceleration properties are improved, and the size is made smaller, while attaining a higher output, a greater torque at lower engine speeds, and better fuel economy.

I claim:

1. A differential driving supercharger for an engine, said engine having a first output shaft and a second output shaft, said second output shaft for providing a driving force; said differential driving supercharger comprising:

a mechanical supercharger, a differential driving device for driving said mechanical supercharger, said differential driving device having a sun gear, a planetary carrier, and a ring gear;

said planetary carrier being adapted to be coupled to said first output shaft;

said mechanical supercharger being coupled to said sun gear; and a rotary variable load body, said rotary variable load body being coupled to said ring gear.

2. A differential driving supercharger in accordance with claim 1, further comprising a clutch, wherein said ring gear and said rotary variable load body are coupled to each other through said clutch, for reducing an energy loss of said rotary variable load body when the rotation of said mechanical supercharger is stopped.

3. A differential driving supercharger in accordance with claim 1, further comprising:

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine; and a second on/off valve disposed in said second intake line for cutting off atmospheric air through said second intake line to said engine; and wherein said controller outputs signals to actuate said first and second on/off valves upon receiving a prescribed rotational speed signal from said sensor.

4. A differential driving supercharger in accordance with claim 3, wherein said controller outputs signals to said first and second on/off valves so that when rotation of said mechanical supercharger is stopped, said first on/off valve is closed and said second on/off valve is opened to supply air to said engine through natural suction.

5. A differential driving supercharger in accordance with claim 1, further comprising:

an accelerator pedal for controlling a rotational speed of said engine;

an accelerator pedal depression sensor for detecting an amount of depression of said accelerator pedal;

an injection pump for injecting fuel into said engine, said injection pump having a solenoid for controlling an amount of fuel injected into said engine;

a rack position sensor for detecting an amount of fuel ejected from said injection pump;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

a servo member for increasing and reducing a capacity of said rotary variable load body, and a selector valve for selectively introducing power to said rotary variable load body therethrough, and wherein said controller, upon receiving prescribed signals from said accelerator pedal depression sensor, said rack position sensor, and said engine rotational speed sensor, outputs signals to said solenoid of said injection pump, said selector valve, and said servo member for said rotary variable load body, to thereby control the rotational speeds of said engine and said mechanical supercharger.

6. A differential driving supercharger in accordance with claim 5, wherein when said mechanical supercharger is sped up or slowed down, said controller outputs:

signals to said on/off valves, so that said first on/off valve is opened and said second on/off valve is closed to supercharge air to said engine;

a signal to said selector valve, to shift its position; and a signal to said servo member for said rotary variable load body to increase its capacity.

7. A differential driving supercharger in accordance with claim 6, wherein when said mechanical supercharger is held at a substantially constant rotational speed, said controller outputs:

signals to said on/off valves, so that said first on/off valve is opened and said second on/off valve is closed to supercharge air to said engine;

a signal to said solenoid of said injection pump, to increase or reduce the engine rotational speed;

a signal to said selector valve, to shift its position; and a signal to said servo member for said rotary variable load body, to increase or reduce its rotational speed.

8. A differential driving supercharger in accordance with claim 1, wherein said rotary variable load body is any one of:
- a fixed capacity pump,
- a variable capacity pump,
- a fixed capacity motor,
- a variable capacity motor,
- a fixed capacity pump/motor serving as a pump and a motor,
- a variable capacity pump/motor serving as a pump and a motor, and
- an air compressor.

9. A differential driving supercharger, as claimed in claim 1, further comprising:
means for rotating said rotary variable load body to adjust the speed of said mechanical supercharger.

10. A differential driving supercharger, as claimed in claim 9, further comprising:
means for adjusting the speed of said rotary variable load body, based on a change in an engine rotational speed output through said planetary carrier, to maintain said mechanical supercharger substantially at a constant rotational speed.

11. A differential driving supercharger, as claimed in claim 1, further comprising:
means for stopping said rotary variable load body to rotate said mechanical supercharger.

12. A differential driving supercharger, as claimed in claim 11, further comprising:
means for adjusting the speed of said rotary variable load body, based on a change in an engine rotational speed output through said planetary carrier, to maintain said mechanical supercharger substantially at a constant rotational speed.

13. A differential driving supercharger for an engine, said engine having a first output shaft and a second output shaft, said second output shaft for providing a driving force; said differential driving supercharger comprising:
- a mechanical supercharger,
- a differential driving device for driving said mechanical supercharger, said differential driving device having a sun gear, a planetary carrier, and a ring gear;
- said planetary carrier being adapted to be coupled to said first output shaft;
- said mechanical supercharger being coupled to said sun gear;
- a rotary variable load body, said rotary variable load body being coupled to said ring gear; and
- a power source, for driving said rotary variable load body, is coupled to said second output shaft.

14. A differential driving supercharger in accordance with claim 13, further comprising a clutch, wherein said ring gear and said rotary variable load body are coupled to each other through said clutch, for reducing an energy loss of said rotary variable load body when the rotation of said mechanical supercharger is stopped.

15. A differential driving supercharger in accordance with claim 13, wherein said power source, for driving said rotary variable load body, is any one of:
- a fixed capacity pump,
- a variable capacity pump,
- a generator, and
- an air compressor.

16. A differential driving supercharger in accordance with claim 15, further comprising a clutch, wherein said ring gear and said rotary variable load body are coupled to each other through said clutch, for reducing an energy loss of said rotary variable load body when the rotation of said mechanical supercharger is stopped.

17. A differential driving supercharger in accordance with claim 13, further comprising:
- a first intake line between said mechanical supercharger and said engine for introducing supercharged air to said engine;
- a second intake line between the atmosphere and said engine for introducing atmospheric air to said engine;
- a first on/off valve disposed in said first intake line for cutting off supercharged air through said first intake line to said engine;
- a second on/off valve disposed in said second intake line for cutting off atmospheric air through said second intake line to said engine;
- an engine rotational speed sensor for detecting a rotational speed of said engine and providing a rotational speed signal representative thereof; and
- a controller for outputting signals to actuate said first and second on/off valves upon receiving a prescribed rotational speed signal from said sensor.

18. A differential driving supercharger in accordance with claim 17, wherein said controller outputs signals to said first and second on/off valves so that when rotation of said mechanical supercharger is stopped, said first on/off valve is closed and said second on/off valve is opened to supply air to said engine through natural suction.

19. A differential driving supercharger in accordance with claim 13, further comprising:
- an accelerator pedal for controlling a rotational speed of said engine;
- an accelerator pedal depression sensor for detecting an amount of depression of said accelerator pedal;
- an injection pump for injecting fuel into said engine, said injection pump having a solenoid for controlling an amount of fuel injected into said engine;
- a rack position sensor for detecting an amount of fuel ejected from said injection pump;
- a first intake line between said mechanical supercharger and said engine for introducing supercharged air to said engine;
- a second intake line between the atmosphere and said engine for introducing atmospheric air to said engine;
- a first on/off valve disposed in said first intake line for cutting off supercharged air through said first intake line to said engine;
- a second on/off valve disposed in said second intake line for cutting off atmospheric air through said second intake line to said engine;
- an engine rotational speed sensor for detecting the engine rotational speed,
- a servo member for increasing and reducing a capacity of said rotary variable load body,
- a selector valve for selectively introducing power to said rotary variable load body therethrough, and
- a controller for, upon receiving prescribed signals from said accelerator pedal depression sensor, said rack position sensor, and said engine rotational speed sensor, outputting signals to said solenoid of said injection pump, said selector valve, and said servo member for said rotary variable load body, to thereby control the rotational speeds of said engine and said mechanical supercharger.

20. A differential driving supercharger in accordance with claim 19, wherein when said mechanical supercharger is sped up or slowed down, said controller outputs:

signals to said on/off valves, so that said first on/off valve is opened and said second on/off valve is closed to supercharge air to said engine;

a signal to said selector valve, to shift its position; and a signal to said servo member for said rotary variable load body to increase its capacity.

21. A differential driving supercharger in accordance with claim 20, wherein when said mechanical supercharger is held at a substantially constant rotational speed, said controller outputs:

signals to said on/off valves, so that said first on/off valve is opened and said second on/off valve is closed to supercharge air to said engine;

a signal to said solenoid of said injection pump, to increase or reduce the engine rotational speed;

a signal to said selector valve, to shift its position; and a signal to said servo member for said rotary variable load body, to increase or reduce its rotational speed.

22. A differential driving supercharger in accordance with claim 13, further comprising an accumulating device provided between said rotary variable load body and said power source for driving said rotary variable load body.

23. A differential driving supercharger in accordance with claim 22, further comprising a clutch, wherein said ring gear and said rotary variable load body are coupled to each other through said clutch, for reducing an energy loss of said rotary variable load body when the rotation of said mechanical supercharger is stopped.

24. A differential driving supercharger in accordance with claim 22, further comprising:

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

an engine rotational speed sensor for detecting a rotational speed of said engine and providing a rotational speed signal representative thereof; and a controller for outputting signals to actuate said first and second on/off valves upon receiving a prescribed rotational speed signal from said sensor.

25. A differential driving supercharger in accordance with claim 24, wherein said controller outputs signals to said first and second on/off valves so that when rotation of said mechanical supercharger is stopped, said first on/off valve is closed and said second on/off valve is opened to supply air to said engine through natural suction.

26. A differential driving supercharger in accordance with claim 22, further comprising:

an accelerator pedal for controlling a rotational speed of said engine;

an accelerator pedal depression sensor for detecting an amount of depression of said accelerator pedal;

an injection pump for injecting fuel into said engine, said injection pump having a solenoid for controlling an amount of fuel injected into said engine;

a rack position sensor for detecting an amount of fuel ejected from said injection pump;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

an engine rotational speed sensor for detecting the engine rotational speed, a servo member for increasing and reducing a capacity of said rotary variable load body, a selector valve for selectively introducing power to said rotary variable load body therethrough, and a controller for, upon receiving prescribed signals from said accelerator pedal depression sensor, said rack position sensor, and said engine rotational speed sensor, outputting signals to said solenoid of said injection pump, said selector valve, and said servo member for said rotary variable load body, to thereby control the rotational speeds of said engine and said mechanical supercharger.

27. A differential driving supercharger in accordance with claim 26, wherein when said mechanical supercharger is sped up or slowed down, said controller outputs:

signals to said on/off valves, so that said first on/off valve is opened and said second on/off valve is closed to supercharge air to said engine;

a signal to said selector valve, to shift its position; and a signal to said servo member for said rotary variable load body to increase its capacity.

28. A differential driving supercharger in accordance with claim 27, wherein when said mechanical supercharger is held at a substantially constant rotational speed, said controller outputs:

signals to said on/off valves, so that said first on/off valve is opened and said second on/off valve is closed to supercharge air to said engine;

a signal to said solenoid of said injection pump, to increase or reduce the engine rotational speed;

a signal to said selector valve, to shift its position; and a signal to said servo member for said rotary variable load body, to increase or reduce its rotational speed.

29. A differential driving supercharger in accordance with claim 22, wherein said accumulating device is a hydraulic accumulator.

30. A differential driving supercharger in accordance with claim 22, wherein said accumulating device is a battery.

31. A differential driving supercharger for an engine, said engine having a first output shaft and a second output shaft, said second output shaft for providing a driving force; said differential driving supercharger comprising:

a mechanical supercharger, a differential driving device for driving said mechanical supercharger, said differential driving device having a sun gear, a planetary carrier, and a ring gear;

said planetary carrier being adapted to be coupled to said first output shaft;

said mechanical supercharger being coupled to said sun gear;

a rotary variable load body, said rotary variable load body being coupled to said ring gear;

a driving force transmission system adapted to be connected to said engine, said driving force transmission system having an output shaft;

a driving device for receiving power generated by said rotary variable load body, said driving device being coupled to said output shaft of said driving force transmission system.

32. A differential driving supercharger in accordance with claim 31, wherein said rotary variable load body is any one of:

a fixed capacity pump, a variable capacity pump, a generator, and an air compressor, and wherein said driving device is any one of:

a fixed capacity motor, a variable capacity motor, and an electric motor.

33. A differential driving supercharger in accordance with claim 31, further comprising:

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

an engine rotational speed sensor for detecting a rotational speed of said engine and providing a rotational speed signal representative thereof; and a controller for outputting signals to actuate said first and second on/off valves upon receiving a prescribed rotational speed signal from said sensor.

34. A differential driving supercharger in accordance with claim 33, wherein said controller outputs signals to said first and second on/off valves so that when rotation of said mechanical supercharger is stopped, said first on/off valve is closed and said second on/off valve is opened to supply air to said engine through natural suction.

35. A differential driving supercharger in accordance with claim 31, further comprising:

an accelerator pedal for controlling a rotational speed of said engine;

an accelerator pedal depression sensor for detecting an amount of depression of said accelerator pedal;

an injection pump for injecting fuel into said engine, said injection pump having a solenoid for controlling an amount of fuel injected into said engine;

a rack position sensor for detecting an amount of fuel ejected from said injection pump;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

an engine rotational speed sensor for detecting the engine rotational speed, a servo member for increasing and reducing a capacity of said rotary variable load body, a selector valve for selectively introducing power to said rotary variable load body therethrough, and a controller for, upon receiving prescribed signals from said accelerator pedal depression sensor, said rack position sensor, and said engine rotational speed sensor, outputting signals to said solenoid of said injection pump, said selector valve, and said servo member for said rotary variable load body, to thereby control the rotational speeds of said engine and said mechanical supercharger.

36. A differential driving supercharger in accordance with claim 35, wherein when said mechanical supercharger is sped up or slowed down, said controller outputs:

signals to said on/off valves, so that said first on/off valve is opened and said second on/off valve is closed to supercharge air to said engine;

a signal to said selector valve, to shift its position; and a signal to said servo member for said rotary variable load body to increase its capacity.

37. A differential driving supercharger in accordance with claim 36, wherein when said mechanical supercharger is held at a substantially constant rotational speed, said controller outputs:

signals to said on/off valves, so that said first on/off valve is opened and said second on/off valve is closed to supercharge air to said engine;

a signal to said solenoid of said injection pump, to increase or reduce the engine rotational speed;

a signal to said selector valve, to shift its position; and a signal to said servo member for said rotary variable load body, to increase or reduce its rotational speed.

38. A differential driving supercharger for an engine, said engine having a power shaft; said differential driving supercharger comprising:

a mechanical supercharger, a differential driving device for driving said mechanical supercharger; said differential driving device having a sun gear, a planetary carrier, and a ring gear;

said planetary carrier being adapted to be coupled to said power shaft;

said mechanical supercharger being coupled to said sun gear;

a rotary variable load body, said rotary variable load body being coupled to said ring gear;

an accelerator pedal for controlling a rotational speed of said engine;

an accelerator pedal depression sensor for detecting an amount of depression of said accelerator pedal;

a fuel injection pump;

a rack position sensor for detecting an amount of fuel ejected from said fuel injection pump;

an engine rotational speed sensor for detecting a rotational speed of said engine;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

a clutch for connecting and disconnecting between said ring gear and said rotary variable load body; and a controller, wherein said controller, upon receiving prescribed signals from said accelerator pedal depression sensor, said rack position sensor, and said engine rotational speed sensor, outputs a signal to said second on/off valve to open itself and a signal to said clutch to disconnect, so that air is supplied to said engine through natural suction, and an energy loss of said rotary variable load body is reduced.

39. A differential driving supercharger for an engine, said engine having a power shaft; said differential driving supercharger comprising:

a mechanical supercharger, a differential driving device for driving said mechanical supercharger, said differential driving device having a sun gear, a planetary carrier, and a ring gear;

said planetary carrier being adapted to be coupled to said power shaft;

said mechanical supercharger being coupled to said sun gear;

a rotary variable load body, said rotary variable load body being coupled to said ring gear;

an accelerator pedal for controlling a rotational speed of said engine;

an accelerator pedal depression sensor for detecting an amount of depression of said accelerator pedal;

a fuel injection pump;

a rack position sensor for detecting an amount of fuel ejected from said fuel injection pump;

an engine rotational speed sensor for detecting a rotational speed of said engine;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

a clutch for connecting and disconnecting between said rotary variable load body and a power source for driving said rotary variable load body; and a controller, said controller being adapted for, upon receiving prescribed signals from said accelerator pedal depression sensor, said rack position sensor, and said engine rotational speed sensor, outputting a signal to said second on/off valve to open itself and a signal to said clutch to disconnect, so that air is supplied to said engine through natural suction, and an energy loss of said rotary variable load body is reduced.

40. A differential driving supercharger for an engine, said engine having an output shaft; said differential driving supercharger comprising:

an accelerator pedal for controlling a rotational speed of said engine;

an accelerator pedal depression sensor for detecting an amount of depression of said accelerator pedal;

a fuel injection pump;

a rack position sensor for detecting an amount of fuel ejected from said injection pump to said engine;

an engine rotational speed sensor for detecting a rotational speed of said engine;

a rotary variable load body;

a servo member for increasing and reducing a capacity of said rotary variable load body;

a driving force transmission system for receiving power generated by said rotary variable load body, said driving force transmission system having an output shaft;

a driving device coupled to said output shaft of said driving force transmission system;

a servo member for said driving device;

a selector valve for selectively connecting between said rotary variable load body and said driving device;

a clutch for connecting and disconnecting power between said output shaft of said engine and said output shaft of said driving force transmission system; and a controller, said controller, upon receiving prescribed signals from said accelerator pedal depression sensor, said rack position sensor, and said engine rotational speed sensor, outputting a signal to said clutch to disconnect, a signal to said selector valve to connect between said rotary variable load body and said driving device, a signal to said rotary variable load body to increase or reduce its capacity, and a signal to said driving device to increase or reduce its capacity, thereby transmitting an engine output from said rotary variable load body to said output shaft of said driving force transmission system through said driving device.

41. A differential driving supercharger for an engine, said engine having a first output shaft and a second output shaft, said second output shaft for providing a driving force; said differential driving supercharger comprising:

a mechanical supercharger, a differential driving device for driving said mechanical supercharger, said differential driving device having a sun gear, a planetary carrier, and a ring gear;

said planetary carrier being adapted to be coupled to said first output shaft;

said mechanical supercharger being coupled to said sun gear; and a driving force transmission system having a transmission, said transmission being coupled to said ring gear.

42. A differential driving supercharger in accordance with claim 41, further comprising a one-way clutch disposed between said sun gear and said mechanical supercharger.

43. A differential driving supercharger in accordance with claim 41, further comprising a clutch disposed between said transmission of said driving force transmission system and said mechanical supercharger.

44. A differential driving supercharger in accordance with claim 41, further comprising a supercharger transmission disposed between said ring gear and said transmission of said driving force transmission system.

45. A differential driving supercharger in accordance with claim 44, further comprising a one-way clutch disposed between said sun gear and said mechanical supercharger.

46. A differential driving supercharger in accordance with claim 45, further comprising a clutch disposed between said transmission of said driving force transmission system and said mechanical supercharger.

47. A differential driving supercharger in accordance with claim 44, wherein said supercharger transmission is any one of:
- a gear train;
- a pulley train;
- a belt type continuously variable transmission;
- a toroidal type continuously variable transmission;
- a combination of a hydraulic pump and a hydraulic motor;
- a combination of a hydraulic pump, a hydraulic motor, and a selector valve;
- a combination of an electric generator and a motor; and
- a variable capacity fluid coupler.

48. A differential driving supercharger in accordance with claim 47, further comprising a clutch disposed between said transmission of said driving force transmission system and said mechanical supercharger.

49. A differential driving supercharger in accordance with claim 44, further comprising a clutch disposed between said transmission of said driving force transmission system and said mechanical supercharger.

50. A differential driving supercharger for an engine, said engine having a power shaft; said differential driving supercharger comprising:
- a mechanical supercharger,
- a differential driving device for driving said mechanical supercharger, said differential driving device having a sun gear, a planetary carrier, and a ring gear;
- said planetary carrier being adapted to be coupled to said power shaft;
- said mechanical supercharger being coupled to said sun gear; and
- a continuously variable transmission for said ring gear is disposed between said power shaft and said ring gear.

51. A method for controlling a differential driving supercharger, wherein said differential driving supercharger comprises a mechanical supercharger and a differential driving device for driving said mechanical supercharger, wherein said differential driving device has a ring gear, a planetary carrier gear, and a sun gear, with said mechanical supercharger being coupled to said sun gear; wherein said method comprises the steps of:
- providing power from outside of said differential driving supercharger to rotate said ring gear so as to control an increase/decrease in a rotational speed of said mechanical supercharger;
- operating said mechanical supercharger at the thus controlled rotational speed to supercharge air to said engine;
- accumulating energy during a period when said rotational speed of said mechanical supercharger is being increased; and
- subsequently utilizing the thus accumulated energy to aid in increasing the rotational speed of said mechanical supercharger.

52. A method for controlling a differential driving supercharger, wherein said differential driving supercharger comprises a mechanical supercharger and a differential driving device for driving said mechanical supercharger, wherein said differential driving device has a ring gear, a planetary carrier gear, and a sun gear, with said mechanical supercharger being coupled to said sun gear; wherein said method comprises the steps of:
- providing power from outside of said differential driving supercharger to rotate said ring gear so as to control an increase/decrease in a rotational speed of said mechanical supercharger during a first period of time; and
- operating said mechanical supercharger at the thus controlled rotational speed to supercharge air to said engine during said first period of time; and
- accumulating energy from said ring gear during a second period of time when said ring gear is rotating idly so as to stop rotation of said mechanical supercharger.

53. A method for controlling a differential driving supercharger for an engine, said engine having a first output shaft and a second output shaft, said second output shaft for providing a driving force, wherein said differential driving supercharger comprises a mechanical supercharger and a differential driving device for driving said mechanical supercharger for supercharging air to an engine, wherein said differential driving device has a ring gear, a planetary carrier gear, and a sun gear, with a rotary variable load body being coupled to said ring gear, said planetary carrier gear being adapted to be coupled to said first output shaft, and said mechanical supercharger being coupled to said sun gear; wherein said method comprises the steps of:
- using power from said engine to provide a power source outside of said differential driving supercharger;
- providing power from said power source to rotate said ring gear so as provide a rotational speed of said mechanical supercharger; and
- operating said mechanical supercharger responsive to the rotation of said ring gear to supercharge air to said engine.

54. A method in accordance with claim 53, further comprising causing variable rotation of said ring gear, responsive to change in a rotational speed of said engine, to control said mechanical supercharger at a substantially constant rotational speed.

55. A method for controlling a differential driving supercharger for an engine, wherein said differential driving supercharger comprises a mechanical supercharger, a differential driving device for driving said mechanical supercharger, a first intake line between said mechanical supercharger and said engine for introducing supercharged air to said engine, a second intake line between the atmosphere and said engine for introducing atmospheric air to said engine, a first on/off valve disposed in said first intake line for cutting off supercharged air through said first intake line to said engine, and a second on/off valve disposed in said second intake line for cutting off atmospheric air through said second intake line to said engine; wherein said method comprises the steps of:
- detecting a rotational speed of said engine;
- detecting an amount of fuel ejected from a fuel pump into said engine;
- opening and closing said first and second on/off valves responsive to the thus detected rotational speed of said engine and the thus detected amount of fuel so that air supply to said engine is controlled through natural suction or supercharge suction.

56. A method for controlling a differential driving supercharger for an engine which drives a driving force transmission system; wherein said engine has an output shaft; wherein said differential driving supercharger comprises a mechanical supercharger, a differential driving device for driving said mechanical supercharger, and a supercharger transmission connected between an output of said driving force transmission system and said differential driving device for driving said differential driving device; wherein said method comprises the steps of:

detecting a rotational speed of said engine;

detecting an amount of fuel ejected from a fuel pump into said engine;

when the thus detected rotational speed of said engine and the thus detected amount of fuel have values within respective prescribed ranges, power between an output shaft of said engine and an output shaft of said driving force transmission system is cut off so that engine power is converted into at least one of hydraulic pressure and electrical power by a rotary variable load body through said differential driving device; and converting the at least one of hydraulic pressure and electrical power into power for transmission to said driving force transmission system.

57. A differential driving supercharger for an engine, said engine having a power shaft; said differential driving supercharger comprising:

a mechanical supercharger;

a differential driving device for driving said mechanical supercharger, said differential driving device having a sun gear, a planetary carrier, and a ring gear;

said planetary carrier being adapted to be coupled to said power shaft;

said mechanical supercharger being coupled to said sun gear;

a rotary variable load body, said rotary variable load body being coupled to said ring gear;

means for reducing an energy loss of said rotary variable load body when rotation of said mechanical supercharger is stopped;

a first intake line between said mechanical supercharger and said engine for introducing supercharged air to said engine;

a second intake line between the atmosphere and said engine for introducing atmospheric air to said engine;

a first on/off valve disposed in said first intake line for cutting off supercharged air through said first intake line to said engine;

a second on/off valve disposed in said second intake line for cutting off atmospheric air through said second intake line to said engine;

an engine rotational speed sensor for detecting a rotational speed of said engine and providing a rotational speed signal representative thereof; and a controller for outputting signals to actuate said first and second on/off valves upon receiving a prescribed rotational speed signal from said sensor.

58. A differential driving supercharger in accordance with claim 57, wherein said means for reducing an energy loss of said rotary variable load body is any one of:

a fixed capacity pump, a variable capacity pump, a fixed capacity motor, a variable capacity motor, a fixed capacity pump/motor serving as a pump and a motor, a variable capacity pump/motor serving as a pump and a motor, and an accumulating device.

59. A differential driving supercharger in accordance with claim 57, wherein said controller outputs signals to said first and second on/off valves so that when rotation of said mechanical supercharger is stopped, said first on/off valve is closed and said second on/off valve is opened to supply air to said engine through natural suction.

60. A differential driving supercharger in accordance with claim 57, further comprising:

an accelerator pedal for controlling a rotational speed of said engine;

an accelerator pedal depression sensor for detecting an amount of depression of said accelerator pedal;

an injection pump for injecting fuel into said engine, said injection pump having a solenoid for controlling an amount of fuel injected into said engine;

a rack position sensor for detecting an amount of fuel ejected from said injection pump;

a servo member for increasing and reducing a capacity of said rotary variable load body; and a selector valve for selectively introducing power to said rotary variable load body therethrough; and wherein said controller, upon receiving prescribed signals from said accelerator pedal depression sensor, said rack position sensor, and said engine rotational speed sensor, outputs signals to said solenoid of said injection pump, said selector valve, and said servo member for said rotary variable load body, to thereby control the rotational speeds of said engine and said mechanical supercharger.

61. A differential driving supercharger in accordance with claim 60, wherein when said mechanical supercharger is sped up or slowed down, said controller outputs:

signals to said on/off valves, so that said first on/off valve is opened and said second on/off valve is closed to supercharge air to said engine;

a signal to said selector valve, to shift its position; and a signal to said servo member for said rotary variable load body to increase its capacity.

62. A differential driving supercharger in accordance with claim 61, wherein when said mechanical supercharger is held at a substantially constant rotational speed, said controller outputs:

signals to said on/off valves, so that said first on/off valve is opened and said second on/off valve is closed to supercharge air to said engine;

a signal to said solenoid of said injection pump, to increase or reduce the engine rotational speed;

a signal to said selector valve, to shift its position; and a signal to said servo member for said rotary variable load body, to increase or reduce its rotational speed.

63. A method for controlling a differential driving supercharger for an engine, said engine having a first output shaft and a second output shaft, said second output shaft for providing a driving force, wherein said differential driving supercharger comprises a mechanical supercharger and a differential driving device for driving said mechanical supercharger for supercharging air to an engine, wherein said differential driving device has a ring gear, a planetary carrier gear, and a sun gear, with a rotary variable load body being coupled to said ring gear, said first output shaft being adapted to be coupled to said planetary carrier gear, and said mechanical supercharger being coupled to said sun gear; wherein said method comprises the steps of:

using power from said engine to provide a power source outside of said differential driving supercharger;

providing power from said power source to rotate said ring gear so as provide a rotational speed of said mechanical supercharger; and operating said mechanical supercharger responsive to the rotation of said ring gear to supercharge air to said engine to thereby increase a rotational speed of said engine.

64. A method for controlling a differential driving supercharger for an engine, said engine having a first output shaft and a second output shaft, said second output shaft for providing a driving force, wherein said differential driving supercharger comprises a mechanical supercharger and a differential driving device for driving said mechanical supercharger for supercharging air to an engine, wherein said differential driving device has a ring gear, a planetary carrier gear, and a sun gear, with a rotary variable load body being coupled to said ring gear, said first output shaft being adapted to be coupled to said planetary carrier gear, and said mechanical supercharger being coupled to said sun gear; wherein said method comprises the steps of:

using power from said engine to provide a power source outside of said differential driving supercharger;

providing power from said power source to rotate said ring gear;

causing said ring gear to rotate idly so as to stop the rotation of said mechanical supercharger.

* * * * *